(12) United States Patent
Yun et al.

(10) Patent No.: US 11,549,895 B2
(45) Date of Patent: Jan. 10, 2023

(54) SYSTEM AND METHOD USING X-RAYS FOR DEPTH-RESOLVING METROLOGY AND ANALYSIS

(71) Applicant: Sigray, Inc., Concord, CA (US)

(72) Inventors: Wenbing Yun, Walnut Creek, CA (US); Benjamin Donald Stripe, Walnut Creek, CA (US); Janos Kirz, Berkeley, CA (US); Sylvia Jia Yun Lewis, San Francisco, CA (US)

(73) Assignee: Sigray, Inc., Concord, CA (US)

( * ) Notice: Subject to any disclaimer, the term of this patent is extended or adjusted under 35 U.S.C. 154(b) by 0 days.

(21) Appl. No.: 17/476,355

(22) Filed: Sep. 15, 2021

(65) Prior Publication Data
US 2022/0082515 A1 Mar. 17, 2022

Related U.S. Application Data

(60) Provisional application No. 63/079,940, filed on Sep. 17, 2020.

(51) Int. Cl.
*G01N 23/20* (2018.01)
*G01N 23/223* (2006.01)
(Continued)

(52) U.S. Cl.
CPC ........... *G01N 23/20* (2013.01); *G01N 23/223* (2013.01); *G01N 23/2206* (2013.01);
(Continued)

(58) Field of Classification Search
CPC .................................................... G01N 23/20
See application file for complete search history.

(56) References Cited

U.S. PATENT DOCUMENTS 4,169,228 A * 9/1979 Briska .................. G01N 23/223
378/45
4,642,811 A 2/1987 Georgopoulos
(Continued)

FOREIGN PATENT DOCUMENTS

| CN | 1656373 A | 8/2005 |
| CN | 1829910 A | 9/2006 |

(Continued)

OTHER PUBLICATIONS

Anklamm et al., "A novel von Hamos spectrometer for efficient X-ray emission spectroscopy in the laboratory," Rev. Sci. Instr. vol. 85 p. 053110 (2014).
(Continued)

*Primary Examiner* — Thomas R Artman
(74) *Attorney, Agent, or Firm* — Knobbe, Martens, Olson & Bear, LLP

(57) ABSTRACT

A system and method for analyzing a three-dimensional structure of a sample includes generating a first x-ray beam having a first energy bandwidth less than 20 eV at full-width-at-half maximum and a first mean x-ray energy that is in a range of 1 eV to 1 keV higher than an absorption edge energy of a first atomic element of interest, and that is collimated to have a collimation angular range less than 7 mrad in at least one direction perpendicular to a propagation direction of the first x-ray beam; irradiating the sample with the first x-ray beam at a plurality of incidence angles relative to a substantially flat surface of the sample, the incidence angles of the plurality of incidence angles in a range of 3 mrad to 400 mrad; and simultaneously detecting a reflected portion of the first x-ray beam from the sample and detecting x-ray fluorescence x-rays and/or photoelectrons from the sample.

23 Claims, 21 Drawing Sheets

(51) Int. Cl.
*G01N 23/2273* (2018.01)
*G01N 23/2206* (2018.01)

(52) U.S. Cl.
CPC ... *G01N 23/2273* (2013.01); *G01N 2223/052* (2013.01); *G01N 2223/071* (2013.01); *G01N 2223/076* (2013.01); *G01N 2223/085* (2013.01); *G01N 2223/1016* (2013.01); *G01N 2223/61* (2013.01); *G01N 2223/6116* (2013.01); *G01N 2223/633* (2013.01); *G01N 2223/645* (2013.01); *G01N 2223/652* (2013.01)

(56) References Cited

U.S. PATENT DOCUMENTS

| | | | |
|---|---|---|---|
| 4,945,552 | A | 7/1990 | Ueda |
| 5,132,997 | A | 7/1992 | Kojima |
| 5,173,928 | A | 12/1992 | Momose et al. |
| 5,204,887 | A | 4/1993 | Hayashida et al. |
| 5,220,591 | A | 6/1993 | Ohsugi et al. |
| 5,249,216 | A | 9/1993 | Ohsugi et al. |
| 5,280,176 | A | 1/1994 | Jach et al. |
| 5,684,857 | A | 11/1997 | De Bokx |
| 5,778,039 | A | 7/1998 | Hossain |
| 5,812,629 | A | 9/1998 | Clauser |
| 5,832,052 | A | 11/1998 | Hirose et al. |
| 5,912,940 | A | 6/1999 | O'Hara |
| 6,108,398 | A | 8/2000 | Mazor et al. |
| 6,181,773 | B1 | 1/2001 | Lee et al. |
| 6,195,410 | B1 | 2/2001 | Cash, Jr. |
| 6,226,347 | B1 | 5/2001 | Golenhofen |
| 6,381,303 | B1 | 4/2002 | Vu et al. |
| 6,430,254 | B2 | 8/2002 | Wilkins |
| 6,442,231 | B1 | 8/2002 | O'Hara |
| 6,456,688 | B1 | 9/2002 | Taguchi et al. |
| 6,504,902 | B2 | 1/2003 | Iwasaki et al. |
| 6,512,814 | B2* | 1/2003 | Yokhin ............... G01T 1/36 378/82 |
| 6,577,704 | B1* | 6/2003 | Holz ................ G01N 23/223 378/45 |
| 6,611,577 | B1 | 8/2003 | Yamagami |
| 6,639,968 | B2* | 10/2003 | Yokhin ............... G01T 1/36 378/70 |
| 6,711,234 | B1 | 3/2004 | Loxley et al. |
| 6,763,086 | B2 | 7/2004 | Platonov |
| 6,829,327 | B1 | 12/2004 | Chen |
| 6,891,627 | B1 | 5/2005 | Levy et al. |
| 6,895,071 | B2* | 5/2005 | Yokhin ............... G01T 1/36 378/45 |
| 6,914,723 | B2 | 7/2005 | Yun et al. |
| 6,934,359 | B2 | 8/2005 | Chen |
| 7,006,596 | B1 | 2/2006 | Janik |
| 7,023,955 | B2 | 4/2006 | Chen et al. |
| 7,095,822 | B1 | 8/2006 | Yun |
| 7,119,953 | B2 | 10/2006 | Yun et al. |
| 7,120,228 | B2 | 10/2006 | Yokhin et al. |
| 7,180,979 | B2 | 2/2007 | Momose |
| 7,183,547 | B2 | 2/2007 | Yun et al. |
| 7,187,751 | B2 | 3/2007 | Kawahara et al. |
| 7,215,736 | B1 | 5/2007 | Wang et al. |
| 7,218,703 | B2 | 5/2007 | Yada et al. |
| 7,221,731 | B2 | 5/2007 | Yada et al. |
| 7,245,696 | B2 | 7/2007 | Yun et al. |
| 7,258,485 | B2* | 8/2007 | Nakano ......... G01N 23/20025 378/205 |
| 7,268,945 | B2 | 9/2007 | Yun et al. |
| 7,388,942 | B2 | 6/2008 | Wang et al. |
| 7,394,890 | B1 | 7/2008 | Wang et al. |
| 7,400,704 | B1 | 7/2008 | Yun et al. |
| 7,406,151 | B1 | 7/2008 | Yun |
| 7,414,787 | B2 | 8/2008 | Yun et al. |
| 7,453,560 | B2* | 11/2008 | Miyake ............... G03F 7/706 356/601 |
| 7,463,712 | B2 | 12/2008 | Zhu et al. |
| 7,486,770 | B2 | 2/2009 | Baumann |
| 7,492,871 | B2 | 2/2009 | Popescu |
| 7,499,521 | B2 | 3/2009 | Wang et al. |
| 7,515,684 | B2 | 4/2009 | Gibson et al. |
| 7,522,698 | B2 | 4/2009 | Popescu |
| 7,522,708 | B2 | 4/2009 | Heismann |
| 7,532,704 | B2 | 5/2009 | Hempel |
| 7,551,719 | B2 | 6/2009 | Yokhin et al. |
| 7,551,722 | B2 | 6/2009 | Ohshima et al. |
| 7,561,662 | B2 | 7/2009 | Wang et al. |
| 7,564,941 | B2 | 7/2009 | Baumann |
| 7,639,786 | B2 | 12/2009 | Baumann |
| 7,646,843 | B2 | 1/2010 | Popescu et al. |
| 7,653,177 | B2 | 1/2010 | Baumann et al. |
| 7,680,243 | B2 | 3/2010 | Yokhin et al. |
| 7,787,588 | B1 | 8/2010 | Yun et al. |
| 7,796,725 | B1 | 9/2010 | Yun et al. |
| 7,796,726 | B1 | 9/2010 | Gendreau et al. |
| 7,809,113 | B2 | 10/2010 | Aoki et al. |
| 7,813,475 | B1 | 10/2010 | Wu et al. |
| 7,817,777 | B2 | 10/2010 | Baumann et al. |
| 7,848,483 | B2 | 12/2010 | Platonov |
| 7,864,922 | B2 | 1/2011 | Kawabe |
| 7,889,838 | B2 | 2/2011 | David et al. |
| 7,899,154 | B2 | 3/2011 | Chen et al. |
| 7,920,676 | B2 | 4/2011 | Yun et al. |
| 7,924,973 | B2 | 4/2011 | Kottler et al. |
| 7,945,018 | B2 | 5/2011 | Heismann |
| 7,949,092 | B2 | 5/2011 | Brons |
| 7,949,095 | B2 | 5/2011 | Ning |
| 7,974,379 | B1 | 7/2011 | Case et al. |
| 7,983,381 | B2 | 7/2011 | David et al. |
| 8,005,185 | B2 | 8/2011 | Popescu |
| 8,009,796 | B2 | 8/2011 | Popescu |
| 8,009,797 | B2 | 8/2011 | Ouchi |
| 8,041,004 | B2 | 10/2011 | David |
| 8,058,621 | B2 | 11/2011 | Kommareddy |
| 8,068,579 | B1 | 11/2011 | Yun et al. |
| 8,073,099 | B2 | 12/2011 | Niu et al. |
| 8,139,711 | B2 | 3/2012 | Takahashi |
| 8,165,270 | B2 | 4/2012 | David et al. |
| 8,184,771 | B2 | 5/2012 | Murakoshi |
| 8,233,587 | B2 | 7/2012 | Sato |
| 8,243,879 | B2 | 8/2012 | Itoh et al. |
| 8,306,183 | B2 | 11/2012 | Koehler |
| 8,351,570 | B2 | 1/2013 | Nakamura |
| 8,353,628 | B1 | 1/2013 | Yun et al. |
| 8,374,309 | B2 | 2/2013 | Donath |
| 8,451,975 | B2 | 5/2013 | Tada |
| 8,513,603 | B1 | 8/2013 | Lederman et al. |
| 8,559,594 | B2 | 10/2013 | Ouchi |
| 8,559,597 | B2 | 10/2013 | Chen et al. |
| 8,565,371 | B2 | 10/2013 | Bredno |
| 8,591,108 | B2 | 11/2013 | Tada |
| 8,602,648 | B1 | 12/2013 | Jacobsen et al. |
| 8,632,247 | B2 | 1/2014 | Ishii |
| 8,755,487 | B2 | 6/2014 | Kaneko |
| 8,767,915 | B2 | 7/2014 | Stutman |
| 8,767,916 | B2 | 7/2014 | Hashimoto |
| 8,781,069 | B2 | 7/2014 | Murakoshi |
| 8,824,629 | B2 | 9/2014 | Ishii |
| 8,855,265 | B2 | 10/2014 | Engel |
| 8,859,977 | B2 | 10/2014 | Kondoh |
| 8,908,824 | B2 | 12/2014 | Kondoh |
| 8,972,191 | B2 | 3/2015 | Stampanoni et al. |
| 8,989,474 | B2 | 3/2015 | Kido et al. |
| 9,001,967 | B2 | 4/2015 | Baturin |
| 9,016,943 | B2 | 4/2015 | Jacobsen et al. |
| 9,025,725 | B2 | 5/2015 | Kiyohara et al. |
| 9,031,201 | B2 | 5/2015 | Sato |
| 9,036,773 | B2 | 5/2015 | David et al. |
| 9,063,055 | B2 | 6/2015 | Ouchi |
| 9,086,536 | B2 | 7/2015 | Pang et al. |
| 9,129,715 | B2 | 9/2015 | Adler et al. |
| 9,222,899 | B2 | 12/2015 | Yamaguchi |
| 9,230,703 | B2 | 1/2016 | Mohr et al. |
| 9,234,856 | B2 | 1/2016 | Mukaide |
| 9,291,578 | B2 | 3/2016 | Adler |
| 9,329,141 | B2 | 5/2016 | Stutman |

(56) References Cited

U.S. PATENT DOCUMENTS

| | | |
|---|---|---|
| 9,357,975 B2 | 6/2016 | Baturin |
| 9,439,613 B2 | 9/2016 | Stutman |
| 9,448,190 B2 * | 9/2016 | Yun .................... G01N 23/2076 |
| 9,453,803 B2 | 9/2016 | Radicke |
| 9,480,447 B2 | 11/2016 | Mohr et al. |
| 9,486,175 B2 | 11/2016 | Fredenberg et al. |
| 9,494,534 B2 | 11/2016 | Baturin |
| 9,532,760 B2 | 1/2017 | Anton et al. |
| 9,551,677 B2 | 1/2017 | Mazor et al. |
| 9,557,280 B2 | 1/2017 | Pfeiffer et al. |
| 9,570,265 B1 * | 2/2017 | Yun ....................... H01J 35/147 |
| 9,588,066 B2 | 3/2017 | Pois et al. |
| 9,594,036 B2 * | 3/2017 | Yun .......................... G21K 1/06 |
| 9,632,040 B2 | 4/2017 | Stutman |
| 9,700,267 B2 | 7/2017 | Baturin et al. |
| 9,719,947 B2 | 8/2017 | Yun et al. |
| 9,748,012 B2 | 8/2017 | Yokoyama |
| 9,757,081 B2 | 9/2017 | Proksa |
| 9,761,021 B2 | 9/2017 | Koehler |
| 9,770,215 B2 | 9/2017 | Souchay et al. |
| 9,778,213 B2 | 10/2017 | Bakeman et al. |
| 9,823,203 B2 | 11/2017 | Yun et al. |
| 9,826,949 B2 | 11/2017 | Ning |
| 9,861,330 B2 | 1/2018 | Rossi |
| 9,874,531 B2 | 1/2018 | Yun et al. |
| 9,881,710 B2 | 1/2018 | Roessl |
| 9,916,655 B2 | 3/2018 | Sampanoni |
| 10,028,716 B2 | 7/2018 | Rossi |
| 10,045,753 B2 | 8/2018 | Teshima |
| 10,074,451 B2 | 9/2018 | Kottler et al. |
| 10,076,297 B2 | 9/2018 | Bauer |
| 10,085,701 B2 | 10/2018 | Hoshino |
| 10,141,081 B2 | 11/2018 | Preusche |
| 10,151,713 B2 * | 12/2018 | Wu .......................... G01B 15/08 |
| 10,153,061 B2 | 12/2018 | Yokoyama |
| 10,153,062 B2 | 12/2018 | Gall et al. |
| 10,247,683 B2 | 4/2019 | Yun et al. |
| 10,267,752 B2 | 4/2019 | Zhang et al. |
| 10,267,753 B2 | 4/2019 | Zhang et al. |
| 10,295,485 B2 | 5/2019 | Yun et al. |
| 10,304,580 B2 | 5/2019 | Yun et al. |
| 10,349,908 B2 | 7/2019 | Yun et al. |
| 10,352,695 B2 | 7/2019 | Dziura et al. |
| 10,352,880 B2 | 7/2019 | Yun et al. |
| 10,401,309 B2 | 9/2019 | Yun et al. |
| 10,416,099 B2 | 9/2019 | Yun et al. |
| 10,466,185 B2 | 11/2019 | Yun et al. |
| 10,473,598 B2 | 11/2019 | Ogata et al. |
| 10,485,492 B2 | 11/2019 | Koehler et al. |
| 10,514,345 B2 | 12/2019 | Ogata et al. |
| 10,514,346 B2 | 12/2019 | Sako |
| 10,568,588 B2 | 2/2020 | Koehler et al. |
| 10,578,566 B2 | 3/2020 | Yun et al. |
| 10,634,628 B2 | 4/2020 | Kasper et al. |
| 10,653,376 B2 | 5/2020 | Yun et al. |
| 10,697,902 B2 | 6/2020 | Sharma et al. |
| 10,782,252 B2 | 9/2020 | Gateshki et al. |
| 10,794,845 B2 | 10/2020 | Filsinger |
| 10,895,541 B2 | 1/2021 | Shchegrov et al. |
| 10,962,491 B2 | 3/2021 | Yun et al. |
| 10,976,270 B2 | 4/2021 | Wormington |
| 11,054,375 B2 | 6/2021 | Seidler et al. |
| 11,215,572 B2 | 1/2022 | Yun et al. |
| 2001/0046276 A1 | 11/2001 | Schneider et al. |
| 2002/0150208 A1 * | 10/2002 | Yokhin ...................... G01T 1/36 378/70 |
| 2003/0072413 A1 * | 4/2003 | Yokhin ...................... G01T 1/36 378/89 |
| 2003/0142781 A1 | 7/2003 | Kawahara |
| 2003/0223536 A1 | 12/2003 | Yun et al. |
| 2004/0028186 A1 * | 2/2004 | Yokhin ...................... G01T 1/36 378/70 |
| 2004/0047446 A1 | 3/2004 | Platonov |
| 2005/0087699 A1 * | 4/2005 | Miyake ................... G03F 7/706 250/492.1 |
| 2005/0282300 A1 | 12/2005 | Yun et al. |
| 2006/0062350 A1 | 3/2006 | Yokhin |
| 2006/0088139 A1 * | 4/2006 | Nakano ............ G01N 23/20025 378/79 |
| 2006/0182322 A1 | 8/2006 | Bernhardt et al. |
| 2007/0108387 A1 | 5/2007 | Yun et al. |
| 2007/0183563 A1 | 8/2007 | Baumann |
| 2007/0183579 A1 | 8/2007 | Baumann et al. |
| 2007/0189449 A1 | 8/2007 | Baumann |
| 2007/0248215 A1 | 10/2007 | Ohshima et al. |
| 2007/0285643 A1 * | 12/2007 | Wedowski .......... G03F 7/70958 356/124 |
| 2008/0084966 A1 | 4/2008 | Aoki et al. |
| 2008/0159475 A1 | 7/2008 | Mazor et al. |
| 2008/0170662 A1 | 7/2008 | Reinhold |
| 2008/0181363 A1 | 7/2008 | Fenter et al. |
| 2008/0173662 A1 | 11/2008 | Yun |
| 2009/0052619 A1 | 2/2009 | Endoh |
| 2009/0092227 A1 | 4/2009 | David |
| 2009/0154640 A1 | 6/2009 | Baumann et al. |
| 2009/0316857 A1 | 12/2009 | David et al. |
| 2010/0061508 A1 | 3/2010 | Takahashi |
| 2010/0091947 A1 | 4/2010 | Niu |
| 2010/0246765 A1 | 9/2010 | Murakoshi |
| 2010/0260315 A1 | 10/2010 | Sato et al. |
| 2010/0284513 A1 | 11/2010 | Kawabe |
| 2011/0243302 A1 | 10/2011 | Murakoshi |
| 2011/0268252 A1 | 11/2011 | Ozawa et al. |
| 2012/0041679 A1 | 2/2012 | Stampanoni |
| 2012/0224670 A1 | 9/2012 | Kiyohara et al. |
| 2012/0228475 A1 | 9/2012 | Pang et al. |
| 2013/0011040 A1 | 1/2013 | Kido et al. |
| 2013/0039460 A1 | 2/2013 | Levy |
| 2013/0108012 A1 | 5/2013 | Sato |
| 2013/0108022 A1 | 5/2013 | Kugland et al. |
| 2013/0251100 A1 | 9/2013 | Sasaki et al. |
| 2013/0308112 A1 | 11/2013 | Clube et al. |
| 2014/0023973 A1 | 1/2014 | Marconi et al. |
| 2014/0037052 A1 | 2/2014 | Adler |
| 2014/0064445 A1 | 3/2014 | Adler |
| 2014/0072104 A1 | 3/2014 | Jacobsen et al. |
| 2014/0105353 A1 | 4/2014 | Pfeiffer et al. |
| 2014/0105363 A1 | 4/2014 | Chen et al. |
| 2014/0146945 A1 | 5/2014 | Fredenberg et al. |
| 2014/0153692 A1 | 6/2014 | Larkin et al. |
| 2014/0205057 A1 | 7/2014 | Koehler et al. |
| 2014/0226785 A1 | 8/2014 | Stutman et al. |
| 2014/0270060 A1 | 9/2014 | Date et al. |
| 2015/0030126 A1 | 1/2015 | Radicke |
| 2015/0043713 A1 | 2/2015 | Chen |
| 2015/0049860 A1 | 2/2015 | Das |
| 2015/0051877 A1 | 2/2015 | Bakeman et al. |
| 2015/0055743 A1 | 2/2015 | Vedantham et al. |
| 2015/0055745 A1 | 2/2015 | Holzner et al. |
| 2015/0071402 A1 | 3/2015 | Handa |
| 2015/0117599 A1 | 4/2015 | Yun et al. |
| 2015/0146847 A1 | 5/2015 | Liu |
| 2015/0243397 A1 | 8/2015 | Yun et al. |
| 2015/0247811 A1 | 9/2015 | Yun et al. |
| 2015/0260663 A1 | 9/2015 | Yun et al. |
| 2015/0270023 A1 | 9/2015 | Adler |
| 2015/0323478 A1 | 11/2015 | Stutman |
| 2015/0357069 A1 * | 12/2015 | Yun .................... G01N 23/2076 378/44 |
| 2016/0066870 A1 | 3/2016 | Yun et al. |
| 2016/0091701 A1 | 3/2016 | Raghunathan |
| 2016/0178541 A1 | 6/2016 | Hwang et al. |
| 2016/0206259 A1 | 7/2016 | Auclair et al. |
| 2016/0341674 A1 | 11/2016 | Wu et al. |
| 2017/0038481 A1 | 2/2017 | Cheng et al. |
| 2017/0047191 A1 * | 2/2017 | Yun .......................... G21K 1/06 |
| 2017/0162288 A1 | 6/2017 | Yun et al. |
| 2017/0184520 A1 | 6/2017 | Mortensen et al. |
| 2017/0227476 A1 | 8/2017 | Zhang et al. |
| 2017/0234811 A1 | 8/2017 | Zhang et al. |
| 2017/0261442 A1 | 9/2017 | Yun et al. |
| 2017/0336334 A1 | 11/2017 | Yun et al. |
| 2018/0182131 A1 | 6/2018 | Koehler et al. |
| 2018/0202951 A1 | 7/2018 | Yun et al. |

(56) References Cited

U.S. PATENT DOCUMENTS

| | | |
|---|---|---|
| 2018/0261352 A1 | 9/2018 | Matsuyama et al. |
| 2018/0306734 A1 | 10/2018 | Morimoto et al. |
| 2018/0323032 A1 | 11/2018 | Strelec et al. |
| 2018/0348151 A1 | 12/2018 | Kasper et al. |
| 2019/0011379 A1 | 1/2019 | Yun et al. |
| 2019/0017946 A1 | 1/2019 | Wack et al. |
| 2019/0027265 A1 | 1/2019 | Dey et al. |
| 2019/0064084 A1 | 2/2019 | Ullom et al. |
| 2019/0086342 A1 | 3/2019 | Pois et al. |
| 2019/0115184 A1 | 4/2019 | Zalubovsky |
| 2019/0172681 A1 | 6/2019 | Owen et al. |
| 2019/0204757 A1 | 7/2019 | Brussard et al. |
| 2019/0206652 A1 | 7/2019 | Akinwande et al. |
| 2019/0212281 A1 | 7/2019 | Shchgegrov |
| 2019/0216416 A1 | 7/2019 | Koehler et al. |
| 2019/0219713 A1 | 7/2019 | Booker et al. |
| 2019/0257774 A1 | 8/2019 | Seidler et al. |
| 2019/0261935 A1 | 8/2019 | Kitamura |
| 2019/0302042 A1 | 10/2019 | Yun et al. |
| 2019/0317027 A1 | 10/2019 | Tsuboi et al. |
| 2019/0331616 A1 | 10/2019 | Schaff et al. |
| 2019/0391087 A1 | 12/2019 | Matejka et al. |
| 2020/0003712 A1 | 1/2020 | Kataoka et al. |
| 2020/0041429 A1 | 2/2020 | Cho et al. |
| 2020/0072770 A1* | 3/2020 | Yun .................. G21K 1/06 |
| 2020/0088656 A1 | 3/2020 | Pois et al. |
| 2020/0090826 A1 | 3/2020 | Adler |
| 2020/0103358 A1 | 4/2020 | Wiell et al. |
| 2020/0155088 A1 | 5/2020 | Gruener et al. |
| 2020/0158662 A1 | 5/2020 | Horiba et al. |
| 2020/0182806 A1 | 6/2020 | Kappler et al. |
| 2020/0225172 A1 | 7/2020 | Sato et al. |
| 2020/0225173 A1 | 7/2020 | Sato et al. |
| 2020/0225371 A1 | 7/2020 | Greenberg et al. |
| 2020/0232937 A1 | 7/2020 | Yaroshenko et al. |
| 2020/0279351 A1 | 9/2020 | Ratner et al. |
| 2020/0292475 A1 | 9/2020 | Cao et al. |
| 2020/0300789 A1 | 9/2020 | Osakabe et al. |
| 2020/0300790 A1 | 9/2020 | Gellineau et al. |
| 2020/0303265 A1 | 9/2020 | Gellineau et al. |
| 2020/0319120 A1 | 10/2020 | Kitamura et al. |
| 2020/0337659 A1 | 10/2020 | Sano et al. |
| 2020/0378905 A1 | 12/2020 | Safai |
| 2020/0378908 A1 | 12/2020 | Fujimura et al. |
| 2021/0055237 A1* | 2/2021 | Shchegrov ............ H05G 1/30 |
| 2022/0082515 A1* | 3/2022 | Yun .................. G01N 23/223 |

FOREIGN PATENT DOCUMENTS

| | | | |
|---|---|---|---|
| CN | 101257851 B | | 9/2008 |
| CN | 101532969 B | | 9/2009 |
| CN | 101566591 A | | 10/2009 |
| CN | 101576515 A | | 11/2009 |
| CN | 101413905 A | | 3/2011 |
| CN | 102325498 B | | 1/2012 |
| CN | 102507623 A | | 6/2012 |
| CN | 102551761 A | | 7/2012 |
| CN | 103604818 A | | 2/2014 |
| CN | 104068875 A | | 5/2017 |
| EP | 0751533 | | 1/1997 |
| EP | 1169713 | | 1/2006 |
| JP | H06-188092 | | 7/1994 |
| JP | H07-194592 | | 8/1995 |
| JP | H08-128971 | | 5/1996 |
| JP | H08-184572 | | 7/1996 |
| JP | H11-304728 | | 11/1999 |
| JP | H11-352079 | | 12/1999 |
| JP | 2001-021507 | | 1/2001 |
| JP | 2001124711 A | * | 5/2001 |
| JP | 2003-149392 | | 5/2003 |
| JP | 2006-501444 | | 1/2006 |
| JP | 2007-218683 | | 8/2007 |
| JP | 2008-200359 | | 4/2008 |
| JP | 2008-145111 | | 6/2008 |
| JP | 2008-197495 | | 8/2008 |
| JP | 2009-195349 | | 3/2009 |
| JP | 2010-032341 A | | 2/2010 |
| JP | 2010-236986 | | 10/2010 |
| JP | 2011-033537 | | 2/2011 |
| JP | 2011-095224 | | 5/2011 |
| JP | 2011-218147 | | 11/2011 |
| JP | 2012-032387 | | 2/2012 |
| JP | 2012-187341 | | 10/2012 |
| JP | 2012-254294 | | 12/2012 |
| JP | 2013-508683 | | 3/2013 |
| JP | 2013-096750 | | 5/2013 |
| JP | 2013-113782 | | 6/2013 |
| JP | 2015-529984 | | 7/2013 |
| JP | 2013-181811 | | 9/2013 |
| JP | 2014-178130 | | 9/2014 |
| JP | 2015-047306 | | 3/2015 |
| JP | 2015-072263 | | 4/2015 |
| JP | 2015-077289 | | 4/2015 |
| JP | 2017-040618 | | 2/2017 |
| KR | 10-2004-0072780 | | 8/2004 |
| KR | 10-2006-0088272 A | | 8/2006 |
| KR | 10-2012-0012391 | | 2/2012 |
| KR | 10-2012-0091591 A | | 8/2012 |
| KR | 10-2014-0059688 | | 5/2014 |
| WO | WO 1998/041992 | | 9/1998 |
| WO | WO 2007/125833 | | 11/2007 |
| WO | WO 2008/068044 | | 6/2008 |
| WO | WO 2009/104560 | | 8/2009 |
| WO | WO 2011/032572 | | 3/2011 |
| WO | WO 2012/032950 | | 3/2012 |
| WO | WO 2013/004574 | | 1/2013 |
| WO | WO 2013/111050 | | 8/2013 |
| WO | WO 2013/160153 | | 10/2013 |
| WO | WO 2015/066333 | | 5/2015 |
| WO | WO 2015/168473 | | 11/2015 |
| WO | WO 2015/176023 | | 11/2015 |
| WO | WO 2015/187219 | | 12/2015 |
| WO | WO 2016/187623 | | 11/2016 |
| WO | WO 2017/031740 | | 3/2017 |
| WO | WO 2017/213996 | | 12/2017 |
| WO | WO 2018/122213 | | 7/2018 |
| WO | WO 2018/175570 | | 9/2018 |

OTHER PUBLICATIONS

Holfelder et al., "A double crystal von Hamos spectrometer for traceable x-ray emission spectroscopy," Rev. Sci. Instrum. vol. 92, p. 123105 (2021).

Leatham et al., "X-ray dark-field and phase retrieval without optics, via the Fokker-Planck equation," arXiv:2122.10999v1, physics.med-ph, Dec. 21, 2021.

Seddon-Ferretti et al., "HERMES—a GUI-based software tool for pre-processing of X-ray absorption spectroscopy data from laboratory Rowland circle spectrometers," J. Synch. Rad., vol. 29, https://doi.org/10.1107/S1600577521012583, pp. 1-4 (2022).

Storm et al., "Optimizing the energy bandwidth for transmission full-field X-ray microscopy experiments," J. Synch. Rad., vol. 29, https://doi.org/10.1107/S1600577521011206, pp. 1-10 (2022).

Wilde et al., "Statistical optics modeling of dark-field scattering in X-ray grating interferometers: Part 1. Theory," Op. Express vol. 29, No. 25, p. 40891 (2021).

Wilde et al., "Statistical optics modeling of dark-field scattering in X-ray grating interferometers: Part 2. Simulation," Op. Express vol. 29, No. 25, p. 40917 (2021).

Xiao et al., "TXM-Sandbox: an open-source software for transmission X-ray microscopy data analysis," J. Synch. Rad., vol. 29, https://doi.org/10.1107/S1600877521011978, p. 1-10 (2022).

Xu et al., "Synchrotron radiation computed laminography for polymer composite failure studies," J. Synch. Rad., vol. 17, pp. 222-226 (2010).

International Search Report and Written Opinion for PCT/US2021/071471 dated Dec. 24, 2021.

"High performance benchtop EDXRF spectrometer with Windows®® software," published by: Rigaku Corp., Tokyo, Japan; 2017.

(56) References Cited

OTHER PUBLICATIONS

Altapova et al., "Phase contrast laminography based on Talbot interferometry," Opt. Express, vol. 20, No. 6, (2012) pp. 6496-6508.
Bachucki et al., "Laboratory-based double X-ray spectrometer for simultaneous X-ray emission and X-ray absorption studies," J. Anal. Atomic Spectr. DOI:10.1039/C9JA00159J (2019).
Baron et al., "A compact optical design for Bragg reflections near backscattering," J. Synchrotron Rad., vol. 8 (2001), pp. 1127-1130.
Bauer et al., "Increasing the sensitivity of micro X-ray fluorescence spectroscopy through an optimized adaptation of polycapillary lenses to a liquid metal jet source," J. Anal. At. Spectrom. DOI:10.1039/d1ja00295c (2021).
Bech, "X-ray imaging with a grating interferometer," University of Copenhagen PhD. Thesis, (May 1, 2009).
Bech, "In-vivo dark-field and phase-contrast x-ray imaging," Scientific Reports 3, (2013), Article No. 03209.
Bertaux et al., "Sub-pixel high-resolution imaging of high-energy x-rays inspired by sub-wavelength optical imaging," Op. Express, vol. 29, No. 22-25, p. 35003 (2021).
Birkholz, "Chapter 4: Grazing Incidence Configurations," Thin Film Analysis by X-ray Scattering (Wiley-VCH Verlag GmbH & Co. KGaA, Weinheim, Germany, 2006).
Birnbacher et al., "Quantitative X-ray phase contrast computed tomography with grating interferometry," European J. of Nucl. Med. and Mol. Imaging, https://doi.org/10.1007/s00259-021-05259-6 (2021).
Buchanan et al., "Effective modelling of high-energy laboratory-based x-ray phase contrast imaging utilising absorption masks or gratings," J. Appl. Physics (accepted) (2020).
Chen et al., "Advance in detection of low sulfur content by wavelength dispersive XRF," Proceedings of the Annual ISA Analysis Division Symposium (2002).
Coan et al., "In vivo x-ray phase contrast analyzer-based imaging for longitudinal osteoarthritis studies in guinea pigs," Phys. Med. Biol. vol. 55(24) (2010), pp. 7649-7662.
Cohen et al., "Tunable laboratory extended x-ray absorption fine structure system," Rev. Sci. Instr. Vol. 51, No. 3, Mar. 1980, pp. 273-277.
David et al., "Hard X-ray phase imaging and tomography using a grating interferometer," Spectrochimica Acta Part B vol. 62 (2007) pp. 626-630.
Davis et al., "Bridging the Micro-to-Macro Gap: A New Application for Micro X-Ray Fluorescence," Microsc Microanal., vol. 17(3) (Jun. 2011), pp. 410-417.
Diaz et al., "Monte Carlo Simulation of Scatter Field for Calculation of Contrast of Discs in Synthetic CDMAM Images," In: Digital Mammography, Proceedings 10th International Workshop IWDM 2010 (Springer Verlag, Berlin Heidelberg), (2010), pp. 628-635 (9 pages).
Dibernardo, "Non-disruptive techniques for depth profiling in photoemission spectroscopy," Nature Review Physics, https://doi.org/10.1038/s42254-021-00331-4 (2021).
Dittler et al., "A mail-in and user facility for X-ray absorption near-edge structure: the CEI-XANES laboratory X-ray spectrometer at University of Washington," J. Synch. Rad. vol. 26, eight pages, (2019).
Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).
Du et al., "Removal of artifacts caused by grating imperfections in X-ray phase contrast tomography," J. of Inst. vol. 16, P06039, doi.org/10.1088/1748-0221/16/06/P06039 (2021).
Erko et al., "X-ray Optics," Ch. 3 of "Handbook of Practical X-Ray Fluorescence Analysis," B. Beckhoff et al., eds. (Springer, Berlin, Germany, 2006), pp. 85-198.
Espes et al., "High-resolution X-ray source with advanced e-beam technology: pushing the resolution limitation for lab-scale NanoCT," Micros. Microanal., vol. 27 (Suppl. 1), pp. 1230 (2021).

Fernández-Ruiz, "TXRF Spectrometry as a Powerful Tool for the Study of Metallic Traces in Biological Systems," Development in Analytical Chemistry, vol. 1 (2014), pp. 1-14.
Fisher et al., "Laminography in the lab: imaging planar objects using a conventional x-ray CT scanner," Meas. Sci. Technol., vol. 30, p. 035401 (2019).
Gaur et al., "On the method of calibration of the energy dispersive EXAFS beamline and Indus-2 and fitting theoretical model to the EXAFS spectrmm," Sadhana, vol. 36, No. 3 pp. 3390348 (2011).
Ge et al., "Investigation of the partially coherent effects in a 2D Talbot interferometer," Anal. Bioanal. Chem. vol. 401, (2011), pp. 865-870.
Ghani et al., "A Phase Sensitive X-ray Brest Tomosynthesis System: Preliminary Patient Images with Cancer Legions," Phys. Med. Biol, https://doi.org/10.1088/1361-6560/ac2ea6 (2021.
Graetz et al., "Lenseless C-ray Nano-Tomography down to 150 nm Resolution: On the Quantification of Modulation Transfer and Focal Spot of the Lab-based ntCT System," arXiv:2009.11749v1 [physics.ins-det] Sep. 24, 2020, 10 pages.
Günther et al., "Full-field structured-illumination super-resolution X-ray transmission microscopy," Nature Comm. 10:2494 (2019) and supplementary information.
Gustschin et al., "High resolution and sensitivity bi-directional x-ray phase contrast imaging using 2D Talbot array illuminators," arXiv:2105.07347v1 [physics.med-ph] May 16, 2021.
Harasse et al., "X-ray Phase Laminography with Talbot Interferometer", in Developments in X-Ray Tomography VII, Proc. SPIE vol. 7804 (2010), 780411.
Harasse et al., "Iterative reconstruction in x-ray computed laminography from differential phase measurements", Opt. Express, vol. 19 (2011), pp. 16560-16573.
Harasse et al., "X-ray Phase Laminography with a Grating Interferometer using Iterative Reconstruction", in International Workshop on X-ray and Neutron Phase Imaging with Gratings, AIP Conf, Proc, vol. 1466, (2012), pp. 163-168.
Hashimoto et al., "Improved reconstruction method for phase stepping data with stepping errors and dose fluctuations," Optics Express, vol. 28, No. 11, pp. 16363-16384 (2020).
Hemraj-Benny et al., "Near-Edge X-ray Absorption Fine Structure Spectroscopy as a Tool for Investigating Nanomaterials," Small, vol. 2(1), (2006), pp. 26-35.
Hennekam et al., "Trace metal analysis of sediment cores using a novel X-ray fluorescence core scanning method," Quaternary Infl, https://doi.org/10.1016/j.quaint.2018.10.018 (2018).
Honma et al., Full-automatic XAFS Measurement System of the Engineering Science Research II beamline BL14B2 at Spring-8, 2011, AIP Conference Proceedings 1234, pp. 13-16.
Howard et al., "High-Definition X-ray Fluorescence Elemental Mapping of Paintings," Anal. Chem., 2012, vol. 84(7), pp. 3278-3286.
Ide-Ektessabi et al., "The role of trace metallic elements in neurodegenerative disorders: quantitative analysis using XRF and XANES spectroscopy," Anal. Sci., vol. 21(7) (Jul. 2005), pp. 885-892.
Ishisaka et al., "A New Method of Analyzing Edge Effect in Phase Contrast Imaging with Incoherent X-rays," Optical Review, vol. 7, No. 6, (2000), pp. 566-572.
Ito et al., "A Stable In-Laboratory EXAFS Measurement System," Jap. J. Appl. Phys., vol. 22, No. 2, Feb. 1, 1983, pp. 357-360.
Itoh et al., "Two-dimensional grating-based X-ray phase-contrast imaging using Fourier transform phase retrieval," Op. Express, vol. 19, No. 4 (2011) pp. 3339-3346.
Janssens et al, "Recent trends in quantitative aspects of microscopic X-ray fluorescence analysis," TrAC Trends in Analytical Chemistry 29.6 (Jun. 2010): 464-478.
Jahrman et al., "Vacuum formed temporary spherically and toroidally bent crystal analyzers for x-ray absorption and x-ray emission spectroscopy," Rev. Sci. Inst. vol. 90, 013106 (2019).
Jiang et al., "X-Ray Phase-Contrast Imaging with Three 2D Gratings," Int. J. Biomed. Imaging, (2008), 827152, 8 pages.
Kalasová et al., "Characterization of a laboratory-based X-ray computed nanotomography system for propagation-based method

(56) References Cited

OTHER PUBLICATIONS of phase contrast imaging," IEEE Trans. on Instr. and Meas., DOI 10.1109/TIM.2019.2910338 (2019).
Keyrilainen et al., "Phase contrast X-ray imaging of breast," Acta Radiologica, vol. 51 (8), (2010), pp. 866-884.
Kido et al., "Bone Cartilage Imaging with X-ray Interferometry using a Practical X-ray Tube", in Medical Imaging 2010: Physics of Medical Imaging, Proc. SPIE vol. 7622 (2010), 762240.
Kim, "Talbot images of wavelength-scale amplitude gratings," Opt. Express vol. 20(5), (2012), pp. 4904-4920.
Kim et al., "Observation of the Talbot Effect at Beamline 6C Bio Medical Imaging of the Pohang Light Source-II," J. Korean Phys. Soc., vol. 74, No. 10, pp. 935-940 (May 2019).
Kim et al., "A Simulation Study on the Transfer Characteristics of the Talbot Pattern Through Scintillation Screens in the Grating Interferometer," J. Rad. Sci. and Tech. 42(1), pp. 67-75 (2019).
Kiranjot et al., "Surface and interface characterization of Ru/C/Ru trilayer structure using grazing incidence X-ray reflectivity and X-ray fluorescence," Surf. and Interface Analysis, doi: 10.1002/sia7016 (2021).
Kiyohara et al., "Development of the Talbot-Lau Interferometry System Available for Clinical Use", in International Workshop on X-ray and Neutron Phase Imaging with Gratings, AIP Cong. Proc. vol. 1466, (2012), pp. 97-102.
Klockenkämper et al., "7.1 Instrumental Developments" and "7.3 Future Prospects by Combinations," from Chapter 7 of Total Reflection X-ray Fluorescence Analysis and Related Methods 2nd Ed. (J. Wiley and Sons, Hoboken, NJ, 2015).
Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).
Kottler et al., "A two-directional approach for grating based differential phase contrast imaging using hard x-rays," Opt. Express vol. 15(3), (2007), pp. 1175-1181.
Kottler et al., "Dual energy phase contrast x-ray imaging with Talbot-Lau interferometer," J. Appl. Phys. vol. 108(11), (2010), 114906.
Kulow et al., "On the Way to Full-Field X-ray Fluorescence Spectroscopy Imaging with Coded Apertures," J. Anal. At. Spectrom. Doi: 10.1039/C9JA00232D (2019).
Kuwabara et al., "Hard-X-ray Phase-Difference Microscopy with a Low-Brilliance Laboratory X-ray Source", Appl. Phys. Express vol. 4 (2011) 062502.
Lei et al., "8-inch-diameter field of view for X-ray differential phase-contrast imaging," Nucl. Inst. And Methods in Physics Research A, https://doi.org/10-1016/j.nima.2021.165375 (2021).
Li et al., "X-ray phase-contrast imaging using cascade Talbot-Lau interferometers," Proc. SPIE 10964 (2018), pp. 1096469-1-1096469-6.
Lin et al., "Quasi-Monte Carlo method for calculating X-ray scatter in CT," Op. Express, vol. 29, No. 9, p. 13746 (2021).
Lohmann et al., "An interferometer based on the Talbot effect," Optics Communications vol. 2 (1971), pp. 413-415.
Lübcke et al., "Soft X-ray nanoscale imaging using a sub-pixel resolution charge coupled device (CCD) camera," Rev. Sci. Instrum. vol. 90, 043111 (2019).
Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879, (2019).
Malzer et al., "A laboratory spectrometer for high throughput X-ray emission spectroscopy in catalysis research," Rev. Sci. Inst. 89, 113111 (2018).
Mamyrbayev et al., "Staircase array of inclined refractive multilenses for large field of view pixel super-resolution scanning transmission hard X-ray microscopy," J. Synch. Rad., vol. 28 https://doi.org/10.1107/S1600577521001521 (2021).
Matsuyama et al., "Wavefront measurement for a hard-X-ray nanobeam using single-grating interferometry", Opt Express vol. 20 (2012), pp. 24977-24986.

Menzies et al., "Dual source X-ray and electron SEM system: Elemental mapping of an Epithermal gold-bearing sample from Karangahake, New Zealand," Microsc. Microanal., vol. 27 (Suppl. 1), pp. 456 (2021).
Miao et al., "Motionless phase stepping in X-ray phase contrast imaging with a compact source," Proceedings of the National Academy of Sciences, vol. 110(48), (2013), pp. 19268-19272.
Mijovilovich et al., "Analysis of trace metal distribution in plants with lab-based microscopic X-ray fluorescence imaging," Plant Methods, vol. 16, No. 82, 21 pages (2020).
Mizutani et al., X-ray microscopy for neural circuit reconstruction in 9th International Conference on X-Ray Microscopy, J. Phys: Conf. Ser. 186 (2009) 012092.
Modregger et al., "Grating-Based X-ray Phase Contrast Imaging," Ch. 3 of Emerging Imaging Technologies in Medicine, M. Anastasio & P. La Riviere, ed., CRC Press, Boca Raton, FL, (2012), pp. 43-56.
Momose et al., "Phase-Contrast X-Ray Imaging Using an X-Ray Interferometer for Biological Imaging", Analytical Sciences vol. 17 Supplement (2001), pp. i527-i530.
Momose et al., "Demonstration of X-Ray Talbot Interferometry", Jpn. J. Appl. Phys. vol. 42 (2003), pp. L866-L868.
Momose et al., "Phase Tomography Using an X-ray Talbot Interferometer", in Developments in X-Ray Tomography IV, Proc. SPIE vol. 5535 (2004), pp. 352-360.
Momose, "Recent Advances in X-ray Phase Imaging", Jpn. J. Appl. Phys. vol. 44 (2005), pp. 6355-6367.
Momose et al., "Biomedical Imaging by Talbot-Type X-Ray Phase Tomography" in Developments in X-Ray Tomography V, Proc. SPIE vol. 6318 (2006) 63180T.
Momose et al., "Phase Tomography by X-ray Talbot Interferometry for Biological Imaging" Jpn. J. Appl. Phys. Vol. 45 2006 pp. 5254-5262.
Momose et al., "X-ray Talbot Interferometry with Capillary Plates", Jpn. J. Appl. Phys. vol. 45 (2006), pp. 314-316.
Momose et al., "Phase Imaging with an X-ray Talbot Interferometer", Advances in X-ray Analysis vol. 49(3) (2006), pp. 21-30.
Momose et al., "Phase Tomography Using X-ray Talbot Interferometer", in Synchrotron Radiation Instrumentation: Ninth International Conference, AIP Conf. Proc. vol. 879 (2007), pp. 1365-1368.
Momose et al., "Sensitivity of X-ray Phase Imaging Based on Talbot Interferometry", Jpn. J. Appl. Phys. vol. 47 (2008), pp. 8077-8080.
Momose et al., "Grating-Based X-ray Phase Imaging Using Multiline X-ray Source", Jpn. J. Appl. Phys. vol. 48 (2009), 076512.
Momose et al., "X-ray phase tomography with a Talbot interferometer in combination with an X-ray imaging microscope", in 9th International Conference on X-Ray Microscopy, J. Phys: Conf. Ser. 186 (2009)012044.
Momose et al., "High-speed X-ray phase imaging and X-ray phase tomography with Talbot interferometer and white synchrotron radiation", Opt. Express vol. 17 (2009), pp. 12540-12545.
Momose et al., "X-Ray Phase Imaging with Talbot Interferometry", in "Biomedical Mathematics: Promising Directions in Imaging, Therapy Planning, and Inverse Problems", Y. Censor, M. Jiang & G.Wang, eds. (Medical Physics Publishing, Madison, Wi, USA, 2010), pp. 281-320.
Momose et al., "X-ray Phase Measurements with Talbot Interferometry and Its Applications", in International Conference on Advanced Phase Measurement Methods in Optics and Imaging, AIP Conf. Proc, vol. 1236 (2010), pp. 195-199.
Momose et al., "X-ray Phase Imaging Using Lan Effect", Appl. Phys. Express vol. 4 (2011) 066603.
Momose et al., "Four-dimensional X-ray phase tomography with Talbot interferometry and white synchrotron radiation: dynamic observation of a living worm", Opt. Express vol. 19 (2011), pp. 8423-8432.
Momose et al., "X-ray Phase Imaging—From Static Observation to Dynamic Observation—", in International Workshop on X-ray and Neutron Phase Imaging with Gratings AIP Conf. Proc. vol. 1466, (2012), pp. 67-77.
Momose et al., "Recent Progress in X-ray and Neutron Phase Imaging with Gratings," Quantum Beam Science, vol. 4, No. 9; doi:10.3390/qubs4010009 (2020).

(56) References Cited

OTHER PUBLICATIONS

Morimoto et al., "X-ray phase contrast imaging by compact Talbot-Lau interferometer with a signal transmission grating," 2014, Optics Letters, vol. 39, No. 15, pp. 4297-4300.
Morimoto et al., "Design and demonstration of phase gratings for 2D single grating interferometer," Optics Express vol. 23, No. 23, 29399 (2015).
Munro et al., Design of a novel phase contrast imaging system for mammography, 2010, Physics in Medicine and Biology, vol. 55, No. 14, pp. 4169-4185.
Nango et al., "Talbot-defocus multiscan tomography using the synchrotron X-ray microscope to study the lacuno-canalicular network in mouse bone", Biomed. Opt. Express vol. 4 (2013), pp. 917-923.
Neuhausler et al., "Non-destructive high-resolution X-ray imaging of ULSI micro-electronics using keV X-ray microscopy in Zernike phase contrast," Microelectronic Engineering, Elsevier Publishers BV., Amsterdam, No. vol. 83, No. 4-9 (Apr. 1, 2006) pp. 1043-1046.
Nemeth et al., "Laboratory von Hamos X-ray Spectroscopy for Routine Sample Characterization," arvix:1607.08045v1 (2016).
Newville, "Fundamentals of XAFS," (Univ. of Chicago, Chicago, IL, Jul. 23, 2004).
Nykanen et al., "X-ray scattering in full-field digital mammography," Med. Phys. vol. 30(7), (2003), pp. 1864-1873.
O'Brien et al., "Recent Advances in X-ray Cone-beam Computed Laminography," J. X-ray Sci. and Tech., vol. 24, No. 5, pp. 691-707 (2016).
Ohba et al., "Laboratory-size x-ray microscope using Wolter mirror optics and an electron-impact x-ray source," Rev. Sci. Inst. 92, 093704 (2021).
Oji et al., Automatic XAFS measurement system developed at BL14B2 in SPring-8, Available online Nov. 15, 2011, Journal of Synchrotron Radiation, vol. 19, pp. 54-59.
Olbinado et al., "Demonstration of Stroboscopic X-ray Talbot Interferometry Using Polychromatic Synchrotron and Laboratory X-ray Sources", Appl. Phys. Express vol. 6 (2013), 096601.
Ortega et al., "Bio-metals imaging and speciation in cells using proton and synchrotron radiation X-ray microspectroscopy," J. Royal Society Interface vol. 6 suppl. 5 (Oct. 6, 2009), pp. 6S649-58.
Pandeshwar et al., "Modeling of beam hardening effects in a dual-phase X-ray grading interferometer for quantitative dark-field imaging," Optics Express, vol. 28, No. 13, Jun. 22, 2020, pp. 19187-19204 (2020).
Parrill et al., "GISAXS—Glancing Incidence Small Angle X-ray Scattering," Journal de Physique IV, vol. 3 (Dec. 1993), pp. 411-417.
Paunesku et al., "X-Ray Fluorescence Microprobe Imaging in Biology and Medicine," J. Cell. Biochem. vol. 99, pp. 1489-1502 (2006).
Pfeiffer et al., "Phase retrieval and differential phase-contrast imaging with low-brilliance X-ray sources," Nature Physics vol. 2, (2006), pp. 258-261.
Pfeiffer et al., "Hard x-ray phase tomography with low brilliance x-ray sources," Phys. Rev. Lett. vol. 98, (2007), 108105.
Pfeiffer et al.," Hard-X-ray dark-field imaging using a grating interferometer," Nature Materials vol. 7, (2008), pp. 134-137.
Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.
Pianetta et al., "Application of synchrotron radiation to TXRF analysis of metal contamination on silicon wafer surfaces," Thin Solid Films, vol. 373(1-2), 2000, pp. 222-226.
Potts, "Electron Probe Microanalysis", Ch. 10 of "A Handbook of Silicate Rock Analysis" (Springer Science + Business Media, New York, 1987), pp. 326-382 (equation quoted from p. 336).
Prewitt et al., "Focused ion beam repair: staining of photomasks and reticles," J. Phys. D Appl. Phys. vol. 26 (1993), pp. 1135-1137.
Prewitt et al., "Gallium Staining in FIB Repair of Photomasks," Microelectronic Engineering, vol. 21 (1993), pp. 191-196.
Prewitt et al., "FIB Repair of 5X Reticles and Effects on IC Quality," Integrated Circuit Metrology, Inspection, and Process Control VII, Proc. SPIE vol. 1926 (1993), pp. 517-526.
Pushie et al., "Prion protein expression level alters regional copper, iron and zinc content in the mouse brain," Metallomics vol. 3, 206-214 (2011).
Pushie et al., "Elemental and Chemically Specific X-ray Fluorescence Imaging of Biological Systems," Chem. Rev. 114:17, 8499-8541 (2014).
Qiao et al., "Single-shot x-ray phase-contrast and dark-field imaging based on coded binary phase mask," Appl. Phys. Lett. 119, 011105 (2021).
Qin et al., "Trace metal imaging with high spatial resolution: Applications in biomedicine," Metallomics, vol. 3 (Jan. 2011), pp. 28-37.
Redus et al., "Spectrometer configuration and measurement uncertainty in X-ray spectroscopy," X-Ray Spectrom., pp. 1-14 (2020).
Renaud et al., "Probing surface and interface morphology with Grazing Incidence Small Angle X-ray Scattering," Surface Science Reports, vol. 64:8 (2009), pp. 255-380.
Rix et al., "Super-Resolution X-ray phase-contrast and dark-field imaging with a single 2D grating and electromagnetic source stepping," Phys. Med. Biol. In press https://doi.org/10.1088/1361-6560/ab2ff5 (2019).
Rutishauser, "X-ray grating interferometry for imaging and metrology," 2003, Eth Zurich, Diss. ETH No. 20939.
Sato et al., Two-dimensional gratings-based phase-contrast imaging using a conventional x-ray tube, 2011, Optics Letters, vol. 36, No. 18, pp. 3551-3553.
Scherer et al., "Bi-Directional X-Ray Phase-Contrast Mammography," PLoS ONE, vol. 9, Issue 5 (May 2014) e93502.
Scholze et al., "X-ray Detectors and XRF Detection Channels," Ch. 4 of "Handbook of Practical X-Ray Fluorescence Analysis," B. Beckhoff et al., eds. (Springer, Berlin Heidelberg, Germany, 2006), pp. 85-198.
Schunck et al., "Soft x-ray imaging spectroscopy with micrometer resolution," Optica vol. 8, No. 2, pp. 156-160 (2021).
Seifert et al., "Talbot-Lau x-ray phase-contrast setup for fast scanning of large samples," Sci. Rep. 9:4199, pp. 1-11 (2019).
Shi et al., "Laboratory X-ray interferometry imaging with a fan-shaped source grating," Optics Lett., doi.org/10.1364/OL.426867 (2021).
Shimura et al., "Hard x-ray phase contrast imaging using a tabletop Talbot-Lau interferometer with multiline embedded x-ray targets", Opt. Lett. vol. 38(2) (2013), pp. 157-159.
Sparks Jr., "X-ray Fluorescence Microprobe for Chemical Analysis," in Synchrotron Radiation Research, H. Winick & S. Doniach, eds. (Plenum Press, New York, NY 1980), pp. 459-512.
Stampanoni et al., "The First Analysis and Clinical Evaluation of Native Breast Tissue Using Differential Phase-Contrast Mammography," Investigative Radiology, vol. 46, pp. 801-806. pub 2011-12-xx.
Streli et al., "Micro-X-ray fluorescence spectroscopy," Chapter I.9.f of "Imaging Modalities for Biological and Preclinical Research: A compendium, vol. 1, Part I: Ex vivo biological imaging," Ed. Walter et al., 8 pages, doi:10.1088/978-0-7503-3059-6ch42 (2021).
Sunday et al., "X-ray Metrology for the Semiconductor Industry Tutorial," J. Res. Nat'l Inst. Stan. vol. 124: 124003 (2019); https://doi.org/10.6028/jres.124.003.
Takeda et al., "X-Ray Phase Imaging with Single Phase Grating", Jpn. J. Appl. Phys. vol. 46 (2007), pp. L89-L91.
Takeda et al., "Differential Phase X-ray Imaging Microscopy with X-ray Talbot Interferometer" Appl. Phys. Express vol. 1 (2008) 117002.
Talbot, "Facts relating to optical science No. IV," Philos. Mag. vol. 9 (1836), pp. 401-407.
Tanaka et al., "Cadaveric and in vivo human joint imaging based on differential phase contrast by X-ray Talbot-Lan interferometry", Z. Med. Phys. vol. 23 (2013), pp. 222-227.
Tao et al., "Factors Affecting the Spatial Resolution in 2D Grating-Based X-Ray Phase Contrast Imaging," Frontiers in Physics, doi: 10.3389/fphy.2021.672207 (2021).

(56) References Cited

OTHER PUBLICATIONS

Taphorn et al., "Grating-based spectral X-ray dark-field imaging for correlation with structural size measures," Sci. Reports, vol. 10, 13195 (2020).
Tetef et al., "Unsupervised Machine Learning for Unbiased Chemical Classification in X-ray Absorption Spectroscopy and X-ray Emission Spectroscopy," Royal Soc. of Chem. Doi: 10.33774/chemrxiv-2021-5tvrv (2021).
Terzano et al., Recent advances in analysis of trace elements in environmental samples by X-ray based techniques (IUPAC Technical Report), Pure Appl. Chem. 2019.
Titus et al., "Advancing the in-situ characterization of light elements via X-ray absorption spectroscopy using superconducting detectors," Microsc. Microanal., vol. 27, (Suppl. 1), pp. 2890 (2021).
Tkachuk et al., "High-resolution x-ray tomography using laboratory sources", in Developments in X-Ray Tomography V, Proc. SPIE 6318 (2006): 631810.
Tkachuk et al., "Multi-length scale x-ray tomography using laboratory and synchrotron sources", Microsc. Microanal. vol. 13 (Suppl. 2) (2007), pp. 1570-1571.
Töpperwien et al., "Multiscale x-ray phase-contrast tomography in a mouse model of transient focal cerebral ischemia," Biomed. Op. Express, vol. 10, No. 1, Jan. 2019, pp. 92-103.
Tsuji et al., "X-Ray Spectrometry: Recent Technological Advances," John Wiley & Sons Ltd. Chichester, West Susses, UK 2004), Chapters 1-7.
Udagawa, "An Introduction to In-House EXAFS Facilities," The Rigaku Journal, vol. 6, (1) (1989), pp. 20-27.
Udagawa, "An Introduction to X-ray Absorption Fine Structure," The Rigaku Journal, vol. 11(2)(1994),pp. 30-39.
Uehara et al., "Effectiveness of X-ray grating interferometry for non-destructive inspection of packaged devices", J. Appl. Phys. vol. 114 (2013), 134901.
Viermetz et al., "High resolution laboratory grating-based X-ray phase-contrast CT," Scientific Reports 8:15884 (2018).
Vila-Comamala et al., "High sensitivity X-ray phase contrast imaging by laboratory gratingbased interferometry at high Talbot order geometry," Op. Express vol. 29, No. 2, pp. 2049-2064 (2021).
Vogt, "X-ray Fluorescence Microscopy: A Tool for Biology, Life Science and Nanomedicine," Presentation on May 16, 2012 at James Madison Univ., Harrisonburg, VA (31 slides), 2012.
Wan et al.,"Fabrication of Multiple Slit Using Stacked-Sliced Method for Hard X-ray Talbot—Lan Interferometer", Jpn. J. Appl. Phys. vol. 47 (2008), pp. 7412-7414.
Wang et al., "Advantages of intermediate X-ray energies in Zemike phase contrast X-ray microscopy," Biotech. Adv., vol. 31 (2013) pp. 387-392.
Weitkamp et al., "Hard X-ray phase imaging and tomography with a grating interferometer," Proc. SPIE vol. 5535, (2004), pp. 137-142.
Weitkamp et al., "X-ray phase imaging with a grating interferometer," Opt. Express vol. 13(16), (2005), pp. 6296-6304.
Weitkamp et al., "X-ray wavefront analysis and optics characterization with a grating interferometer," Appl. Phys. Lett. vol. 86, (2005), 054101.
Weitkamp et al., Tomography with grating interferometers at low-brilliance sources, 2006, SPIE, vol. 6318, pp. 0S-1 to 0S-10.
Weitkamp et al., "X-ray wavefront diagnostics with Talbot interferometers," International Workshop on X-Ray Diagnostics and Scientific Application of the European XFEL, Ryn, Poland, (2010), 36 slides.
Weitkamp et al., "Design aspects of X-ray grating interferometry," in International Workshop on X-ray and Neutron Phase Imaging with Gratings AIP Conf. Proc. vol. 1466, (2012), pp. 84-89.
Wen et al., "Fourier X-ray Scattering Radiography Yields Bone Structural Information," Radiology, vol. 251 (2009) pp. 910-918.
Wen et al., "Single-shot x-ray differential phase-contrast and diffraction imaging using two-dimensional transmission gratings," Op. Lett. vol. 35, No. 12, (2010) pp. 1932-1934.

Wilde et al., "Modeling of an X-ray grating-based imaging interferometer using ray tracing," Op. Express vol. 28, No. 17, p. 24657 (2020).
Withers et al., "X-ray computed tomography," Nature Reviews Methods Primers, vol. 1, No. 18, pp. 1-21 (2021).
Witte et al., "From 2D STXM to 3D Imaging: Soft X-ray Laminography of Thin Specimens," Nano Lett. vol. 20, pp. 1305-1314 (2020).
Wittry et al., "Properties of fixed-position Bragg diffractors for parallel detection of x-ray spectra," Rev. Sci. Instr. vol. 64, pp. 2195-2200 (1993).
Wobrauschek et al., "Micro XRF of light elements using a polycapillary lens and an ultra-thin window Silicon Drift Detector inside a vacuum chamber," 2005, International Centre for Diffraction Data 2005, Advances in X-ray Analysis, vol. 48, pp. 229-235.
Wobrauschek et al., "Energy Dispersive, X-Ray Fluorescence Analysis," Encyclopedia of Analytical Chemistry, R.A. Meyers, Ed. (Wiley 2010).
Xu et al., "Comparison of image quality in computed laminography and tomography," Op. Express, vol. 20, No. 2, pp. 794-806 (2012).
Yamada et al., "Compact full-field hard x-ray microscope based on advanced Kirkpatrick-Baez mirrors," Optica, vol. 7, No. 4 pp. 367-370 (2020).
Yashiro et al., "Optimal Design of Transmission Grating for X-ray Talbot Interferometer", Advances in X-ray Analysis vol. 49(3) (2006), pp. 375-379.
Yashiro et al., "Efficiency of capturing a phase image using cone-beam x-ray Talbot interferometry", J. Opt. Soc. Am. A vol. 25 (2008), pp. 2025-2039.
Yashiro et al., "Hard-X-Ray Phase-Difference Microscopy Using a Fresnel Zone Plate and a Transmission Grating", Phys. Rev. Lett. vol. 103 (2009), 180801.
Yashiro et al., "Hard x-ray phase-imaging microscopy using the self-imaging phenomenon of a transmission grating", Phys. Rev. A vol. 82 (2010), 043822.
Yashiro et al., "On the origin of visibility contrast in x-ray Talbot interferometry", Opt. Express (2010), pp. 16890-16901.
Yashiro et al., "X-ray Phase Imaging Microscopy using a Fresnel Zone Plate and a Transmission Grating", in The 10th International Conference on Synchrotron Radiation Instrumentation, AIP Conf. Proc, vol. 1234 (2010), pp. 473-476.
Yashiro et al., "Distribution of unresolvable anisotropic micro structures revealed invisibilitycontrast images using x-ray Talbot interferometry", Phys. Rev. B vol. 84 (2011), 094106.
Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.
Yashiro et al., "Theoretical Aspect of X-ray Phase Microscopy with Transmission Gratings" in International Workshop on X-ray and Neutron Phase Imaging with Gratings, AIP Conf. Proc. vol. 1466, (2012), pp. 144-149.
Yoshioka et al., "Imaging evaluation of the cartilage in rheumatoid arthritis patients with an x-ray phase imaging apparatus based on Talbot-Lau interferometry," Scientific Reports, 10:6561, https://doi.org/10.1038/s41598-020-63155-9 (2020).
Zan et al., "High-resolution multicontrast tomography with an X-ray microarray anode-structured target source," PNAS, doi.org10.1073/pnas.2103126118 (2021).
Zanette et al., "Two-Dimensional X-Ray Grating interferometer," Phys. Rev. Lett. vol. 105 (2010) pp. 248102-1 248102-4.
Zeeshan et al., "In-house setup for laboratory-based x-ray absorption fine structure spectroscopy measurements," Rev. Sci. Inst. 90, 073105 (2019).
Zeng et al., "Glass Monocapillary X-ray Optics and Their Applications in X-Ray Microscopy," X-ray Optics and Microanalysis: Proceedings of the 20th International Congress, AIP Conf. Proc. Vol. 1221, (2010), pp. 41-47.
Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.

(56) References Cited

OTHER PUBLICATIONS

Zhang et al., "Measurement of the inner diameter of monocapillary with confocal X-ray scattering technology based on capillary X-ray optics," Appl. Opt. (Jan. 8, 2019), doc ID 351489, pp. 1-10.

Zhou et al., "X-ray wavefront characterization with grating interferometry using an x-ray microfocus laboratory source," Proceedings, vol. 11492, Advances in Metrology for X-Ray and EUV Optics IX; 114920Q, https://doi.org/10.1117/12.2576152 (2020).

Feng et al., "Reduction of Compton Background Noise for X-ray Fluorescence Computed Tomography with Deep Learning," Photonics, vol. 9, p. 108 (2022).

Hirano et al., "X-ray zooming optics for analyzer-based multi-contrast computed tomography," J. Synch. Rad. vol. 29, https://doi.org/10.1107/S1600577522001412 (2022).

Holberg et al., "High-Resolution Table-Top NEXAFS Spectroscopy," Anal. Chem. https://10.1021/acs.analchem.1c04374 (2022).

Khan et al., "Recent Trends in Applications of X-ray Photoelectron Spectroscopy (XPS) Technique in Coatings for Corrosion Protection," Chapter of "Recent Developments in Analytical Techniques for Corrosion Research," I. Toor (ed.), Springer Nature Switzerland AG https://doi.org/10.1007/978-3-030-89101-5_8 (2022).

Longo et al., "Flexible Plenoptic X-ray Microscopy," Photonics, vol. 9, p. 98 (2022).

Okolo, "A guide into the world of high-resolution 3D imaging: the case of soft X-ray tomography for the life sciences," Biochem. Soc. Trans., https://doi.org/10.1042/BST20210886 (2002).

Tessarini et al., "Semi-classical Monte Carlo algorithm for the simulation of X-ray grating interferometry," Sci. Rep. vol. 12, p. 2485 (2022).

Zhu et al., "Optical Wafer Defect Inspection at the 10 nm Technology Node and Beyond," 2022 Int. Extrem. Manuf. In press https://doi.org/10.1088/2631-7990/ac64d7 (2022).

* cited by examiner (i) (ii)

SYSTEM AND METHOD USING X-RAYS FOR DEPTH-RESOLVING METROLOGY AND ANALYSIS

CLAIM OF PRIORITY

This application claims the benefit of priority claim to U.S. Provisional Appl. No. 63/079,940 filed on Sep. 17, 2020, which is incorporated in its entirety by reference herein.

BACKGROUND

Field

This application relates generally to systems and methods for analyzing samples using x-ray reflectometry, x-ray fluorescence, and/or x-ray photoemission spectroscopy.

Description of the Related Art

Physical limitations to scaling have naturally driven the semiconductor industry toward 3D architectures, which often include multistack layers of nanometer thicknesses comprising a multitude of materials. Examples include gate all around (GAA) field effect transistors, 3D NAND memory devices, and magnetoresistive random-access memory. Manufacturing these devices involves many processing steps, including thin film and film stack deposition, doping, etching, and chemical-mechanical polishing.

Dimensional and/or material metrology of as-manufactured devices is used both during research and development and for inspection (e.g., process monitoring between many of the processing steps to ensure as manufactured devices are within acceptable parameter or process windows). Typical parameters of interest include film structural dimensions (e.g., film thicknesses), distribution of element(s) or specific material(s), dopant concentration, element composition, chemical speciation, and other parameters. For 3D architectures, depth resolution (e.g., spatial resolution normal to the surface of a wafer) of 2 nm or better can be desirable.

One emerging example of novel 3D semiconductor architectures is that of Gate All Around (GAA) devices, which include nanosheets and nanowires. Information desired for process monitoring and metrology during manufacturing includes: structural information of the initial superlattice (e.g., thickness of the Si nanosheet and SiGe layers), residue of sacrificial nanosheet layer after removal, silicon oxide formation, and parameters related to the gate dielectric layer. Parameters related to the gate dielectric layer include the depth-wise dielectric thickness around each nanosheet, variation of the difference between thicknesses of the dielectric at the top and bottom of the nanosheet, variation of dopants (used to tune work function) at each layer of dielectric, and dopant diffusion.

The 3D architectures are challenging conventional approaches to metrology and inspection. Characterization techniques using incident x-rays offer unique advantages because they do not require destructive sample preparation and can provide penetration to detect structures beneath the surface. X-ray reflectivity (XRR) is a useful technique to characterize surfaces and interfaces including their roughness and diffuseness of buried layers and the thickness of single layer and multilayer stacks with a sub-nanometer resolution.

An XRR curve is largely determined by the electron density distribution along the surface normal of the sample and lacks elemental and material specificity. Structure determination by XRR on its own is an ill-posed inverse problem, as different sets of parameters including thicknesses, interface roughness, different material compositions and mass densities may result in the same XRR curve, especially for XRR with low signal to noise ratio due to various factors, such as short data collection time limited by throughput requirements in some applications.

SUMMARY

In one aspect disclosed herein, a method for analyzing a three-dimensional structure of a sample is provided. The method comprises generating a first x-ray beam having a first energy bandwidth less than 20 eV at full-width-at-half maximum and a first mean x-ray energy that is in a range of 1 eV to 1 keV (e.g., a range of 1 eV to 5 eV) higher than a first absorption edge energy of a first atomic element of interest. The first x-ray beam is collimated to have a first collimation angular range less than 7 mrad in at least one direction perpendicular to a first propagation direction of the first x-ray beam. The method further comprises irradiating the sample with the first x-ray beam at a plurality of incidence angles relative to a substantially flat surface of the sample. The incidence angles of the plurality of incidence angles are in a range of 3 mrad to 400 mrad. The method further comprises simultaneously detecting a reflected portion of the first x-ray beam from the sample and detecting x-ray fluorescence x-rays and/or photoelectrons from the sample.

In another aspect disclosed herein, a method for analyzing a layered structure comprising substantially parallel interfaces is provided. The method comprises irradiating the layered structure with an incident x-ray beam at one or more incidence angles in a range of 3 mrad to 400 mrad relative to the substantially parallel interfaces. The incident x-ray beam has an energy bandwidth less than 20 eV at full-width-at-half maximum and a mean x-ray energy that is in a range of 1 eV to 1 keV (e.g., a range of 1 eV to 5 eV) higher than an absorption edge energy of an atomic element of interest. The incident x-ray beam has sufficient coherence to produce x-ray intensity modulation inside the layered structure through constructive and destructive interference of the incident x-ray beam and x-rays of the incident x-ray beam reflected by the substantially parallel interfaces of the layered structure. The method further comprises simultaneously detecting at least some of the x-rays reflected by the substantially parallel interfaces and detecting x-ray fluorescence x-rays and/or photoelectrons from the layered structure.

In another aspect disclosed herein, a system for analyzing a three-dimensional structure of a sample is provided. The system comprises at least one x-ray source configured to generate at least one x-ray beam having an energy bandwidth less than 20 eV at full-width-at-half maximum and a mean x-ray energy that is in a range of 1 eV to 1 keV higher than an absorption edge energy of an atomic element of interest. The at least one x-ray beam is collimated to have a collimation angular range less than 7 mrad in at least one direction perpendicular to a propagation direction of the at least one x-ray beam. The at least one x-ray source is further configured to direct the at least one x-ray beam to irradiate the sample at a plurality of incidence angles relative to a substantially flat surface of the sample. The incidence angles of the plurality of incidence angles are in a range of 3 mrad to 400 mrad. The system further comprises at least one first detector configured to detect a reflected portion of the at least one x-ray beam from the sample. The system further comprises at least one second detector configured to detect x-ray fluorescence x-rays and/or photoelectrons from the sample simultaneously with the at least one first detector detecting the reflected portion of the at least one x-ray beam.

DETAILED DESCRIPTION

Figure 1:
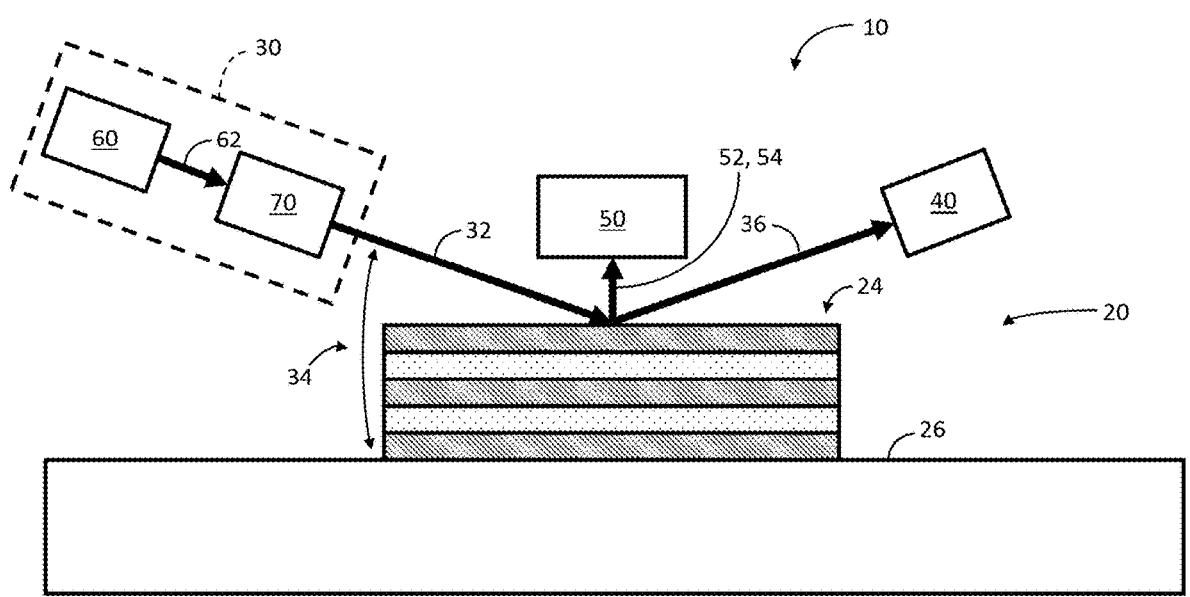
FIG. 1 schematically illustrates an example system for XRR and XRF and/or XPS from a sample to be analyzed in accordance with certain implementations described herein.

To add element specificity, collecting an x-ray photoelectron spectrum (XPS) and an x-ray fluorescence signal (XRF) together with XRR to obtain element(s) and material(s) information have been disclosed previously (see, e.g., Wu et al., U.S. Pat. No. 10,151,713). However, such previous systems had various limitations that were not adequately addressed. For example, the inelastic mean free path (IMFP) of XPS photoelectrons is generally independent from the material being analyzed, varies as a function of the kinetic energies E of the photoelectrons (e.g., being empirically proportional to $E^{0.78}$ for E greater than 100 eV), and is typically less than 10 nm. The IMFP leads to substantial attenuation of the photoelectrons as they propagate from their points of production to the surface of the object and hence results in poor signal for photoelectrons from element(s) of interest located deeper than 10 nm from the surface. XRF can provide elemental specificity without the substantial attenuation experienced by XPS, but previous techniques used incident x-rays with energies that were too low to excite the XRF of many important elements (e.g., Wu et al. used an Al x-ray source of 1.5 keV x-rays). Multiple energy excitations can be used to generate photoelectrons of different selected energies and different selected IMFPs and/or refractive indices in the sample, so as to tune the photoelectron IMFP, photoelectron emission angle, and/or refractive index as desired.

For another example limitation, the XRF signal of previous techniques is generally weak for many element(s) of interest in semiconductor front end device fabrications due to their small quantities (e.g., dopants, gate dielectrics such as $HfO_2$, single digit nm-thick layers, and etching residuals). Moreover, these small quantities are located in a small analysis area/volume, further reducing the signal. Because of the low XRF signal, using the x-ray sources with multiple x-ray generating materials as described herein, the incident x-ray energy can be selected and used to select the characteristic fluorescence x-rays of the elements(s) of interest because XRF signal production efficiency is highly dependent on the excitation x-ray energy and is maximized when the x-ray energy is slightly higher than an absorption edge of the element (e.g., characteristic x-ray production efficiency decreases with the cube of the value of the excitation x-ray energy minus the absorption edge energy). In addition, XRF signals from substrate materials can lead to large background contributions that can obscure the XRF signals from elements having characteristic x-ray energies less than the substrate, e.g., strong Si substrate signals can diminish the signal-to-noise ratio (SNR) of M-lines of Hf and La as the elements of interest. Selecting the incident x-ray energy, by using the x-ray sources with multiple x-ray generating materials as described herein, to be less than the Si K absorption edge energy (e.g., SiC) can be used to provide improved SNR of such lines.

For another example limitation, standard XRR measurements (both alone or in combination with other techniques such as XPS and/or XRF) can be performed by acquiring data at many small angular steps (e.g., over a reasonably wide angular range). These XRR measurements utilize long data collection times to obtain acceptable data quality, and thus can be too slow to meet the desired process monitoring speed for semiconductor device manufacturing.

These limitations have not been adequately addressed by previous XRR techniques which were performed at very low incidence angles measured relative to the sample surface and which, as a result, did not focus the incident x-ray beam onto a semiconductor test pattern (e.g., ranging from 40 microns by 40 microns to 40 microns by 300 microns). In addition, previous XRR techniques utilized a filter and/or monochromatic x-ray optic (e.g., multilayer or single crystal) to monochromatize the incident x-rays for XRR, which reduced the flux from laboratory x-ray sources.

FIG. 1 schematically illustrates an example system 10 for XRR and XRF and/or XPS from a sample 20 to be analyzed in accordance with certain implementations described herein. The system 10 can be configured for performing methods of metrology and/or inspection of at least a portion of the sample 20 as described herein. For example, the sample 20 can comprise a substrate 22 (e.g., silicon wafer) and a plurality of layered material structures 24 (e.g., nanosheet transistors) on a substantially flat surface 26 of the sample 20. In certain implementations, the XRR divergence can be less than 10 mrad, less than 5 mrad, and/or less than 3 mrad, and the depth-wise measurement sensitivity can be 0.1 nm or less for a given atomic element of interest (e.g., an atomic element to be detected within the portion of the sample 20).

In certain implementations, the example system 10 comprises an x-ray source 30 configured to generate a first x-ray beam 32. The first x-ray beam 32 has a first energy bandwidth less than 20 eV at full-width-at-half maximum and a first mean x-ray energy that is in a range of 1 eV to 1 keV (e.g., a range of 1 eV to 5 eV) higher than a first absorption edge energy of a first atomic element of interest (e.g., an atomic element to be detected within a portion of the sample 20 under analysis). The first x-ray beam 32 is collimated to have a first collimation angular range less than 7 mrad in at least one direction perpendicular to a first propagation direction of the first x-ray beam 32. The x-ray source 30 is configured to irradiate the layered material structures 24 with the first x-ray beam 32 at a plurality of incidence angles 34 relative to the surface 26, the incidence angles of the plurality of incidence angles in a range of 3 mrad to 400 mrad. For example, at least a portion of the x-ray source 30 and/or the sample 20 can be mounted on at least one stage (not shown) configured to precisely adjust and set the incidence angle 34 of the first x-ray beam 32 relative to the surface 26. For example, the at least one stage can comprise an electromechanical system configured to direct the x-ray beam on to a layered material structure on a flat surface at a predetermined grazing incidence angle or over a predetermined angular range of incidence angles.

In certain implementations, the example system 10 of FIG. 1 further comprises at least one first x-ray detector 40 configured to detect (e.g., measure) a reflected portion 36 of the first x-ray beam 32 from the sample 20 and at least one energy resolving second detector 50 configured to detect (e.g., measure) x-ray fluorescence (XRF) x-rays 52 and/or photoelectrons 54 from the sample 20 simultaneously with the at least one first x-ray detector 40 detecting the reflected portion 36 of the first x-ray beam 32.

In certain implementations, as schematically illustrated by FIG. 1, the x-ray source 30 comprises at least one x-ray generator 60 configured to generate x-rays 62 and at least one x-ray optic subsystem 70 configured to receive at least some of the x-rays 62 and to generate the first x-ray beam 32 which comprises at least some of the received x-rays 62.

Figure 2:
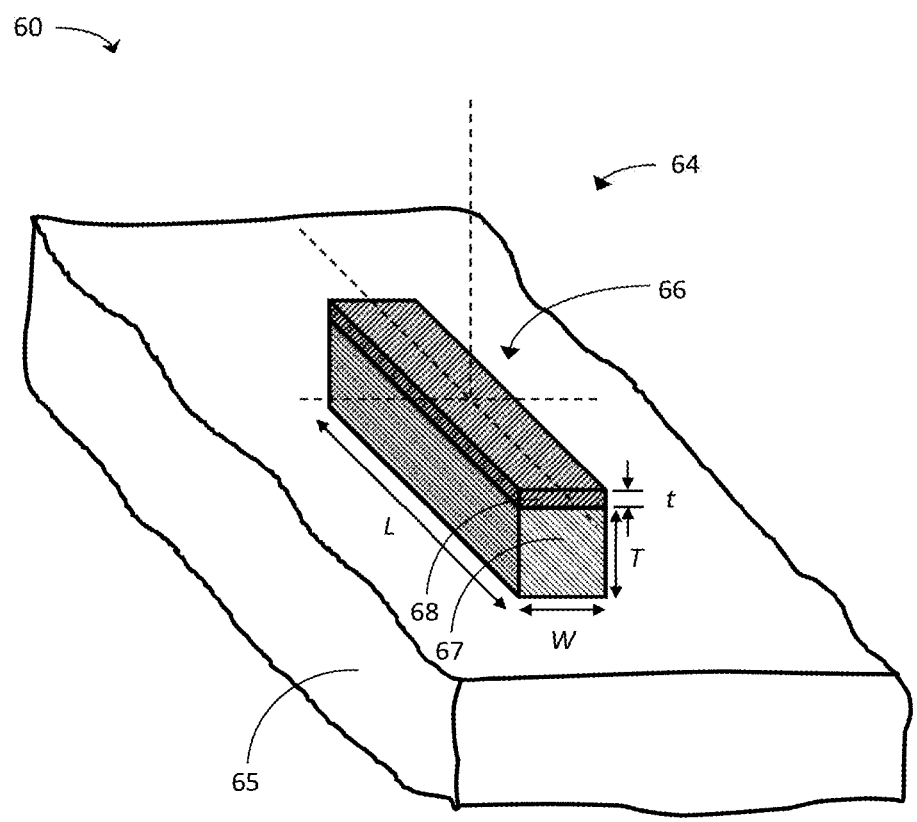
FIG. 2 schematically illustrates an example x-ray generator in accordance with certain implementations described herein.

FIG. 2 schematically illustrates an example x-ray generator 60 in accordance with certain implementations described herein. The x-ray generator 60 can comprise at least one x-ray target 64 comprising a thermally conductive substrate 65 (e.g., copper; diamond) and at least one structure 66 on or embedded in at least a portion of a surface of the substrate 65, the at least one structure 66 comprising at least one thermally conductive material 67 (e.g., diamond) in thermal communication with the substrate 65 and at least one x-ray generating material 68 (e.g., in the form of a thin film deposited onto the thermally conductive material 67) on the at least one thermally conductive material 67. The substrate 65 can be in thermal communication with at least one heat dissipation structure (e.g., heat pipe; liquid coolant; another material of high thermal conductivity). The at least one x-ray generating material 68 is configured to produce the x-rays 62 in response to bombardment by at least one electron beam (not shown).

The x-rays 62 can include x-rays having a characteristic x-ray energy of the at least one x-ray generating material (e.g., a characteristic x-ray emission line) in a low energy range (e.g., below 5.4 keV; below 3 keV; in a range of 0.1 keV to 50 keV; in a range of 0.2 keV to 5.5 keV; in a range of 0.5 keV to 5.5 keV). For example, the at least one x-ray generating material 68 can comprise at least one atomic element configured to generate x-rays 62 having a low energy K characteristic line energy, a low energy L characteristic line energy, and/or a low energy M characteristic line energy. Examples of the at least one atomic element include but are not limited to: substantially pure or alloy or compound forms of silicon, magnesium, aluminum, carbon (e.g., in the form of silicon carbide or SiC), nitrogen (e.g., in the form of TiN), fluorine (e.g., in the form of $MgF_2$), oxygen (e.g., in the form of $Al_2O_3$), calcium (e.g., in the form of $CaF_2$), titanium (e.g., K characteristic line energy of about 0.5 keV), rhodium (e.g., L characteristic line energy of 2.7 keV), tungsten (e.g., M characteristic line energy of 1.8 keV). Other examples of the at least one atomic element include but are not limited to: MgO, $SrB_6$, $CaB_6$, CaO, $HfO_2$, $LaB_6$, GeN, and other boride, nitride, oxide, and fluoride compounds. In certain implementations, at least 50% (e.g., at least 70%; at least 85%) of the x-rays 62 produced by the x-ray generator 60 have energies that are in a narrow energy band (e.g., having a radiative line width less than 4 eV) at the characteristic x-ray emission line energy.

In certain implementations, the x-ray generator 60 comprises a plurality of structures 66, each comprising a different x-ray generating material 68 configured to produce x-rays 62 having different x-ray spectra and different characteristic x-ray emission lines). For example, the different structures 66 can be separate from one another but in thermal communication with a common substrate 65, such that an electron beam can bombard only one structure 66 at a time to produce a single x-ray spectrum at a time. In certain implementations, a structure 66 can comprise multiple x-ray generating materials 68 (e.g., MgF layer on top of a SiC layer) and the layer thicknesses can be configured such that the incident electron beam can produce multiple different x-ray spectra simultaneously. The plurality of structures 66 can comprise x-ray generating materials 68 can have pre-determined thermal conductivities and melting temperatures and can be configured to generate characteristic x-rays (e.g., Kα characteristic lines from BeO, C, $B_4C$, $TiB_2$, $Ti_3N_4$, MgO, SiC, Si, MgF, Mg, Al, $Al_2O_3$, Ti, V, Cr; Lα characteristic lines from Sr, Zr, Mo, Ru, Rh, Pd, Ag and their compounds with melting temperatures greater than 1000 degrees centigrade; Mα characteristic lines from Hf, Ta, W, Ir, Os, Pt, Au, W and their compounds with melting temperatures greater than 1000 degrees centigrade). In certain implementations, the x-ray generating material 68 is selected to generate x-rays having energies that are larger than an absorption edge energy of an atomic element of the sample 20 being analyzed. Since x-ray fluorescence cross section of an atomic element is largest when the excitation x-ray energy is slightly above the absorption edge energy of the atomic element, it can be useful to select the mean x-ray energy of the first x-ray beam 32 to optimize the production efficiency of the XRF x-rays 52.

Table 1 lists some example x-ray generating materials 68 and characteristic x-ray lines compatible with certain implementations described herein.

TABLE 1

| X-ray generating material | Characteristic x-ray line |
|---|---|
| Be | Be $Kα_{1,2}$ at 108.5 eV with line width less than 0.5 eV |
| Graphite | C $Kα_{1,2}$ at 277 eV with line width less than 0.5 eV |
| $Al_2O_3$ | O Kα at 525 eV with line width less than 1 eV |
| Mg | Mg $Kα_{1,2}$ at 1253.3 eV with line width of 0.85 eV |
| Al or $Al_2O_3$ | Al $Kα_{1,2}$ at 1486.6 eV with line width less than 1 eV |
| SiC | Si $Kα_{1,2}$ at 1740 eV with line width of about 1 eV |
| Mo | Mo $Lα_1$ at about 2293 eV with line width less than 1 eV |
| Rh | Rh Lα at about 2697 eV with line width greater than 1 eV |
| Ti | Ti $Kα_1$ at 4511 eV with line width greater than 1 eV |
| Cr | Cr $Kα_1$ at 5415 eV with line width greater than 1 eV |
| Cu | Cu $Kα_1$ at 8048 eV with line width greater than 1 eV |

For certain such x-ray generating materials 68 (e.g., SiC; Mo; Rh; Ti; Cr; Cu), the x-ray optic subsystem 70 can comprise a filter/monochromator.

In certain implementations in which the at least one x-ray generating material 68 comprises a nominally electrically insulative material (e.g., MgF), the at least one x-ray generating material 68 has a sufficiently small thickness (e.g., less than 10 microns; less than 2 microns) such that the material conducts electrons to the underlying substrate. In certain other implementations in which the at least one x-ray generating material 68 comprises a nominally electrically insulative material, the at least one structure 66 further comprises an electrically conductive conduit configured to inhibit electrical charging of the at least one x-ray generating material 68. For example, the at least one structure 66 can comprise a layer (e.g., 1 micron to 10 microns thick) of the x-ray generating material 68 on an electrically conductive and thermally conductive material 67. Various x-ray generators 60 and x-ray targets 64 compatible with certain implementations described herein are disclosed by U.S. Pat. No. 10,658,145 which is incorporated in its entirety by reference herein.

Figure 3A:
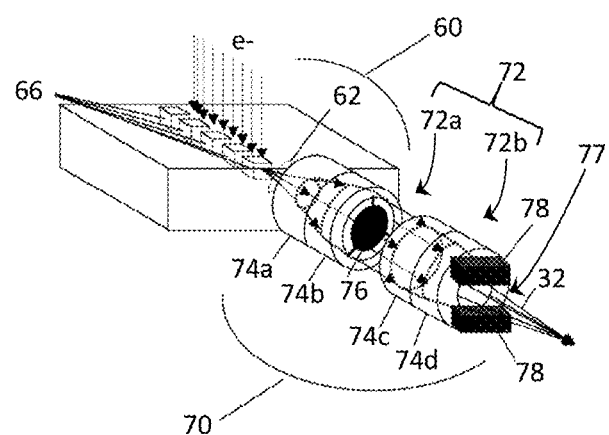
FIG. 3A schematically illustrates an example x-ray optic subsystem receiving the x-rays generated by an example x-ray generator in accordance with certain implementations described herein.

FIG. 3A schematically illustrates an example x-ray optic subsystem 70 (e.g., an x-ray optical train) receiving the x-rays 62 generated by an example x-ray generator 60 in accordance with certain implementations described herein. The x-ray optic subsystem 70 of FIG. 3A comprises a plurality of x-ray optic elements 72 configured to receive at least some of the x-rays 62 and to generate the first x-ray beam 32 which comprises at least some of the received x-rays 62 (e.g., at least 85% of the x-ray flux of at least one of the characteristic x-ray lines from the x-ray generator 60). For example, the plurality of x-ray optic elements 72 can comprise portions of at least one axially symmetric capillary, each portion having at least one quadric (e.g., paraboloidal, ellipsoidal, hyperboloidal) reflecting surface 74 configured to reflect at least some of the x-rays 62. In certain other implementations, at least one of the x-ray optic elements 72 is not axially symmetric and/or comprises a curved crystal or a multilayer mirror. The plurality of x-ray optic elements 72 can comprise x-ray reflective coatings configured to increase the x-ray reflectivity or the critical angle of the x-ray optic elements 72. In certain implementations, the x-ray optic subsystem 70 further comprises controllably adjustable stages (e.g., supports) upon which the components of the x-ray optic subsystem 70 are mounted, the stages configured to align the components of the x-ray optic subsystem 70 with one another and with the x-ray generator 60.

In certain implementations, the plurality of x-ray optic elements 72 have more than one quadric reflecting surface 74 (e.g., Wolter type optics). In certain implementations, the reflecting surfaces of the plurality of x-ray optic elements 72 are coated with a thin layer (e.g., thickness of 1-10 nm) of at least one high atomic number element to increase the critical angle of the x-ray optic elements 72 and to provide a large solid angle of acceptance. In certain other implementations, the reflecting surfaces 74 of the plurality of x-ray optic elements 72 are coated with a multilayer coating that serves to reduce the polychromaticity of the incident x-rays 62 (e.g., reducing the energy bandwidth of the resultant first x-ray beam 32).

In the example x-ray optic subsystem 70 of FIG. 3A, the plurality of x-ray optic elements 72 comprises a first x-ray optic element 72a comprising a collimating Wolter type I mirror with reflecting surfaces 74a, 74b, and a second x-ray optic element 72b comprising a focusing Wolter type I mirror with reflecting surfaces 74c, 74d. In certain other implementations, the first x-ray optic element 72a comprises a paraboloidal reflecting surface 74 configured to collimate at least some of the x-rays 62 received from the x-ray generator 60 and the second x-ray optic element 72b comprises a paraboloidal reflecting surface 74 configured to focus at least some of the collimated x-rays 62 received from the first x-ray optic element 72a. In certain implementations, the x-ray optic subsystem 70 further comprises a beam stop 76 configured to block x-rays 62 that would otherwise pass through the x-ray optic subsystem 70 without reflecting from the plurality of x-ray optic elements 72.

Figure 3B:
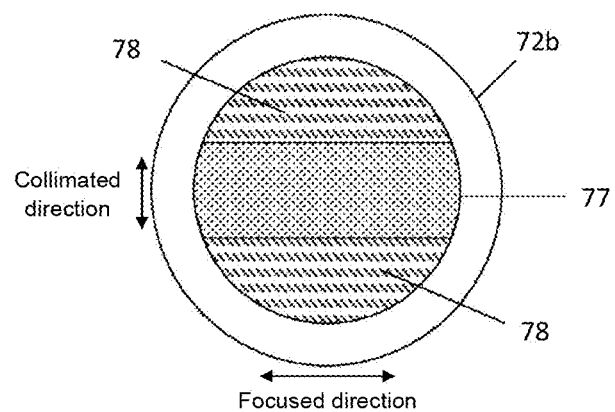
FIG. 3B schematically illustrates an example aperture at an exit end of the second x-ray optic element of FIG. 3A in accordance with certain implementations described herein.

In certain implementations, the x-ray optic subsystem 70 further comprises at least one aperture 77 (e.g., beam slit; pinhole) configured to collimate the focused x-rays 62 from the plurality of x-ray optic elements 72 in at least one direction by limiting divergence of the first x-ray beam 32 incident upon the sample 20. FIG. 3B schematically illustrates an example aperture 77 at an exit end of the second x-ray optic element 72b of FIG. 3A in accordance with certain implementations described herein. In certain implementations, the at least one aperture 77 provides angular collimation in at least one direction, so that the first x-ray beam 32 in the reflecting direction appears as a plane wave. The angular collimation of the aperture 77 can be determined by the following formula:

$$\Delta\theta < \lambda/(2d)/5$$

where $\Delta\theta$ is the angular collimation, $\lambda$ is the wavelength of the x-ray 62 incident to the aperture 77, and d is the period of the interference pattern produced by the incident and reflected x-ray waves. In certain implementations, the angular collimation of the at least one aperture 77 is less than 5 mrad. In certain implementations, the at least one aperture 77 is defined by at least two x-ray opaque elements 78 configured to block at least some of the x-rays 62 and to be adjustably moved relative to one another (e.g., by a motor) such that the size (e.g., width) of the at least one aperture 77 through which at least some of the x-rays 62 can propagate to the sample 20 can be controllably adjusted. The size of the at least one aperture 77 can be a function of the size (e.g., along the reflecting dimension) of the features of the sample 20 to be analyzed.

The at least one aperture 77 can be upstream or downstream of the plurality of x-ray optic elements 70 or can be between x-ray optic elements 72 of the plurality of x-ray optic elements 72. For example, for a plurality of x-ray optic elements 72 comprising two paraboloidal reflective surfaces, the at least one aperture 77 can be placed between the two paraboloidal reflective surfaces. For example, as schematically illustrated by FIG. 3A, the at least one aperture 77 can be downstream from the plurality of x-ray optic elements 72. The at least one aperture 77 can be used to restrict the size and/or the angular extent of the first x-ray beam 32 on the surface of the layered structure of the sample 20, and to impose a predetermined amount of spatial coherence for the formation of a standing wave at the surface of the layered structure of the sample 20.

In certain implementations, the size (e.g., footprint) F of the first x-ray beam 32 on the sample 20 can be expressed as:

$$F = s/\sin(\alpha)$$

where s is the beam size along the tangential (e.g., reflecting) direction and $\alpha$ is the incident angle 34 of the first x-ray beam 32 relative to the surface 26. In certain implementations, the size L of the aperture 77 (e.g., near the exit end of the plurality of x-ray optic elements 72) is defined such that:

$$s/\sin(\alpha) < L$$

For example, for L=300 microns and angle of incidence $\alpha$=41 mrad (e.g., 1.74 keV on Pt-coated glass), the aperture 77 that defines the size of the first x-ray beam 32 in one dimension can be equal to 12.3 microns. Using an aperture 77 with a plurality of x-ray optic elements 72 that produces a 20 micron diameter spot would transmit about 60% of the x-ray flux incident on the aperture 77 (the other dimension is not reduced) that would otherwise be delivered to the sample 20. Note that for a standing wave at 8 keV, the aperture 77 would be too small (or the feature would be too large) to be of practical value as shown in Table 2.

TABLE 2

| X-ray Energy | Critical Angle | Feature Size | Aperture Width |
|---|---|---|---|
| 1.74 keV | 41 mrad | 300 microns | 12.3 microns |
| 8 keV | 8.9 mrad | 300 microns | 2.7 microns |

In certain implementations, the size of the aperture 77 can be increased significantly to transmit sufficient x-ray flux to the sample 20. In certain implementations, the feature size is 500 microns in length, instead of 300 microns as described above, and the width of the aperture 77 can be further widened.

In certain implementations, the x-ray optic subsystem 70 further comprises a filter and/or monochromator configured to monochromatize the x-rays of the first x-ray beam 32. Any x-ray monochromator known to those skilled in the art can be used, examples of which include but are not limited to: channel cut crystals, flat crystals (e.g., Si(111)), and synthetic multilayers. In certain implementations, the monochromator is between the first x-ray optic element 72a (e.g., a collimating first paraboloidal mirror) and the second x-ray optic element 72b (e.g., a focusing second paraboloidal mirror) such that the first x-ray optic element 72a collimates at least some of the x-rays 62 from the x-ray generator 60 (e.g., the x-rays 62 that are incident upon a two or four bounce crystal) and the second x-ray optic element 72b focuses at least some of the x-rays 62 from the first x-ray optic element 72a (e.g., to a spot size less than 40 microns (FWHM)). In certain implementations, the monochromator comprises at least one multilayer coating on at least one interior surface of the x-ray optic subsystem 70. In certain implementations in which the x-rays 62 generated by the x-ray generator 60 are sufficiently monochromatic to form standing x-ray waves within the layered material structure (e.g., in some implementations in which the x-ray generating material comprises Mg, Al, and/or Si), the x-ray optic subsystem 70 can exclude having a multilayer or crystal monochromator.

In certain implementations, the mean x-ray energy of the incident first x-ray beam 32 can be selected to reduce (e.g., suppress) x-ray background contributions to the detected characteristic XRF x-rays 52 of the atomic element of the sample 20 being analyzed due to spectral interference and/or detector noise contributions (e.g., incomplete charge collection). Energy dispersive detectors (e.g., SDD) have a finite energy resolution (e.g., about 125 eV for detecting 5.9 keV x-rays), and spectral interference (e.g., overlap) of characteristic x-rays of atomic elements of interest with characteristic x-rays of a major atomic element in the layered material structures 24 of the sample 20 can make the detection and quantification of the atomic elements of interest difficult, leading to long data acquisition times. For example, for a stack of three Si nanosheet transistors, Si is a major atomic element, and the energy of the characteristic Si K-lines is about 1.74 keV. $HfO_2$ is a widely used gate dielectric material and the characteristic M-line energy of Hf is about 1.64 keV, which differs from the characteristic Si K$\alpha$-line energies by about 100 eV. In certain implementations, using Si K$\alpha$ x-rays as the first x-ray beam 32, no Si K$\alpha$ characteristic XRF x-rays 52 in the sample 20 will be produced.

In certain implementations, the at least one first x-ray detector 40 is selected from the group consisting of: a proportional counter, a silicon drift detector, a direct detection x-ray charge-coupled device (CCD), and a pixel array photon counting detector. In certain implementations, the at least one energy resolving second detector 50 comprises an x-ray detector selected from the group consisting of: a silicon drift detector (SDD), a proportional detector, an ionization chamber, a wavelength dispersive detection system, or any other energy-resolving x-ray detector compatible for measuring XRF.

In certain implementations, the at least one energy resolving second detector 50 comprises an energy resolving photoelectron detector. For example, the energy resolving photoelectron detector can comprise an angle-resolved hemispherical XPS electron energy analyzer having an angular resolution of about one degree and utilizing an electron projection lens column for parallel collection of angle-resolved data for acceptance of an angular range of up to 60-80 degrees along the non-dispersion direction. Other example energy resolving photoelectron detectors compatible with certain implementations described herein include but are not limited to: retarding field analyzers; cylindrical mirror analyzers; and time-of-flight analyzers. In certain implementations, angle-resolved XPS measurements can be taken from large samples, such as complete semiconductor wafers that may be too large to be positioned at the desired grazing incidence angles within an XPS spectrometer. The position of the energy resolving photoelectron detector relative to the sample can remain fixed throughout the angular range, and the portion of the sample irradiated by the incident x-rays can remain constant during the irradiation. While the footprint of the x-ray spot size increases for decreasing grazing incidence angles (e.g., upon the sample being rotated relative to the incident x-ray beam), in certain implementations, using a combination of source-defined small area analysis and parallel collection, the analysis area can be substantially independent of the grazing incidence angle.

In certain implementations, the at least one first x-ray detector 40 and/or the at least one energy resolving second detector 50 comprise one or more apertures (e.g., beam slits; pinholes) at an input of the detector.

Example Methods

Figure 4A:
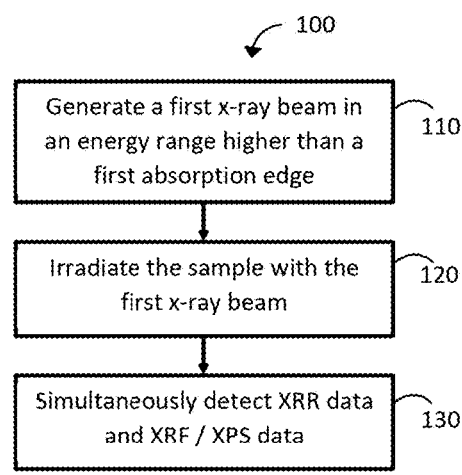
FIG. 4A is a flow diagram of an example method for analyzing a three-dimensional structure of a sample in accordance with certain implementations described herein.

FIG. 4A is a flow diagram of an example method 100 for analyzing (e.g., characterizing spatial structure and material composition; using single energy x-ray metrology) a three-dimensional structure of a sample 20 in accordance with certain implementations described herein. In an operational block 110, the method 100 comprises generating a first x-ray beam 32 having a first energy bandwidth less than 20 eV at full-width-at-half maximum and a first mean x-ray energy that is in a range of 1 eV to 1 keV (e.g., a range of 1 eV to 5 eV) higher than a first absorption edge energy of a first atomic element of interest. The first x-ray beam 32 is collimated to have a first collimation angular range less than 7 mrad (e.g., less than 4 mrad; less than 1 mrad) in at least one direction perpendicular to a first propagation direction of the first x-ray beam 32.

In certain implementations, the first absorption edge energy of the first atomic element of interest (e.g., 0.1 keV to 5.4 keV) is less than an absorption edge energy of a major atomic element of the portion of the sample 20 being analyzed (e.g., an atomic element that constitutes at least 20% of the atoms of the portion of the sample 20). For example, for a sample 20 comprising a silicon substrate, the first absorption edge energy of the first atomic element of interest is less than 1.84 keV. In certain implementations, at least 50% of the x-rays of the first x-ray beam 32 irradiating the sample 20 having x-ray energies greater than 100 eV above the first absorption edge energy of the first atomic element of interest. In certain implementations, the x-ray energy bandwidth is obtained using an x-ray optic subsystem comprising a monochromator and/or filter and generating the first x-ray beam 32 comprises filtering the x-rays 62 to have the first energy bandwidth.

In certain implementations, the first x-ray beam 32 impinges the sample 20 in a reflecting plane (e.g., a scattering plane) comprising the first propagation direction and a direction perpendicular to the surface 26, and the first x-ray beam 32 has a collimation angle (e.g., a collimation angular range) in the reflecting plane (e.g., containing the first x-ray beam 32 and the surface normal of the surface 26) and a convergence angle (e.g., a convergence angular range) in a convergence direction in a plane orthogonal to the reflecting plane (e.g., in a sagittal plane), the collimation angle smaller than the convergence angle.

In an operational block 120, the method 100 further comprises irradiating the sample 20 with the first x-ray beam 32 at a plurality of incidence angles 34 in a range of 3 mrad to 400 mrad relative to a substantially flat surface 26 of the sample 20. For example, the first x-ray beam 32 can irradiate a substantially flat area of the sample 20 at a grazing incidence angle (e.g., an angle between the surface 26 of the sample 20 and the first x-ray beam 32) between 5 mrad and 25 mrad.

Figure 5A:
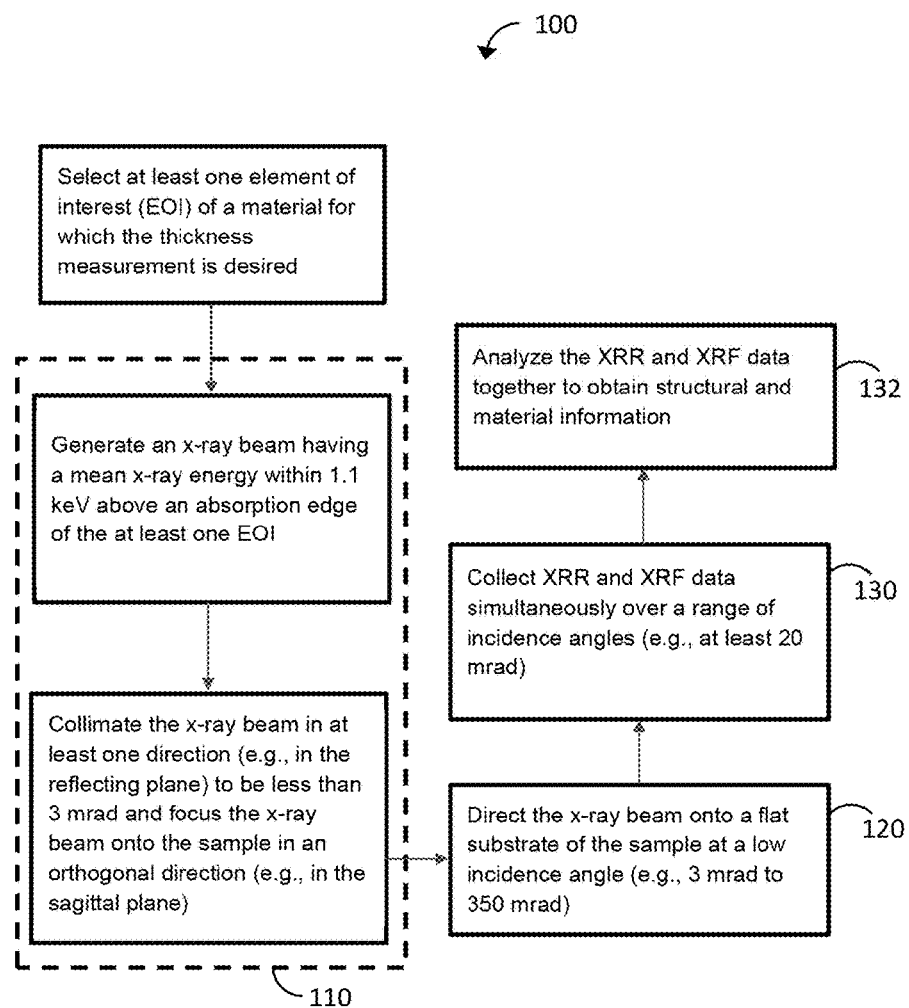
FIG. 5A is a flow diagram of another example method including aspects of the example method of FIG. 4A in accordance with certain implementations described herein.

In an operational block 130, the method 100 further comprises simultaneously detecting a reflected portion 36 of the first x-ray beam 32 from the sample 20 (e.g., XRR data) and detecting x-ray fluorescence x-rays 52 (e.g., XRF data) and/or photoelectrons 54 (e.g., XPS data) from the sample 20. In certain implementations, the method 100 further comprises (e.g., in an operational block 132) analyzing the detected XRR data (e.g., first XRR data) and the XRF data together to obtain structural and material information regarding the sample 20. For example, when irradiating the sample 20 with the first x-ray beam 32 and simultaneously detecting the reflected portion 36 of the first x-ray beam 32 and detecting the XRF x-rays 52 and/or the photoelectrons 54 are performed after the sample 20 has undergone at least one processing procedure, the method 100 can further comprise obtaining a first set of spatial and/or compositional information regarding the sample 20 by analyzing at least the detected first reflected portion 36, the detected XRF x-rays 52, and/or the detected photoelectrons 54 and comparing the obtained first set of spatial and/or compositional information regarding the sample 20 to a second set of spatial and/or compositional information regarding the sample 20 prior to the sample 20 undergoing the at least one processing procedure. FIG. 5A is a flow diagram of another example method 100 including aspects (e.g., examples of the operational blocks 110, 120, 130, and 132) of the example method 100 of FIG. 4A in accordance with certain implementations described herein.

Figure 4B:
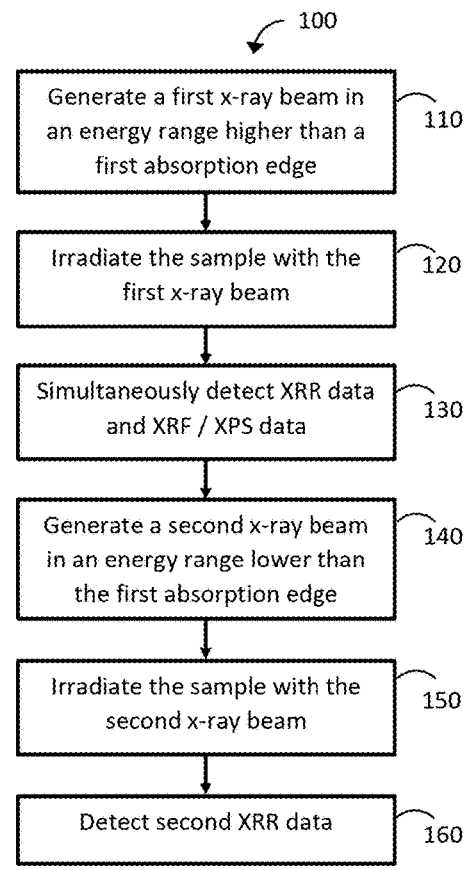
FIG. 4B is a flow diagram of another example method for analyzing a three-dimensional structure of a sample in accordance with certain implementations described herein.
Figure 5B:
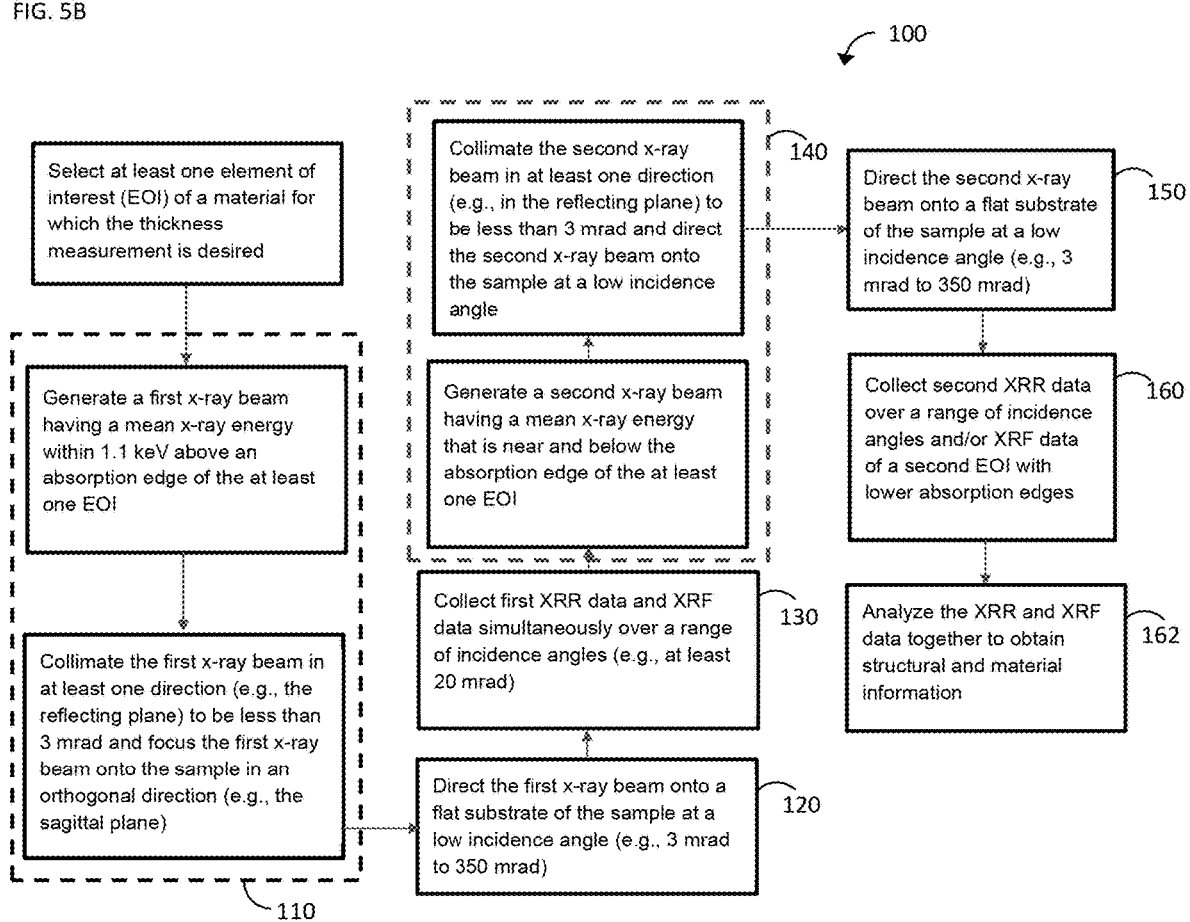
FIG. 5B is a flow diagram of another example method including aspects of the example method of FIG. 4B in accordance with certain implementations described herein.

FIG. 4B is a flow diagram of another example method 100 for analyzing (e.g., characterizing spatial structure and material composition; using dual energy x-ray metrology) a three-dimensional structure of a sample 20 in accordance with certain implementations described herein. Besides the operational blocks 110, 120, 130 of FIG. 4A, the method 100 of FIG. 4B further comprises, in an operational block 140, generating a second x-ray beam, the second x-ray beam having a second energy bandwidth less than 20 eV at full-width-at-half maximum and a second mean x-ray energy that is in a range of 1 eV to 1 keV (e.g., a range of 1 eV to 5 eV) lower than the first absorption edge energy of the first atomic element of interest. The second x-ray beam is collimated to have a second collimation angular range less than 7 mrad in at least one direction perpendicular to a second propagation direction of the second x-ray beam (e.g., less than 4 mrad; less than 1 mrad). The method 100 of FIG. 4B further comprises, in an operational block 150, irradiating the sample 20 with the second x-ray beam, and, in an operational block 160, detecting a second reflected portion of the second x-ray beam from the sample 20 (e.g., second XRR data). In certain implementations, the method 100 of FIG. 4B further comprises (e.g., in an operational block 162) obtaining spatial and compositional information regarding the sample 20 by analyzing the detected second reflected portion (e.g., second XRR data) with the detected first reflected portion (e.g., first XRR data), the detected x-ray fluorescence x-rays (e.g., XRF data), and/or the detected photoelectrons (e.g., XPS data). FIG. 5B is a flow diagram of another example method 100 including aspects (e.g., examples of the operational blocks 110, 120, 130, 140, 150, 160, and 162) of the example method 100 of FIG. 4B in accordance with certain implementations described herein.

Figure 4C:
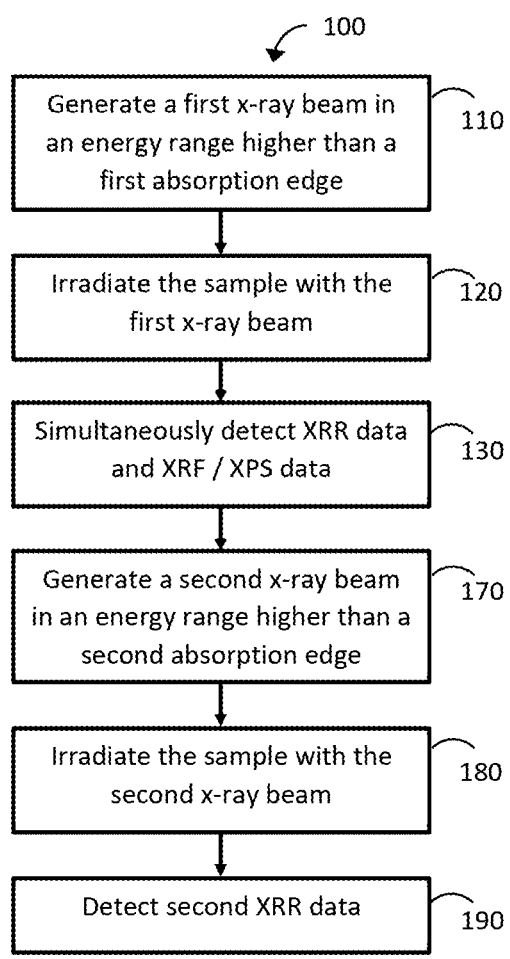
FIG. 4C is a flow diagram of another example method for analyzing a three-dimensional structure of a sample in accordance with certain implementations described herein.

FIG. 4C is a flow diagram of another example method 100 for analyzing (e.g., characterizing spatial structure and material composition; using dual energy x-ray metrology) a three-dimensional structure of a sample 20 in accordance with certain implementations described herein. Besides the operational blocks 110, 120, 130 of FIG. 4A, the method 100 of FIG. 4C further comprises, in an operational block 170, generating a second x-ray beam, the second x-ray beam having a second energy bandwidth less than 20 eV at full-width-at-half maximum and a second mean x-ray energy that is in a range of 1 eV to 1 keV (e.g., a range of 1 eV to 5 eV) higher than a second absorption edge energy. In certain implementations, the second absorption edge energy is of the first atomic element of interest, and the first absorption edge energy and the second absorption edge energy are separated from one another by at least 1 keV. For example, the first absorption edge energy can be an L edge energy of the first atomic element of interest and the second absorption edge energy can be an M edge energy of the first atomic element of interest. In certain other implementations, the second absorption edge energy is of a second atomic element of interest different from the first atomic element of interest. The second x-ray beam is collimated to have a second collimation angular range less than 7 mrad in at least one direction perpendicular to a second propagation direction of the second x-ray beam (e.g., less than 4 mrad; less than 1 mrad). The method 100 of FIG. 4C further comprises, in an operational block 180, irradiating the sample 20 with the second x-ray beam, and, in an operational block 190, detecting a second reflected portion of the second x-ray beam from the sample 20 (e.g., second XRR data). In certain implementations, the method 100 of FIG. 4C further comprises obtaining spatial and compositional information regarding the sample 20 by analyzing the detected second reflected portion (e.g., second XRR data) with the detected first reflected portion (e.g., first XRR data), the detected x-ray fluorescence x-rays (e.g., XRF data), and/or the detected photoelectrons (e.g., XPS data).

In certain implementations, a priori knowledge regarding some spatial and material of the sample 20 is already known. For example, the spatial and material of the sample can be previously characterized before one or more new process steps are performed (e.g., adding or removing materials, such as adding dielectric layers onto silicon nanosheets using atomic layer deposition). Metrology of the sample 20 after the one or more process steps can comprise selecting an atomic element of the material added in the one or more new process steps as the atomic element of interest or selecting an atomic element of the removed material (e.g., residue) as the atomic element of interest and performing a method as disclosed herein. In certain implementations, the known spatial and material information can be used in analyzing the XRR and XRF data obtained using an x-ray beam (e.g., first x-ray beam 32) having a mean x-ray energy in the range of 1 eV to 1 keV (e.g., in the range of 1 eV to 5 eV; in the range of 5 eV to 1 keV) higher than an absorption edge energy of the element of interest. In certain other implementations, XRR data collected using a second x-ray beam (e.g., having a mean x-ray energy in the range of 1 eV to 1 keV or 1 eV to 5 eV) lower than the absorption edge energy of the element of interest and other beam characteristics substantially similar to those of the first x-ray beam 32) can additionally be used.

In certain implementations, XRR and XRF data obtained over a small range of grazing angles or at a small number of discrete grazing angles are measured and analyzed to obtain spatial and material information regarding the one or more added or removed materials. The small range of grazing angles and/or the discrete grazing angles can be selected based on the sensitivity (e.g., change) of the XRR and XRF data in response to the spatial and material information on the one or more added or removed materials. The sensitivity can be determined in advance by analysis (e.g., simulation) or measurement. The benefit of certain such implementations includes increased metrology measurement throughput.

Figure 6:
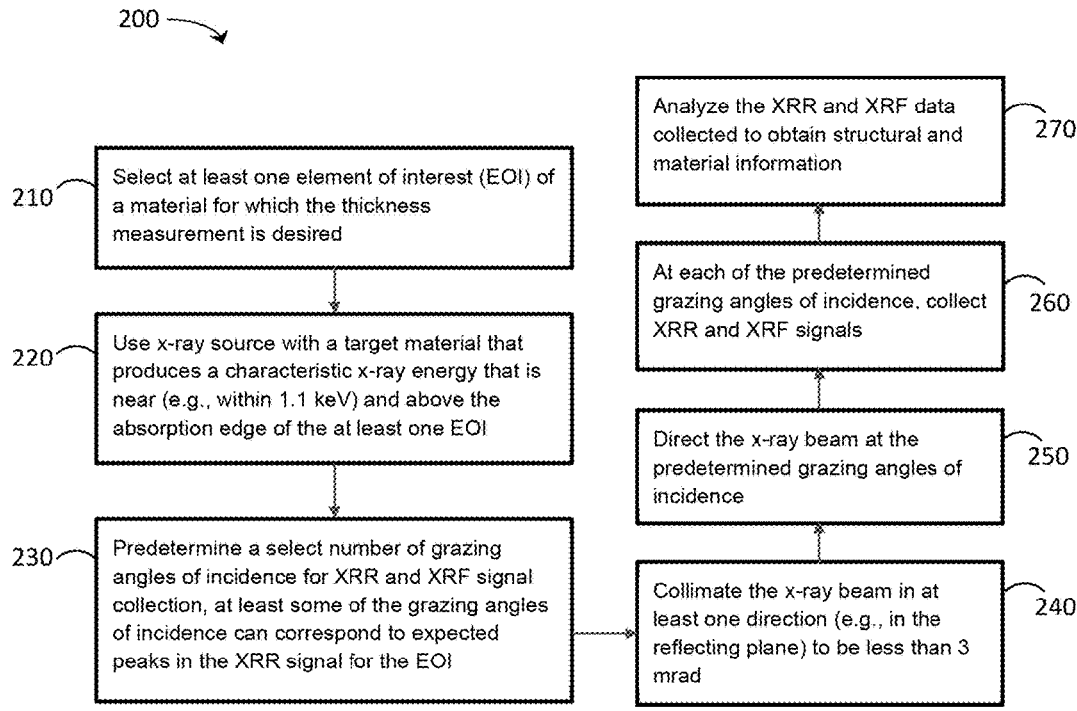
FIG. 6 is a flow diagram of an example method for inspection (e.g., process monitoring) in accordance with certain implementations described herein.

FIG. 6 is a flow diagram of an example method 200 for inspection (e.g., process monitoring) in accordance with certain implementations described herein. The example method 200 can be used for measuring one or more preselected spatial and material parameters of a 3D structure on a flat substrate by measuring XRR and/or XRF data at a finite number of grazing angles selected for their high sensitivity to the preselected specific parameters. In an operational block 210, the method 200 comprises selecting (e.g., predetermining) at least one element of interest (EOI) in the preselected material. In an operational block 220, the method 200 further comprises generating an x-ray beam for XRR and XRF measurement. The x-ray beam has an energy bandwidth less than 20 eV (e.g., full width half maximum) and a mean x-ray energy in the range of 1 eV to 1 keV (e.g., in the range of 1 eV to 5 eV; in the range 5 eV to 1 keV) higher than an absorption edge energy of the element of interest (EOI) and is collimated in at least one direction to have a collimation angle less than 7 mrad (e.g., less than 4 mrad; less than 1 mrad). In certain implementations, the absorption edge energy of the element of interest is selected to be between 0.1 keV and 5.4 keV. In certain implementations, the mean x-ray energy is less than an absorption edge energy of the major element of the substrate (e.g., 1.84 keV for silicon substrates).

In an operational block 230, the method 200 further comprises selecting (e.g., predetermining) a limited number of specific grazing incidence angles (e.g., fewer than 20, 50, or 100 with at least 20% of the grazing incidence angles being well-separated from one another) for XRR and XRF signal collection. The specific grazing incidence angles can be selected for their high sensitivity to the preselected one or more specific parameters. In certain implementations, the specific grazing incidence angles correspond to peaks in the expected XRR signal and/or in the XRF signal. In certain implementations, data is also collected at the specific grazing incidence angles correspond to expected valleys and/or peaks in the XRR curve and/or the XRF spectra. In certain such implementations, the peaks in the XRR signal of the EOI correspond to positive interference of the excitation x-ray beam (e.g., the first x-ray beam 32) in the sample 20 at layers containing the EOI. In an operational block 240, the method 200 further comprises collimating the x-ray beam in at least one direction (e.g., in the reflecting plane) to be less than 3 mrad.

In an operational block 250, the method 200 further comprises directing the x-ray beam on an area on a flat substrate of a sample 20 at the predetermined grazing incidence angles and in an operational block 260, collecting simultaneously XRR and XRF data at the predetermined grazing incidence angles. In an operational block 270, the method 200 further comprises analyzing the XRR and XRF data together to obtain structural and material information of the sample.

In certain implementations, the method 200 comprises collecting a first XRR curve with a first mean x-ray energy higher than the absorption edge energy of the EOI and collecting a second XRR curve with a second mean x-ray energy lower than the absorption edge energy of the EOI. The first and second XRR curves can be collected either sequentially or simultaneously, and the data of the first and second XRR curves can be analyzed together to obtain structural and material information of the sample. In certain implementations, a first XRR data set and XRF data are collected with a first mean x-ray energy higher than the absorption edge energy of the EOI and a second XRR data set is collected with a second mean x-ray energy lower than the absorption edge energy of the EOI. The first and second XRR data sets can be collected either sequentially or simultaneously, and the first and second XRR data sets can be analyzed together with the XRF data to obtain structural and material information of the sample.

In certain implementations, analyzing the measured data (e.g., in the operational blocks 132, 162, 270) comprises one or more of the following: comparing at least some of the measured data to expected values from one or more simulated models of the sample; comparing at least some of the measured data to a priori information (e.g., prior to the process) to determine the change; comparing at least some of the measured data to measurements from a known reference sample. In certain implementations, the analysis can enable determination of deviations of physical dimensions of the sample 20 from expected values (e.g., from a priori information, expected simulated values, and/or known reference values). Such deviation measurements can be used to provide process monitoring (e.g., rapid feedback on devices during the manufacturing process) by generating automated alerts when a measured deviation falls outside a predetermined range from the expected value. In certain implementations, the methods described herein can be used for measuring 3D spatial information of a finite number of material layers containing one or more atomic elements of interest.

Example Applications

Applications of certain implementations described herein include metrology and/or inspection of semiconductor processes for gate-all-around (GAA) devices, for example, during or after dielectric deposition on silicon nanosheets (e.g., determining uniformity of deposition), during/after dummy gate removal, etc. In certain implementations, the sample being analyzed is a semiconductor sample (e.g., a semiconductor wafer). In certain implementations, the region of interest on the sample is a test pattern or a scribe line for a semiconductor sample, while in certain other implementations, the region of interest is an active area of a semiconductor sample. In certain implementations, the x-ray beam footprint on the sample surface in at least the smaller of the two dimensions parallel to the surface is less than 100 microns.

Depth-Resolved $HfO_2$ Thicknesses in a Nanosheet Stack

Certain implementations described herein can provide depth-resolved thickness characterizations of $HfO_2$ in a semiconductor nanosheet stack. For example, the x-ray generator 60 can utilize an x-ray generating material 68 comprising Si (e.g., SiC) configured to generate Si Kα x-rays 62. The Si Kα x-rays 62 have a mean x-ray energy (1.74 keV) that is below the Si absorption edge but is above two M absorption edges of Hf ($M_4$ at 1.7164 keV and $M_5$ at 1.6617 keV). The x-ray optic subsystem 70 can comprise one or more focusing x-ray optic elements used in combination with a collimating beam block (e.g., aperture; slit; pinhole) and can be configured to collimate the x-ray beam 32 to have a collimation angular range of 3 mrad in the direction in the scattering plane containing the incident x-ray beam and the surface normal. The first x-ray beam 32 can be focused and collimated to be incident upon the sample 20 in a spot size with FWHM less than or equal to 50×500 microns (e.g., 50×300 microns, 40×500 microns, 40×300 microns, or smaller) and the XRR and XRF signals can be collected over a range of grazing angles of incidence (e.g., between 3 mrad and 300 mrad).

Figure 7A:
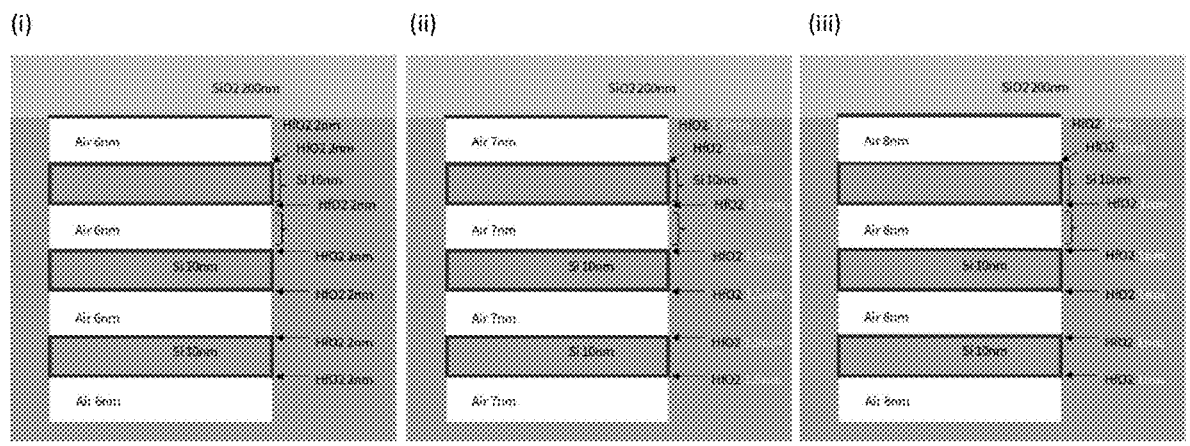
FIG. 7A schematically illustrates three example simulation models of a semiconductor nanosheet stack structure in accordance with certain implementations described herein.

FIG. 7A schematically illustrates three example simulation models of a semiconductor nanosheet stack structure in accordance with certain implementations described herein. The example simulation models each have Si nanosheets having thicknesses of 10 nm along the depth direction, and the lateral dimensions perpendicular to the depth direction can be any size (e.g., in a range from 1 nm to 10 nm, in a range from 10 nm to 50 nm, or 50 nm or more). The Si nanosheets are surrounded by $HfO_2$, a dielectric material, having a thickness of (i) 2 nm, (ii) 1.5 nm, or (iii) 1 nm and are separated from one another by air gaps having a thickness in the depth direction of (i) 6 nm, (ii) 7 nm, or (iii) 8 nm. The thicknesses of the air gaps are equal to 10 nm minus the thicknesses of the adjacent $HfO_2$ dielectric layers (e.g., for $HfO_2$ dielectric layers having a thickness of 2 nm, the air gap thickness is 10 nm−(2.2 nm)=6 nm).

Figure 7B:
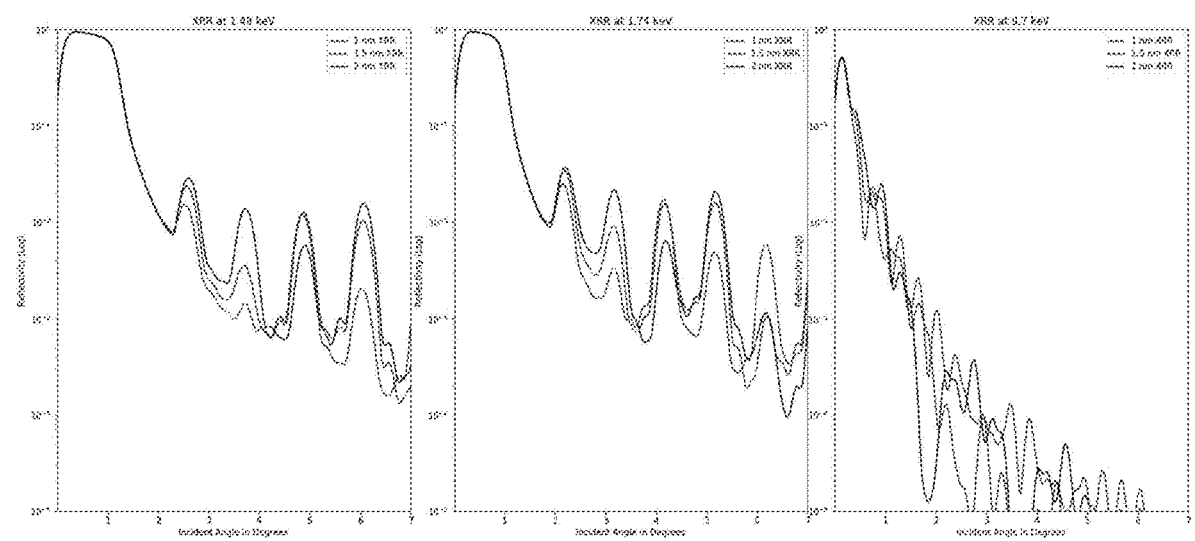
FIG. 7B shows graphs of simulated XRR data (e.g., curves) corresponding to the three example simulation models of FIG. 7A simulated to be collected using three x-ray energies in accordance with certain implementations described herein.

FIG. 7B shows graphs of simulated XRR data (e.g., curves) corresponding to the three example simulation models of FIG. 7A simulated to be collected using three x-ray energies in accordance with certain implementations described herein. Each of the graphs of FIG. 7B represents simulated XRR intensity as a function of incidence angle with different x-ray energies and simulated to be collected from the Si nanosheet structures of FIG. 7A having (i) 2 nm, (ii) 1.5 nm, and (iii) 1 nm $HfO_2$ layers. The left-most graph has an x-ray energy of 1.49 keV (e.g., Al characteristic emission line x-rays); the center graph has an x-ray energy of 1.74 keV (e.g., Si characteristic emission line x-rays from SiC), and the right-most graph has an x-ray energy of 9.7 keV.

Figure 7C:
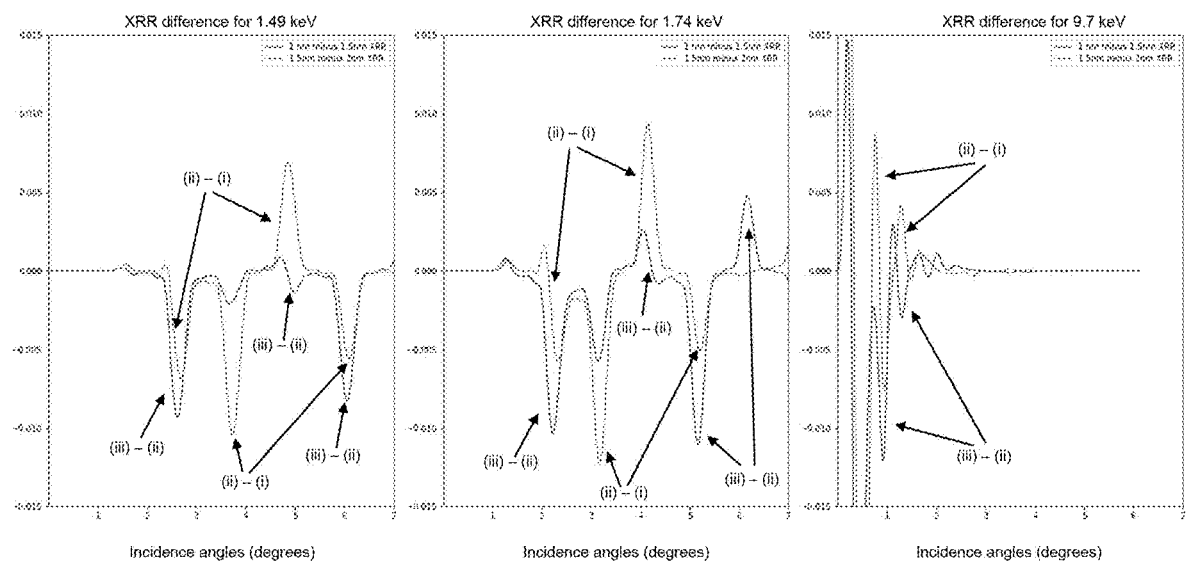
FIG. 7C shows graphs of simulated differences through simple subtraction between the three XRR curves of FIG. 7B at the three x-ray energies in accordance with certain implementations described herein.

FIG. 7C shows graphs of simulated differences through simple subtraction between the three XRR curves of FIG. 7B at the three x-ray energies in accordance with certain implementations described herein. FIG. 7C illustrates that the differences in the XRR intensity increases with increasing x-ray energy, and that at large x-ray energies, most of the XRR information is at the very low incidence angles (e.g., below 1 degree). XRR measurements at such low incidence angles can spread the x-ray beam footprint across a larger area than is desirable. In certain implementations, XRR measurements are made using an x-ray energy of 1.74 keV, with the XRR curves showing substantial differences as a function of the $HfO_2$ layer thickness over incidence angles in a wider range (e.g., between 1.5 degrees and 7 degrees).

Figure 7D:
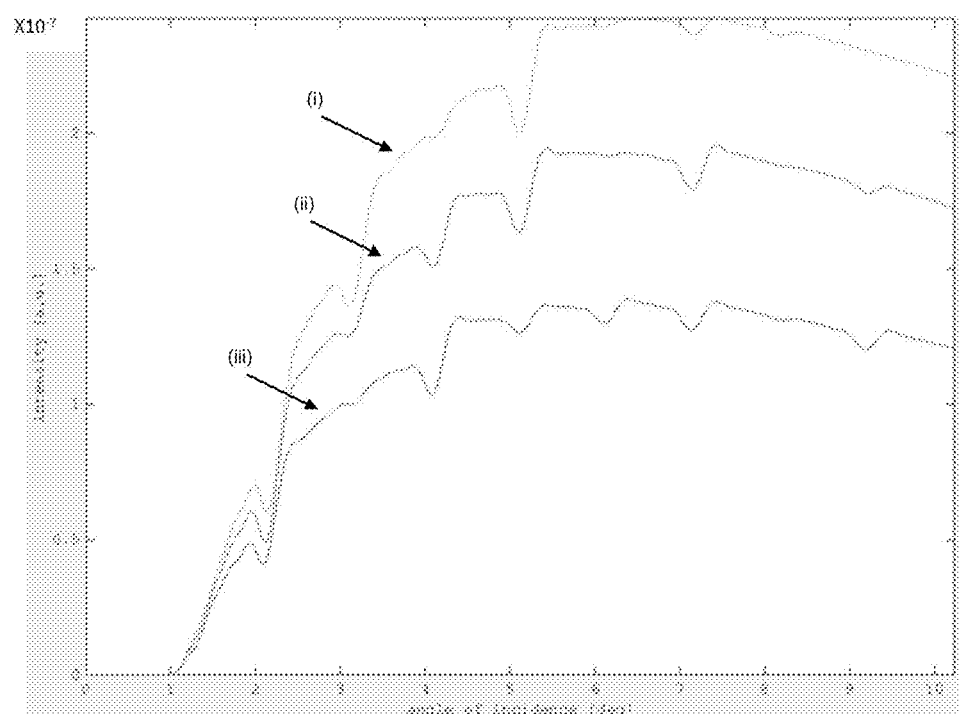
FIG. 7D shows a graph of a simulated signal of a $Hf M_5 N_7$ characteristic XRF line as a function of the incidence angle with an excitation x-ray energy of 1.74 keV in accordance with certain implementations described herein.

FIG. 7D shows a graph of a simulated signal of a Hf $M_5N_7$ characteristic XRF line as a function of the incidence angle with an excitation x-ray energy of 1.74 keV in accordance with certain implementations described herein. Note that the value of the vertical axis represents expected XRF photons for one incident photon. Because the incidence x-ray energy is slightly higher than the M absorption edges of Hf, the incident x-rays are efficient at exciting the Hf M x-ray fluorescence signals. Moreover, the Si characteristic emission line x-rays at 1.74 keV do not excite x-ray fluorescence from the bulk Si substrate, thereby increasing the signal-to-noise ratio for the measured Hf XRF signal. FIGS. 7A-7D demonstrate an advantage of using an x-ray generating material 68 that generates x-rays with a characteristic x-ray energy (e.g., 1.74 keV) above the absorption edge energy of an atomic element of the bulk sample being analyzed in accordance with certain implementations described herein.

Figure 7E:
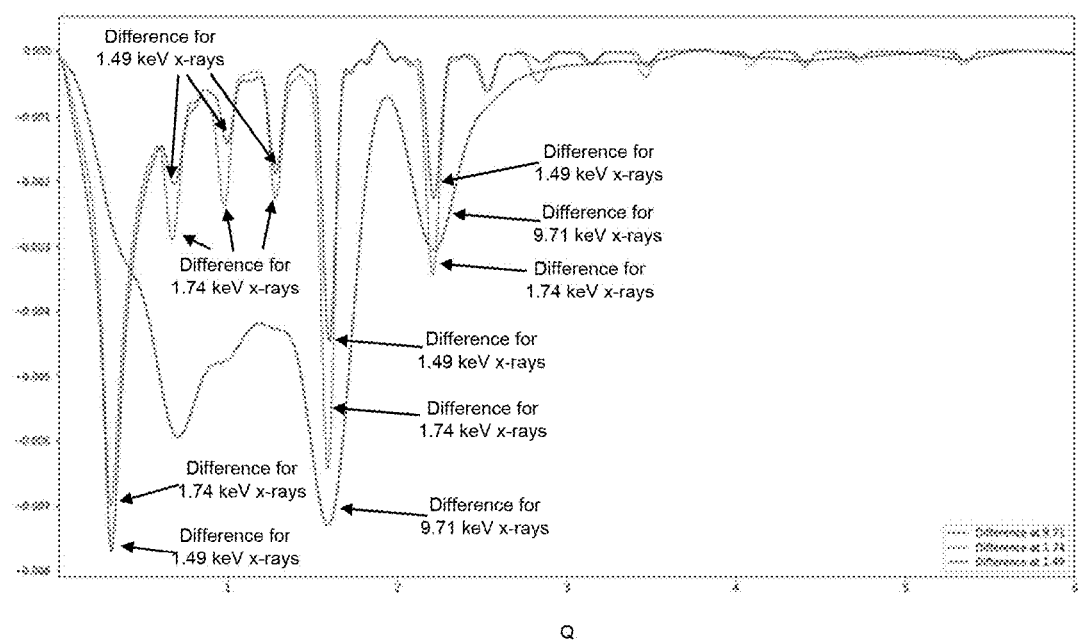
FIG. 7E shows a graph of simulated XRR signal differences at three different x-ray energies illustrating a sensitivity to the roughness of interfaces and surfaces in accordance with certain implementations described herein.

FIG. 7E shows a graph of simulated XRR signal differences at three different x-ray energies illustrating a sensitivity to the roughness of interfaces and surfaces in accordance with certain implementations described herein. The simulated XRR signal differences of FIG. 7E are between a first model of the Si nanosheet structure assuming zero roughness on all surfaces and interfaces and a second model assuming 1 nm roughness on the top-most surface and 0.5 nm roughness at the interfaces. FIG. 7E demonstrates that as the x-ray energy decreases (i.e., as the x-ray wavelength increases), the effect of roughness on the XRR signal is reduced. Such information can be used to normalize data. FIG. 7E also demonstrates an advantage of using a dual energy methodology in accordance with certain implementations described herein.

FIGS. 8A-8E demonstrate another scenario similar to that of FIGS. 7A-7E, but with modifications to the layer thicknesses. Moreover, the scenario of FIGS. 8A-8E represents a two-energy approach, in which each x-ray energy is selected to be above one of the absorption edges of an atomic energy of interest: 1.74 keV (e.g., produced by a Si-based source) which is above the Hf M absorption edges and 9.713 keV (e.g., produced by an Au-based source) which is above the Hf L absorption edge.

Figure 8A:
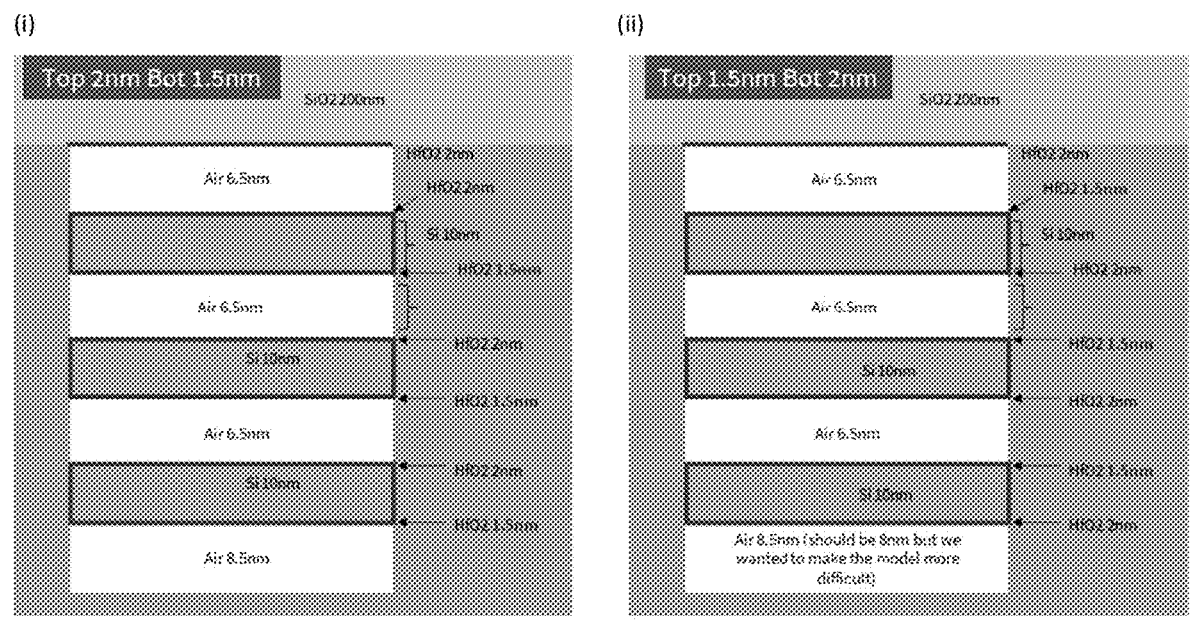
FIG. 8A schematically illustrates two example simulation models of a semiconductor nanosheet stack structure in accordance with certain implementations described herein.

FIG. 8A schematically illustrates two example simulation models of a semiconductor nanosheet stack structure in accordance with certain implementations described herein. The example simulation models each have Si nanosheets having thicknesses of 10 nm along the depth direction, and the lateral dimensions perpendicular to the depth direction can be any size (e.g., in a range from 1 nm to 10 nm, in a range from 10 nm to 50 nm, or 50 nm or more). The Si nanosheets are surrounded by $HfO_2$, a dielectric material, with (i) the first model having the top $HfO_2$ layer above each Si nanosheet with a thickness of 2 nm and the bottom $HfO_2$ layer below each Si nanosheet with a thickness of 1.5 nm and (ii) the second model having the top $HfO_2$ layer above each Si nanosheet with a thickness of 1.5 nm and the bottom $HfO_2$ layer below each Si nanosheet with a thickness of 2 nm. In both models, the Si nanosheets are separated from one another by air gaps having a thickness in the depth direction of 6.5 nm. FIG. 8A demonstrates a challenging scenario in which the overall $HfO_2$ signal remains the same despite the different structures.

Figure 8B:
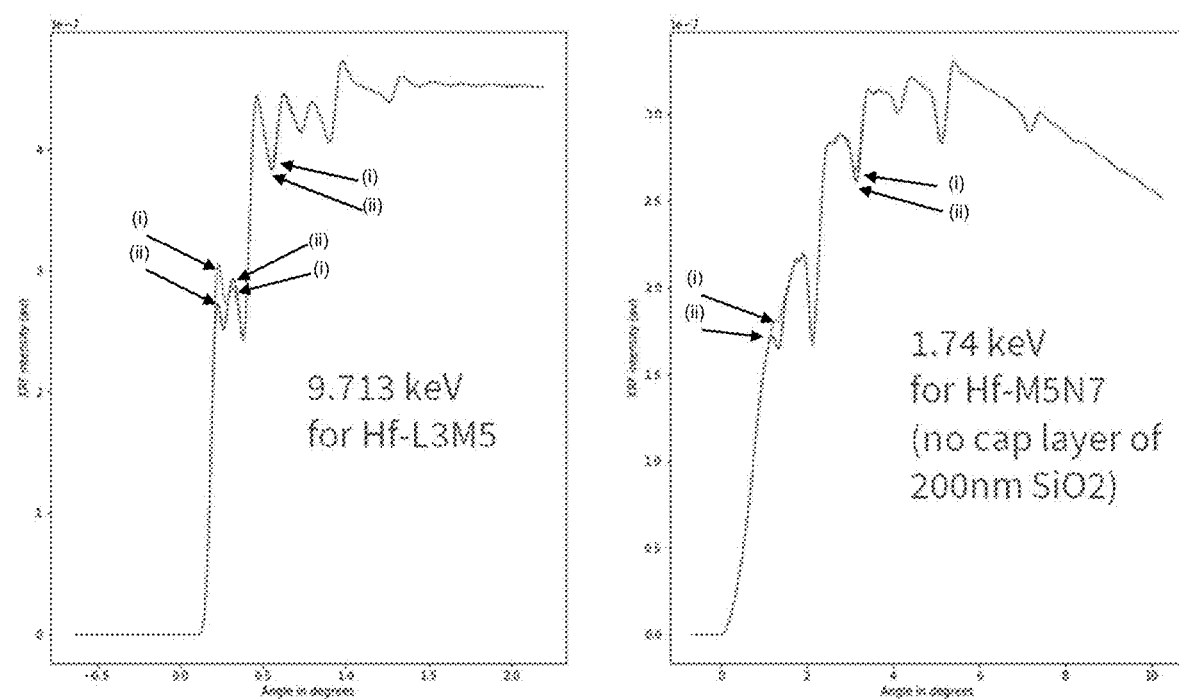
FIG. 8B shows graphs of simulated XRF signals from the two models of FIG. 8A at two different excitation x-ray energies in accordance with certain implementations described herein.

FIG. 8B shows graphs of simulated XRF signals from the two models of FIG. 8A at two different excitation x-ray energies in accordance with certain implementations described herein. For an excitation x-rays with an x-ray energy of 9.713 keV (e.g., from an Au-based source), the XRF signal for the Hf $L_3M_5$ XRF line simulated to be collected as a function of incidence angle from the two models show some distinguishing information, despite the fact that both models contain the same amount of $HfO_2$. For an excitation x-rays with an x-ray energy of 1.74 keV (e.g., from a SiC-based source), the XRF signal for the Hf $M_5N_7$ XRF line simulated to be collected as a function of incidence angle from the two models also shows some distinguishing information. The distinguishing information results from the interference pattern caused by reflection from the Si nanosheets in regions of constructive interference at the $HfO_2$ layers of interest providing stronger signals. In certain implementations, the XRF signals are collected at the first 3-5 peaks and valleys of the XRF signal, since the smaller incidence angles have more sensitivity to the top-most layers. In addition, FIG. 8B shows that as the incidence angle increases, the XRF signal "flips" between the first model having larger signal intensity than does the second model and the first model having smaller signal intensity than does the second model.

Figure 8C:
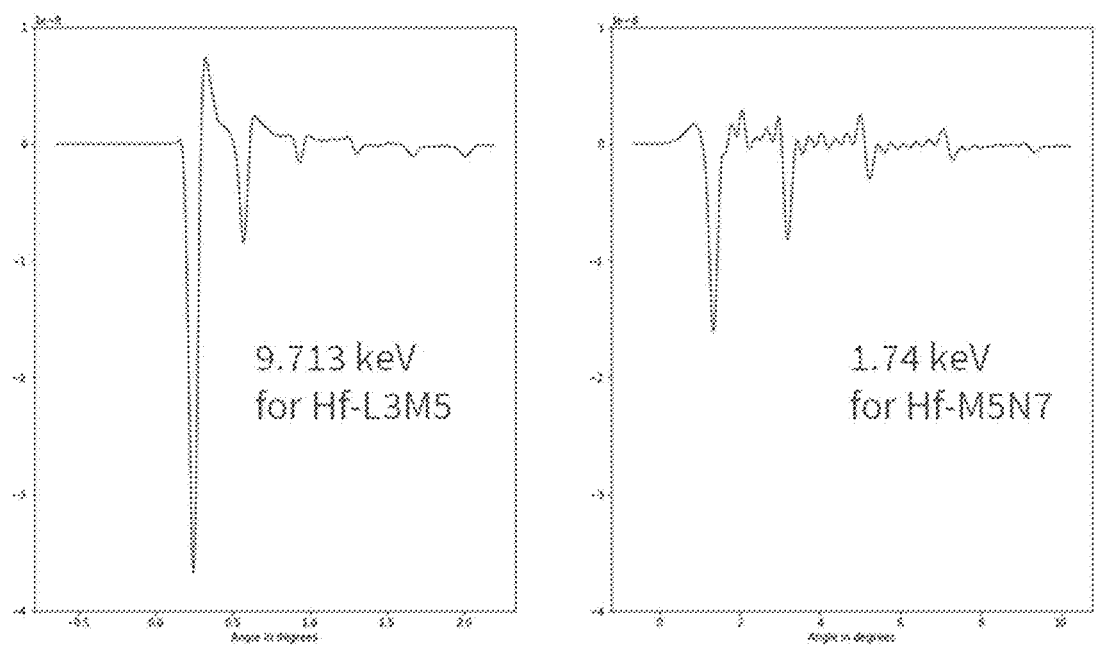
FIG. 8C shows graphs of simulated differences through simple subtraction between the two Hf XRF curves of FIG. 8B at the two excitation x-ray energies in accordance with certain implementations described herein.

FIG. 8C shows graphs of simulated differences through simple subtraction between the two Hf XRF curves of FIG. 8B at the two excitation x-ray energies in accordance with certain implementations described herein. As shown by FIG. 8C, using an excitation x-ray energy of 9.713 keV provides a larger difference in the XRF signal but at smaller incidence angles.

Figure 8D:
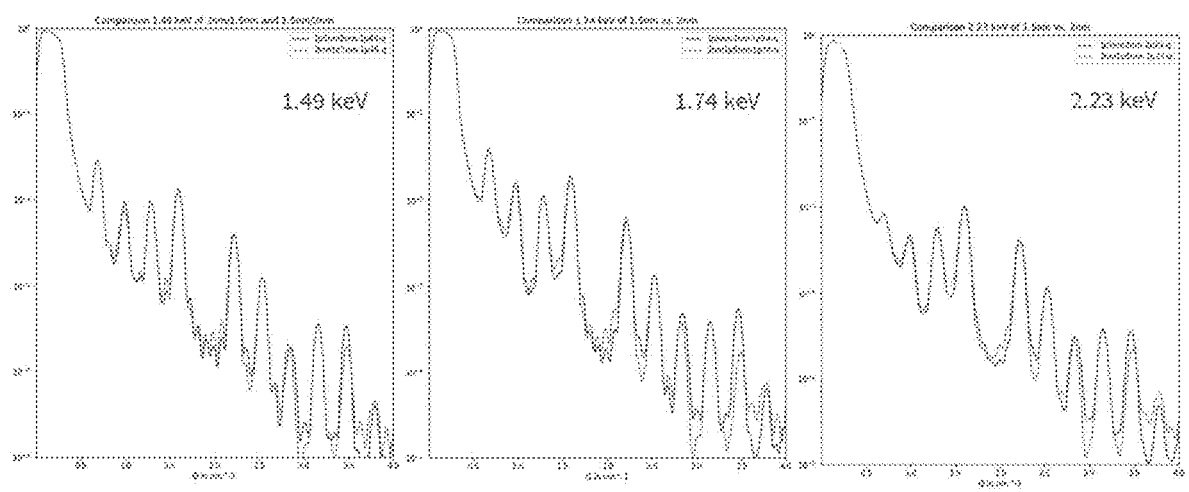
FIG. 8D shows graphs of simulated XRR signals (e.g., curves) corresponding to the two example simulation models of FIG. 8A simulated to be collected from the Si nanosheet structures of FIG. 8A using three x-ray energies in accordance with certain implementations described herein.

FIG. 8D shows graphs of simulated XRR signals (e.g., curves) corresponding to the two example simulation models of FIG. 8A simulated to be collected from the Si nanosheet structures of FIG. 8A using three x-ray energies in accordance with certain implementations described herein. The left-most graph has an x-ray energy of 1.49 keV (e.g., Al characteristic emission line x-rays which are below the Hf M absorption edge); the center graph has an x-ray energy of 1.74 keV (e.g., Si characteristic emission line x-rays from SiC which are above the Hf M absorption edge), and the right-most graph has an x-ray energy of 2.23 keV (e.g., above the Si K absorption edge). For each of the excitation x-ray energies, the XRR signals from the two models show difference from one another as a function of incidence angles.

Figure 8E:
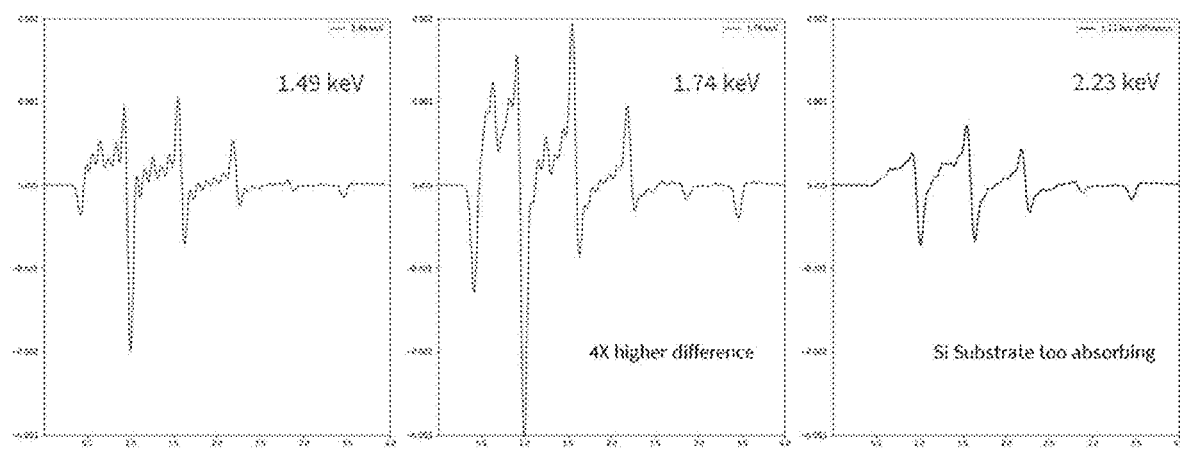
FIG. 8E shows graphs of the differences between the simulated XRR signals of FIG. 8D in accordance with certain implementations described herein.

FIG. 8E shows graphs of the differences between the simulated XRR signals of FIG. 8D in accordance with certain implementations described herein. FIG. 8E demonstrates an advantage of certain implementations of choosing an excitation x-ray energy below a primary absorption edge of the substrate and/or capping layer (e.g., silicon). The right-most graph of FIG. 8E demonstrates that the absorption by the substrate and capping layer attenuates differences detectable between the XRR signals.

Figure 9:
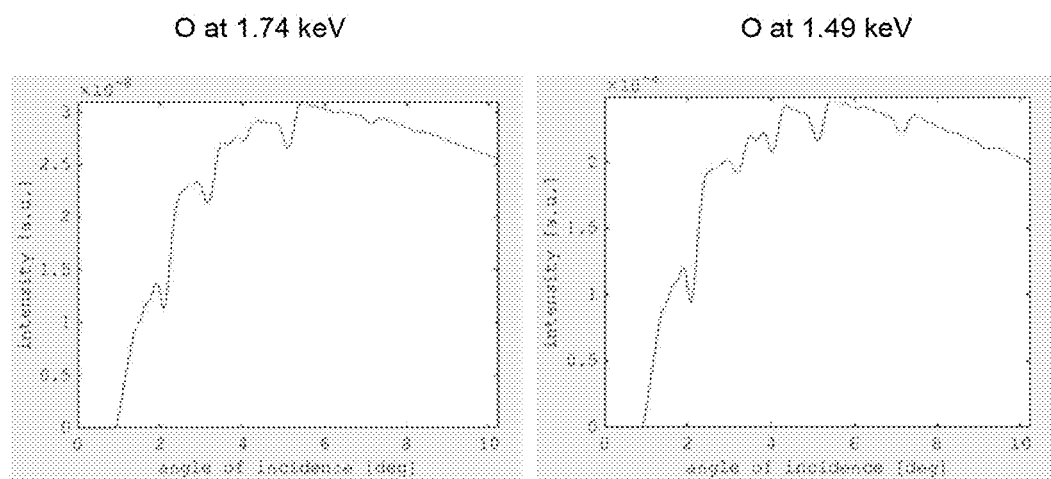
FIG. 9 shows graphs that illustrate the results of a two-energy method in which the XRF signal is collected for two different atomic elements of interest in accordance with certain implementations described herein.

FIG. 9 shows graphs that illustrate the results of a two-energy method in which the XRF signal is collected for two different atomic elements of interest in accordance with certain implementations described herein. The XRF signal of a second atomic element of interest can be collected in addition to the XRF signal of a first atomic element of interest. The second atomic element of interest can be another constituent of the material/layer/sample being analyzed. For example, for $HfO_2$, as shown in FIG. 9, the second atomic element of interest is oxygen and the first atomic element of interest is Hf. In the XRF signals of FIG. 9, the two-energy method uses a first excitation x-ray energy above an absorption edge of the first atomic element of interest (e.g., Hf) and a second excitation x-ray energy below the absorption edge of the first atomic element of interest, while also generating XRF signals using both excitation x-ray energies for the second atomic element of interest (e.g., oxygen). This additional data can be used to characterize the $HfO_2$ layer thicknesses in a metrology acquisition approach or an inspection acquisition approach, as described herein.

Characterization Related to Certain Elements

Certain implementations described herein can be used to distinguish between Si and SiGe layers in the processes commonly employed to develop silicon nanosheets. For Ge and any other element of interest having an absorption edge between 0.8 keV and 1.5 keV, examples of which include atomic elements having atomic numbers from 4 (B) to 11 (Na), from 19 (K) to 31 (Ge), and from 40 (Zr) to 64 (Gd), the Mg K-line (1.254 keV) produced in an electron bombardment x-ray source with a target comprising Mg or Mg compound (e.g., MgCl) can be used to generate x-rays having x-ray energies in the range of 1 eV to 1 keV (e.g., a range of 1 eV to 5 eV) above the absorption edge of the element of interest.

Certain implementations described herein can be used to detect other atomic elements of interest. For example, for an atomic element of interest having an absorption edge between 0.8 keV and 1.5 keV, including atomic elements having atomic numbers from 8 (O) to 12 (Mg), from 22 (Ti) to 34 (Se), and from 49 (In) to 68 (Er), the Al K-line (1.486 keV) produced in an electron bombardment x-ray source with a target comprising Al or Al compound can be used. For another example, for an atomic element of interest having an absorption edge between 0.8 keV and 1.74 keV, including atomic elements having atomic numbers from 9 (F) to 13 (Al), from 24 (Cr) to 35 (Br), and from 56 (Ba) to 73 (Ta), the Si K-line (1.74 keV) produced in an electron bombardment x-ray source with a target comprising Si or Si compound can be used. Alternatively, the W Mα-line (1.8 keV) produced in an electron bombardment x-ray source with a target comprising W or W compound can be used.

Further Example Implementations

In certain implementations, XRR can be measured across a range of Q values (e.g., from 0 to 0.15), with Q defined as:

$$Q=(4\pi \sin\theta)/\lambda$$

where θ is the incidence angle and λ is the wavelength of the incident x-ray. In certain implementations, XRR is performed at low x-ray energies that are near (e.g., within 10%; within 20%) but below an absorption edge of an atomic element of the substrate and/or multilayer that is not the atomic element of interest. In certain such implementations, the XRR measurements can be made for x-ray energies near (e.g., within 10%; within 20%) and below the absorption edge of the atomic element of interest.

Certain implementations described herein provide metrology using two or more x-ray energies (e.g., a finite number of XRR measurements obtained at a finite number of incidence angles with two or more x-ray energies). For example, these x-ray energies can have refractive index differences larger than 10% in real and/or imaginary parts for the material comprising the atomic element of interest. In certain such implementations, one x-ray energy can be below an absorption edge of an atomic element of interest and another x-ray energy can be above the absorption edge. The incident x-ray beam can have a small energy bandwidth and small collimation angular range. The sample structure (e.g., thickness of the Si nanosheets; spacings between the Si nanosheets and the substrate) at a first stage of manufacturing (e.g., prior to deposition of the atomic element of interest, e.g., HfO$_2$) can be already known, and the metrology can be used to analyze the sample structure at a second stage of manufacturing (e.g., after deposition of the atomic element of interest).

Certain implementations include simulating XRR curves for various structures and various x-ray energies, examples of which include: HfO$_2$ layers on Si nanosheets using x-rays with x-ray energies of the Mg K line, or Al K line and Si K line; Ge layers in Si/SiGe nanosheet stacks using x-rays with x-ray energies of the K lines of Mg, Al or Si; Si layers of Si nanosheets using x-rays with x-ray energies of the K lines of Si or Al (which are below the Si K-edge absorption edge) and of one of the L lines of Mo, Rh, or Pd. Certain implementations include using the XRR data with at least two x-ray energies to determine the structural information of the atomic element of interest in a layered material structure on a flat substrate. As described herein, simulations show that x-rays of the Si Kα line (1.74 keV energy) and the Al Kα line (1.5 keV) can be used together to measure HfO$_2$ film thickness variations using XRR to provide complementary data, in part due to the Si Kα line being above the Hf M absorption edge energy and below the Si K absorption edge energy, while the Al Kα line is below the Hf M absorption edge energy.

In certain implementations, the metrology can additionally include collecting characteristic fluorescence x-rays of the atomic element of interest during at least one XRR measurement with the x-ray excitation energy greater than an absorption edge energy of the atomic element of interest but less than 3 keV for efficient generation of the characteristic fluorescence x-rays of the atomic element of interest to provide complement information. Certain implementations use XRR data with the XRF data to determine the structural information of the atomic element of interest in a layered material structure on a flat substrate.

For monitoring manufacturing processes in which an atomic element of interest is included in a layered material structure, certain implementations can comprise selecting a finite number of x-ray measurements with strong correlation (e.g., response) to at least one atomic element of interest in the structure, collecting a data set of the at least one atomic element of interest on a reference standard with the selected number of x-ray measurements, collecting a data set of the at least one atomic element of interest on a test object with the same selected number of x-ray measurements, calculating the deviation (e.g., difference) of the two data sets, and determining whether the deviation is within the process window for the structural parameters of the atomic element of interest. Specific selecting finite number of x-ray measurement examples can include a finite number of measurements using an x-ray energy that is higher than an absorption edge of the atomic element of interest but is less than 1 keV. The incident x-ray beam can have a small energy bandwidth and a small collimation angular range.

In certain implementations, the thicknesses of HfO$_2$ layers on three Si nanosheets (e.g., each Si nanosheet having a thickness of 10 nm and a pitch of 20 nm between adjacent nanosheets) are monitored using the Si Kα line x-rays and/or the Al Kα line x-rays at a finite number of incidence angles. In one example, the three Si nanosheet structure can be simulated with at least two models that each have corresponding HfO$_2$ layer thicknesses on both sides of all three Si nanosheets equal to one another (e.g., the HfO$_2$ layer thicknesses of the models differing by 0.5 nm from one another; a first model with the HfO$_2$ layer thicknesses equal to 1.5 nm and a second model with the HfO$_2$ layer thicknesses equal to 2.0 nm). In another example, the three Si nanosheet structure can be simulated with at least two models that each have the top HfO$_2$ layer thicknesses equal to one another (e.g., 2.0 nm), the bottom HfO$_2$ layer thicknesses equal to one another (e.g., 1.5 nm), and the top HfO$_2$ layer thicknesses different from the bottom HfO$_2$ layer thicknesses. In another example, the three Si nanosheet structure can be simulated with at least two models that each have the HfO$_2$ thicknesses on the top and the bottom sides of the top and the bottom Si nanosheets the same as one another (e.g., top Si nanosheet: 2.0 nm on both the top and bottom sides; bottom Si nanosheet: 1.5 nm on both the top and bottom sides) and the HfO$_2$ layer thicknesses on the top and bottom sides of the middle Si nanosheet equal to the mean of the HfO$_2$ layer thicknesses on the top and bottom Si nanosheets (e.g., 1.75 nm on both the top and bottom sides of the Si nanosheet). For each example, the data can be obtained at one or two incidence angles (e.g., selected because they are expected to be sufficiently sensitive to the difference between the models).

In certain implementations, the relative thicknesses of Si layers and SiGe layers of a three-layer Si/SiGe nanosheet stack on at least one test sample are monitored using the Si Kα line x-rays and reference data obtained from at least one reference sample (e.g., each Si/SiGe nanosheet of the at least one reference sample having a thickness of 10 nm and a pitch of 20 nm between adjacent Si/SiGe nanosheets). In one example, a reference sample has a Si/SiGe thickness ratio for each of the Si/SiGe nanosheets that is equal to 1.05, and the reference data from the reference sample and the test data from the at least one test sample can be obtained at one or two incidence angles (e.g., selected because they are expected to be sufficiently sensitive to the thickness ratio with respect to the reference data from the reference sample). In another example, the reference data is obtained from a reference sample in which the top, middle, and bottom Si/SiGe nanosheets have different Si/SiGe thickness ratios (e.g., top nanosheet: 1.0; middle nanosheet: 0.98; bottom nanosheet: 0.95). The reference data and the test data can be obtained at a finite number of XRR measurement points (e.g., selected because they are expected to be sufficiently sensitive to the thickness ratio with respect to the reference data from the reference sample).

In certain implementations, constructive and destructive interference of the incident x-rays with x-rays reflected from interfaces of the layered material structure can be used to provide additional sensitivity to structural parameters. In certain implementations, a finite number of characteristic XRF measurements can be obtained with an incident x-ray energy that is higher than an absorption edge of the atomic element of interest but is less than 1 keV. The incident x-ray beam can have sufficient coherence to produce x-ray intensity modulation inside the layered material structure through constructive and destructive interference of the incident x-rays and x-rays reflected by the interfaces of the layered materials structure. The x-ray energy can be selected to efficiently generate the characteristic fluorescence x-rays and/or to provide a sufficiently high signal-to-background ratio (e.g., using incident Si K-line x-rays for efficient generation of Hf M-line fluorescence x-rays and using incident Al K-line x-rays for efficient generation of Ge L-line fluorescence x-rays).

For example, the layered material structure can comprise three Si nanosheets (e.g., each 10-nm thick) separated from one another by air/vacuum regions and thin (e.g., less than 3 nm thick) HfO$_2$ layers surrounding the Si nanosheets (see, e.g., FIGS. 7A and 8A). The x-ray transmission of the characteristic oxygen K-line fluorescence x-rays and characteristic Hf L-line fluorescence x-rays through 20 nm of Si can be greater than 90% and can have sufficient transmission even for characteristic fluorescence x-rays generated at the bottom side of the bottom Si nanosheet. To generate O characteristic K-line fluorescence x-rays, the excitation x-rays can have an x-ray energy greater than 532 eV, which is the oxygen K absorption edge energy. To efficiently generate O characteristic K-line fluorescence x-rays and to have a sufficiently high x-ray flux within a sufficiently narrow spectral bandwidth to generate x-ray intensity modulation inside the layered material structure, an x-ray source with a target material comprising Mg, Al, and/or Si and their related compounds (e.g., SiC) can be used. To generate Hf characteristic L-line fluorescence x-rays, the excitation x-rays can have an x-ray energy greater than the Hf M$_3$ absorption edge energy of 1.662 keV. To efficiently generate Hf characteristic L-line fluorescence x-rays and to have a sufficiently high x-ray flux within a sufficiently narrow spectral bandwidth to generate x-ray intensity modulation inside the layered material structure, an x-ray source with a target material comprising Si, Mo, Ru, Rh, Pd, W, Ir, Pt, Au, Ti, and/or Cr and their related compounds can be used to generate at least one characteristic x-ray line having an x-ray energy in a range from 1.662 keV to 5.5 keV.

Figure 10:
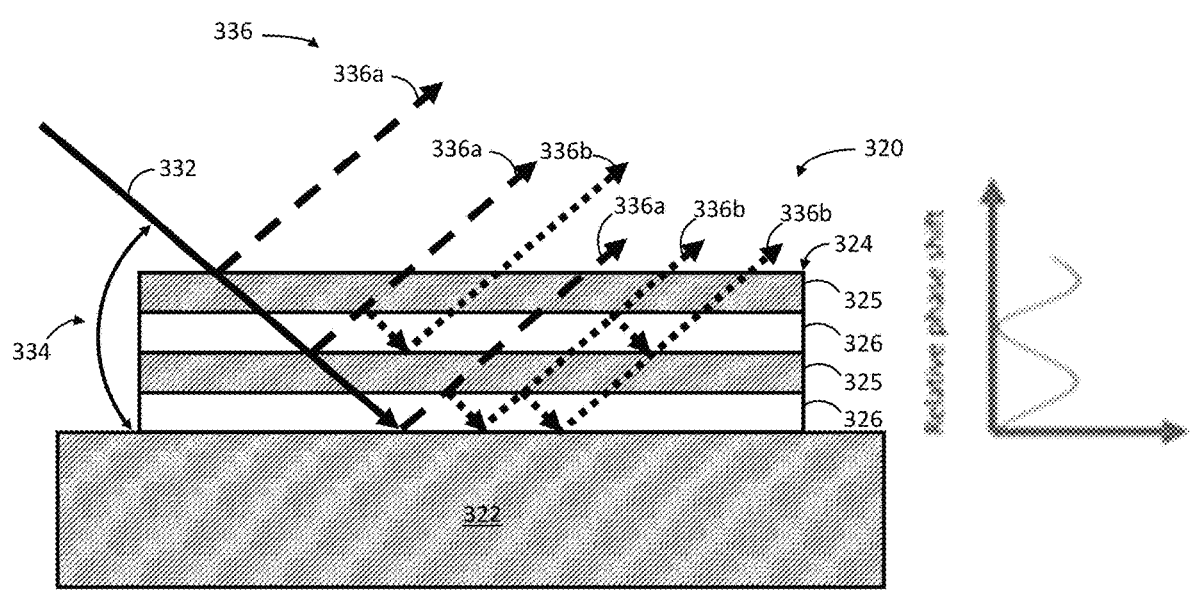
FIG. 10 schematically illustrates a layered material structure irradiated by an incident x-ray beam in accordance with certain implementations described herein.

FIG. 10 schematically illustrates a layered material structure 320 irradiated by an incident x-ray beam 332 in accordance with certain implementations described herein. The incident x-ray beam 332 is incident onto the layered material structure 324 (e.g., in an air/vacuum environment) on a substantially flat substrate 322 (e.g., Si wafer), the layer material structure 324 comprising two Si layers 325 and air/vacuum gap regions 326 below them on the substrate 322. When the angle of incidence 334 is greater than the critical angle for total reflection, x-ray reflections 336 occur at all the interfaces between the Si layers 325 and the gap region 326 having a difference in x-ray refractive index (e.g., between the Si layers 325 and the gap region 326). As shown in FIG. 10, the reflected x-ray beams 336 comprise first reflection x-ray beams 336a reflected from the top interfaces of the two Si layers 325 and from the Si substrate 322 (long dashed lines) and second reflection x-ray beams 336b from portions of the first reflection x-ray beams 336a reflected from various interfaces of the layered material structure 324, with FIG. 10 showing only some of these second reflection x-ray beams 336b.

When the incident x-ray beam 332 has sufficient longitudinal (e.g., temporal) coherence, the first reflection x-ray beams 336a and second reflection x-ray beams 336b interfere with one another and with the incident x-ray beam 332. For example, the temporal coherence length of an x-ray beam is approximately equal to the x-ray wavelength λ multiplied by λ/Δλ, where Δλ is the spectral bandwidth. For a given spectral resolving power λ/Δλ, the temporal coherence length is proportional to the x-ray wavelength. The interference results in x-ray intensity modulation inside the layered material structure 320. When the incident x-ray beam 332 has sufficient lateral (e.g., spatial) coherence, the x-ray intensity modulation can be maintained. The x-ray intensity modulation can be used to probe spatial information of at least one atomic element of interest in the layered material structure 324. When the incident x-ray beam 332 has sufficient longitudinal (e.g., temporal) coherence and sufficient lateral (e.g., spatial) coherence, the x-ray intensity from the interference of the incident x-ray beam 332 and a reflected x-ray beam 336 can be expressed as:

$$I_i = A_1^2 + A_2^2 + 2 \cdot A_1 \cdot A_2 \cdot \cos(\varphi),$$

where $A_1$ and $A_2$ are the amplitudes of the incident x-ray beam 332 and the reflected x-ray beam 336, respectively, and φ is the relative phase difference between the incident x-ray beam 332 and the reflected x-ray beam 336.

For the layered material structure 322 shown in FIG. 10, the x-ray intensity modulation within the layered material structure 322 results from interference of the incident x-ray beam 332 with the first and second reflection x-ray beams 336a,b. The first reflection x-ray beams 336a result from the incident x-ray beam 332 reflected by an interface of two regions of the layered material structure 322 (e.g., the Si layers 325 and the gaps 326) while the second reflection x-ray beams 336b results from a first reflection x-ray beam 336a being further reflected by an interface of two regions of the layered material structure 322. The amplitudes of the second reflection x-ray beams 336b are generally weaker than that of the first reflection x-ray beams 336a. For example, assuming negligible amplitude reduction from attenuation and reflections of the incident x-ray beam 332 by the layered material structure 324, the x-ray intensity $I_1$ at the bottom surface of the bottom Si layer 325 (e.g., the Si layer closest to the substrate 322) can be approximated and expressed as:

$$I_1 = (A_0 + A_1 + A_2) \cdot (A_0 + A_1 + A_2)^*$$
$$= A_0^2 + A_1^2 + A_2^2 + 2 \cdot A_0 \cdot A_1 \cdot \cos(\varphi) + 2 \cdot A_0 \cdot A_2 + 2 \cdot A_1 \cdot A_2 \cdot \cos(\varphi),$$

where $A_0$ is the amplitude of the incident x-ray beam 332, $A_1$ and $A_2$ are the amplitudes of the first reflection x-ray beam 336a reflected from the substrate 322 and from the bottom surface of the bottom Si layer 325, respectively, and $\varphi$ is the relative phase difference between the incident x-ray beam 332 at the bottom surface of the bottom Si layer 325 and the first reflection x-ray beam 336a reflected from the substrate 322, which is approximately equal to the x-ray beam pathlength of the incident x-ray beam 332 from the bottom surface of the bottom Si layer 325 to the substrate 322 plus that of the first reflection x-ray 336a reflected from the substrate 322 to the bottom surface of the bottom Si layer 325.

When $A_0$ is much larger than $A_1$ and $A_2$, the x-ray intensity $I_1$ at the bottom surface of the bottom Si layer 325 can be approximated and expressed as:

$$I_1 = A_0^2 + 2 \cdot A_0 \cdot A_2 + 2 \cdot A_0 \cdot A_1 \cdot \cos(\varphi).$$

By varying the angle of incidence of the incident x-ray beam 332, the x-ray intensity $I_1$ at the bottom surface of the bottom Si layer 325 can be varied by $4 \cdot A_0 \cdot A_1$, thereby providing information regarding the atomic element composition at the bottom surface of the bottom Si layer 325. Similarly, the approximate x-ray intensity at the top surface of the bottom Si layer 325 can be expressed (assuming that the spacing between the bottom surface of the bottom Si layer 325 to the substrate 322 is the same as the thickness of the bottom Si layer 325) as:

$$I_1 = A_0^2 + 2 \cdot A_0 \cdot A_3 + 2 \cdot A_0 \cdot A_1 \cdot \cos(\varphi) + 2 \cdot A_0 \cdot A_2 \cdot \cos(\varphi),$$

where $A_3$ is the amplitude of the first reflection x-ray beam 326a reflected from the top surface of the bottom Si layer 325.

Thus, at the same angle of incidence 334, while the x-ray intensity on the top surface of the bottom Si layer 325 is modulated by $2 \cdot A_0 \cdot A_1 \cdot \cos(\varphi) + 2 \cdot A_0 \cdot A_2 \cdot \cos(\varphi)$, the x-ray intensity on the bottom surface of the bottom Si layer 325 is modulated by $2 \cdot A_0 \cdot A_1 \cdot \cos(\varphi)$. Table 3 below shows the values of $B = 2 \cdot A_0 \cdot A_1 \cdot \cos(\varphi)$ and $C = 2 \cdot A_0 \cdot A_1 \cdot \cos(\varphi) + 2 \cdot A_0 \cdot A_2 \cdot \cos(\varphi)$ for several selected values of $\varphi$.

TABLE 3

| $\varphi$ | B | C |
| --- | --- | --- |
| $\pi/4$ | $1.4 \cdot A_0 \cdot A_1$ | $1.4 \cdot A_0 \cdot A_2$ |
| $\pi/2$ | 0 | $-2 \cdot A_0 \cdot A_1$ |
| $3\pi/4$ | $-1.4 \cdot A_0 \cdot A_1$ | $-1.4 \cdot A_0 \cdot A_2$ |
| $\pi$ | $-2 \cdot A_0 \cdot A_1$ | $2 \cdot A_0 \cdot A_1 - 2 \cdot A_0 \cdot A_2$ |
| $5\pi/4$ | $-1.4 \cdot A_0 \cdot A_1$ | $-1.4 \cdot A_0 \cdot A_1$ |
| $3\pi/2$ | 0 | $-2 \cdot A_0 \cdot A_1$ |
| $2\pi$ | $2 \cdot A_0 \cdot A_1$ | $2 \cdot A_0 \cdot A_1 + 2 \cdot A_0 \cdot A_2$ |
| $3\pi$ | $-2 \cdot A_0 \cdot A_1$ | $2 \cdot A_0 \cdot A_1 - 2 \cdot A_0 \cdot A_2$ |
| $4\pi$ | $2 \cdot A_0 \cdot A_1$ | $2 \cdot A_0 \cdot A_1 + 2 \cdot A_0 \cdot A_2$ |

For $A_1 = A_2$, which can be a good approximation when the energy of the incident x-ray beam 332 is greater than 1 keV, Table 2 can be simplified to have values that are based on the factor $A_0 \cdot A_1$, as shown in Table 4.

TABLE 4

| $\varphi$ | B | C |
| --- | --- | --- |
| $\pi/4$ | $1.4 \cdot A_0 \cdot A_1$ | $1.4 \cdot A_0 \cdot A_2$ |
| $\pi/2$ | 0 | $-2 \cdot A_0 \cdot A_1$ |
| $3\pi/4$ | $-1.4 \cdot A_0 \cdot A_1$ | $-1.4 \cdot A_0 \cdot A_2$ |
| $\pi$ | $-2 \cdot A_0 \cdot A_1$ | 0 |
| $5\pi/4$ | $-1.4 \cdot A_0 \cdot A_1$ | $-1.4 \cdot A_0 \cdot A_1$ |
| $3\pi/2$ | 0 | $-2 \cdot A_0 \cdot A_1$ |
| $2\pi$ | $2 \cdot A_0 \cdot A_1$ | $4 \cdot A_0 \cdot A_1$ |
| $3\pi$ | $-2 \cdot A_0 \cdot A_1$ | 0 |
| $4\pi$ | $2 \cdot A_0 \cdot A_1$ | $4 \cdot A_0 \cdot A_1$ |

As shown in Tables 2 and 3, in certain implementations, the relative x-ray intensities at the top and bottom surfaces of the bottom Si layer can be changed by changing the relative phase difference, which can be used to obtain relative information of the materials on the two surfaces (e.g., relative Ge residuals on the two surfaces after SiGe etching during a nanosheet transistor manufacturing process; $HfO_2$ layer thicknesses on both of the two surfaces). In certain implementations, by selecting an appropriate value, an x-ray intensity maxima or minima can be obtained at one of the two surfaces, enabling selection of optimal conditions for process monitoring during semiconductor device manufacturing.

The above discussion focuses on the interfaces of the bottom Si layer 325 in a layered material structure 324 comprising only two-layer pairs of Si layer/gap region, and calculations of the x-ray intensity modulation at the top and bottom surfaces of the bottom Si layer 325. However, in certain implementations, the method of using x-ray interference to generate x-ray intensity modulation with an incident x-ray beam 332 with sufficient coherence conditions can be generalized for any layered material structures 324 with a finite number of layers. Certain such embodiments can be used for metrology as well as process monitoring, where only a small number of measurements optimized for a specific material and/or structural parameters are used in reference under the same measurement conditions on a reference standard.

In certain implementations, the x-ray intensity modulation inside a sample can be manifested by x-ray reflectivity, which is proportional to the sum of all reflected x-rays emerging from the surface of the sample, and which can be expressed in terms of fractions of the incident x-ray beam. The x-ray reflectivity measures only the x-ray intensity of the reflected beam and not the phase of the reflected x-ray beam. As a consequence, x-ray reflectivity measurements do not provide information regarding the x-ray intensity distribution inside the sample.

Figure 11:
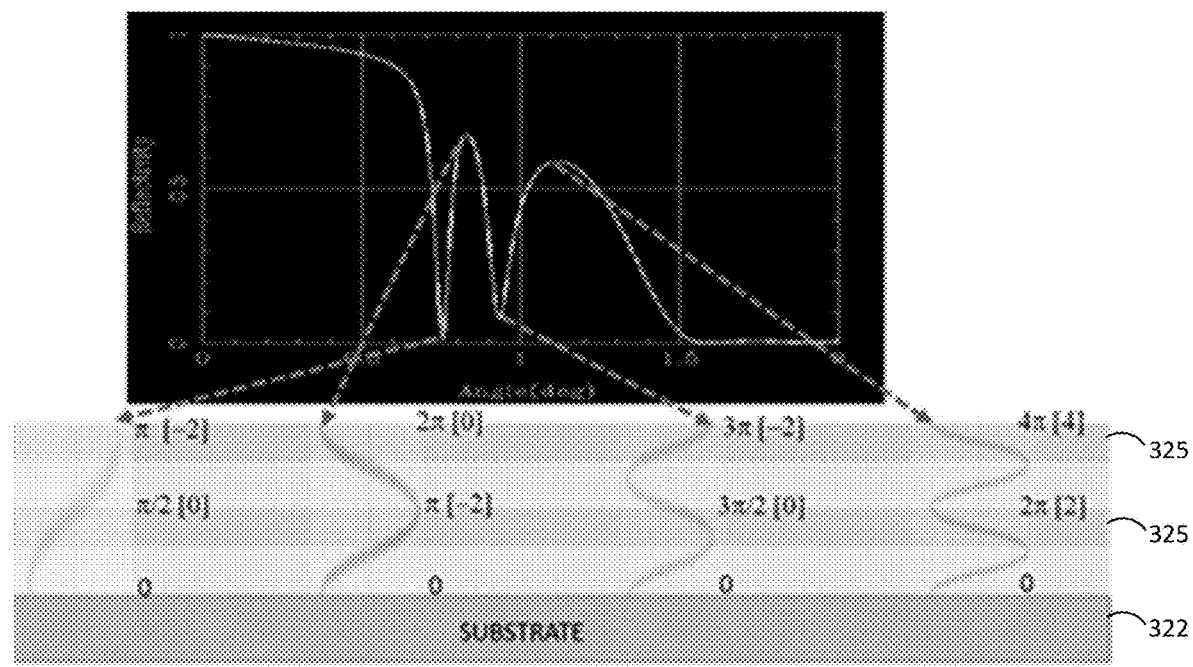
FIG. 11 shows a calculated XRR curve from a layered material structure and the relative phase difference at three indicated interfaces of the layered material structure in accordance with certain implementations described herein.

FIG. 11 shows a calculated XRR curve from a layered material structure 324 comprising two pairs of Si/gap regions with 10-nm-thick Si layers 325 that are spaced 10 nm from one another (e.g., having a 20 nm period) on a silicon substrate 322 (see, e.g., FIG. 10). The XRR curve includes reflectivity minima and maxima resulting from interference of the incident x-ray beam 332 and all the reflected x-ray beams 336 from the interfaces of the layered material structure 324. The reflectivity minima and maxima are directly related to the x-ray intensity modulation inside the layered material structure 324.

FIG. 11 also schematically illustrates the relative phase difference at three indicated interfaces: the top surfaces of the two Si layers 325 and the substrate 322 for four angles of incidence at which the XRR curve is at a local minimum or a local maximum. The first minimum takes place for an angle of incidence at which the phase difference of the first reflection x-ray beam 336a from the top surface of the top Si layer 325 with the first reflection x-ray beam 336a reflected from the substrate 322 results in destructive interference. The first reflectivity maximum takes place for an angle of incidence at which the phase difference of the first reflection x-ray beam 336a from the top surface of the top Si layer 325 with the first reflection x-ray beam 336a reflected from the substrate 322 results in constructive interference.

Certain implementations described herein can be used to characterize a depth distribution of one or more atomic elements of interest in a layered material structure on a flat substrate at various depth. For example, the relative amount of an atomic element (e.g., Ge) at or near the top and bottom surfaces of the two Si layers 325 can be measured with four values of the angle of incidence selected to provide larger differences in response to the incident x-rays beam 332 (e.g., detecting Ge characteristic x-rays). Certain implementations described herein can be used to measure one or more atomic elements of interest at any depth in a layered material structure (e.g., not limited to a particular interface). Certain implementations described herein can be used to analyze layered material structures comprising a plurality of layers with or without periodicity.

Certain implementations described herein comprise specifically selecting a finite number of x-ray measurement examples.

Certain implementations described herein utilize low energy x-rays with long coherent lengths. For example, Cu $K\alpha_1$ and $K\alpha_2$ is 400×, 1.5 A results in 600 A (60 nm) with multilayer monochromator, needs to use single crystal monochromator to get 4000 resolving power (just select K $\alpha_1$) to get 600 nm of coherence length. For Si $K\alpha$, 1740/0.7>2000××0.6 nm=1200 nm coherence length. Additionally, lower energy x-rays offer advantages for metrology and process monitoring with small x-ray beam footprints on the sample because the x-ray incidence angle with respective to the objective surface is proportional to the critical angle, angular collimation of the incident x-ray beam is proportional to x-ray wavelength, and larger fluorescence cross section for many low Z elements of interest in semiconductor devices, such as O in $HfO_2$. $HfO_2$ thickness can be measured with one of the two elements assuming the stoichiometry remains the same or known to be by other techniques or both.

In certain implementations in which the incident x-ray beam is focused in the sagittal direction to a size on the sample of less than 40 microns, multiple test pads can be used along the tangential directions, examples of which have one or more of the following: large convergence angles or high incidence angles, high angle harmonics (e.g., high angles with shorter standing waves and thus higher resolutions), dual x-ray energies below and above an absorption edge of an atomic element of interest and/or an atomic element in a material of interest, x-ray wavelengths shorter than one half of the standing wave pitch.

In certain implementations, the incident x-ray beam can be directed onto the sample which comprises at least one layered material structure. For example, for a sample comprising a flat material structure, the angle of incidence can be less than 20 degrees and greater than the critical angle of total external reflection for the flat substrate or for the critical angle of the layered material structures, whichever is larger. The x-ray intensity variation inside the layered materials structures can be varied by changing the grazing incidence angle for a fixed x-ray probing energy or by changing x-ray energy for a fixed grazing incidence angle.

In certain implementations, the x-ray energy of the incident x-ray beam is selected to produce secondary particles with short penetration lengths within the sample to obtain element specific depth information. Using two or more secondary particles with short and differing penetration lengths, high depth measurement sensitivity and reasonably large probing depth can be achieved. In certain implementations, a plurality of x-ray energies of the incident x-ray beam can be used and optimized for a range of atomic elements to generate secondary particles with desired penetration length. The depth probing capabilities of these techniques can be used alone or in combination with one another.

Certain implementations can be used for measuring the structures in depth and/or 3D with nanometer resolution. For example, an incident x-ray beam with certain attributes can be directed on one or more layered material structures at a grazing incidence angle with respect to a flat surface of the substrate to produce an x-ray intensity variation along the surface normal of the flat surface of the substrate, the x-ray intensity variation resulting from the interference of the incident x-ray beam with x-rays reflected from the interfaces of the layered material structures and the substrate. By tuning the grazing incidence angle, the x-ray intensity distribution along the surface normal can be varied. Due to absorption (e.g., ionization) of x-rays by one or more atomic elements in the layered material structures, secondary particles (e.g., characteristic fluorescence x-rays, photoelectrons, and Auger electrons) can be produced. Characteristic fluorescence x-rays and Auger electrons are highly atomic element specific and independent of the x-ray energy of the x-ray beam. When the incident x-ray beam is monochromatic, photoelectrons are also atomic element specific as their energies are equal to the difference between the x-ray energy of the incident beam and the binding energy of the electron within the atomic element. For a given structure (e.g., a thin layer), the number of secondary particles generated by an atomic element is proportional to the x-ray intensity at the layer and the atomic number of the atomic element. Therefore, the amount of one or more atomic elements in the layered material structures can be measured by measuring the number of the secondary particles specific to the atomic elements. With a calibrated standard reference sample, this technique can be used to measure and monitor amounts of the atomic elements in materials of interest in semiconductor manufacturing process to ensure that the manufacturing process is within a predetermined process window. By tuning the grazing incidence angle, the distribution of the one or more atomic elements along the surface normal of the flat surface can be measured because the x-ray intensity distribution can vary between 1 nm to 20 nm, depending on the x-ray energy and the grazing incidence angle. The x-ray intensity variation along the surface normal can be particularly well suited for study of layered material structures of semiconductor devices and their manufacturing process.

In certain implementations, the x-ray energy of the incident x-ray beam is selected to efficiently generate large number of at least two secondary particles with effective linear attenuation length (e.g., equivalent to the inelastic mean free path for photoelectrons and Auger electrons) between 1 nm and 500 nm and a ratio of their effective linear attenuation lengths greater than 50%. A relatively short effective linear attenuation length can be useful for obtaining relatively strong dependence of the secondary particle transmission from their origin to the surface of the layered material structures. A large difference between their effective linear attenuation lengths can be useful for balancing depth measurement sensitivity and sufficient measurement depth. For example, photoelectron energies can be varied by selecting the x-ray energy of the incident beam. Furthermore, photoelectrons from two different electron shells in an atom have different energies and different corresponding effective linear attenuation length.

In certain implementations, the incident x-ray beam is monochromatic or quasi-monochromatic with more than 50% of the x-rays are within an energy bandwidth of less than 1%. The incident x-ray energy can be selected to generate photoelectrons from one atomic element with an energy difference larger than 300 eV. The incident x-ray energy can be selected to generate photoelectrons with an energy difference larger than 300 eV from Auger electrons from the same atomic element or a different atomic element. The incident x-ray energy can be selected to generate x-rays having one or more characteristic x-ray energies from one or more atomic element so that the linear attenuation length of the generated x-rays through the layered material structures is less than 200 nm. In certain implementations, two or more incident x-ray energies are used to generate secondary particles with linear attenuation lengths less than 500 nm for the characteristic x-rays and inelastic mean free paths less than 30 nm. A plurality of secondary particles with linear attenuation lengths (x-rays) or inelastic mean free paths (electrons) can be detected and used to obtain structural information of the layered material structures. The efficiency of secondary particle generation by one or more atomic elements in the layered material structures can be varied by varying the x-ray beam intensity with varying the grazing incidence angle for a given x-ray beam energy. For example, the grazing incidence angle can be scanned over a range of grazing incidence angles while the secondary particles are collected. The x-ray reflectivity can be measured and used to calibrate or determine the value of the grazing incidence angle. In certain implementations, secondary particles are collected simultaneously with x-ray reflectivity measurement over a range of grazing incidence angles. The data from the two measurements can be used to obtain structural and material information about the layered material structures.

Certain implementations described herein can avoid one or more problems or issues found in other analysis techniques. For example. optical scatterometry is model-dependent (e.g., often needing imaging to provide a model), which can be confounded due to the increasing complexity in layered material structures and shrinking feature dimensions of new semiconductor devices. Electron microscopes (EM) and atomic force microscopes (AFM) typically require destructive sample preparation to get depth information for layered material structures, which can be time-consuming and destructive and therefore undesirable for a process monitoring technique. Electron microprobe-based techniques can be limited in detection sensitivity due to large continuous Bremsstrahlung x-ray background (e.g., for electron-induced x-ray fluorescence spectroscopy) and/or large electron background (e.g., in Auger spectroscopy) and can require destructive sample preparation of thin cross-sections for high depth resolution. Furthermore, electron beam induced carbon deposition on the analysis area can lead to measurement errors associated with the amount of carbon deposited on the analysis area, and electrical charging can become problematic, especially when detecting low energy characteristic x-rays or Auger electrons. Transmission small angle x-ray scattering (tSAXS) systems with laboratory x-ray sources may not have acceptable throughput for measuring layered material structures with sufficient depth resolution.

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," less than," "between," and the like includes the number recited. As used herein, the meaning of "a," "an," and "said" includes plural reference unless the context clearly dictates otherwise. While the structures and/or methods are discussed herein in terms of elements labeled by ordinal adjectives (e.g., first, second, etc.), the ordinal adjectives are used merely as labels to distinguish one element from another, and the ordinal adjectives are not used to denote an order of these elements or of their use.

Various configurations have been described above. It is to be appreciated that the implementations disclosed herein are not mutually exclusive and may be combined with one another in various arrangements. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. A method for analyzing a three-dimensional structure of a sample, the method comprising:
    generating a first x-ray beam, the first x-ray beam having a first energy bandwidth less than 20 eV at full-width-at-half maximum and a first mean x-ray energy that is in a range of 1 eV to 1 keV higher than a first absorption edge energy of a first atomic element of interest, the first x-ray beam collimated to have a first collimation angular range less than 7 mrad in at least one direction perpendicular to a first propagation direction of the first x-ray beam;
    irradiating a sample with the first x-ray beam, the sample having a layered structure comprising a plurality of layers and a plurality of substantially parallel interfaces between the layers, the first x-ray beam having an incidence angle relative to a substantially flat surface of the sample, said irradiating forming a standing x-ray wave within the layered structure through constructive and destructive interference of the first x-ray beam and x-rays of the first x-ray beam reflected by the interfaces of the layered structure, the standing x-ray wave having x-ray intensity modulation in a direction normal to the plurality of substantially parallel interfaces;
    tuning the incidence angle in a range of 3 mrad to 400 mrad to position nodes and antinodes of the standing x-ray wave along the direction normal to the plurality of substantially parallel interfaces at predetermined positions relative to the plurality of layers and the plurality of substantially parallel interfaces and within the layered structure;
    generating measured data by simultaneously detecting a reflected portion of the first x-ray beam from the sample and detecting x-ray fluorescence x-rays and/or photoelectrons from the sample; and
    obtaining, from the measured data, depth-resolved information indicative of the layers and/or the interfaces of the sample, said obtaining comprising comparing at least some of the measured data to expected measurement data values from one or more simulated models of the sample, previously measured data values obtained from the sample, and/or measured data values from a reference sample.

2. The method of claim 1, wherein the first absorption edge energy of the first atomic element of interest is in a range of 0.1 keV to 5.4 keV.

3. The method of claim 1, wherein the sample comprises a silicon substrate and the first mean x-ray energy is less than the 1.84 keV absorption edge energy of silicon.

4. The method of claim 1, wherein the first collimation angular range is less than 4 mrad.

5. The method of claim 1, wherein the first mean x-ray energy is in a range of 1 eV to 5 eV higher than the first absorption edge energy of the first atomic element of interest.

6. The method of claim 1, wherein said generating the first x-ray beam comprises irradiating at least one x-ray generating material with electrons and emitting x-rays from the at least one x-ray generating material that generates characteristic x-rays of energies in a range of 100 eV to 5.5 keV.

7. The method of claim 6, wherein said generating the first x-ray beam further comprises filtering the x-rays to have the first energy bandwidth.

8. The method of claim 1, wherein the first x-ray beam impinges the sample in a reflecting plane comprising the first propagation direction and a direction perpendicular to the surface, the first x-ray beam having a collimation angle in the reflecting plane, the collimation angle smaller than a convergence angle of the first x-ray beam in a plane perpendicular to the reflecting plane.

9. The method of claim 1, wherein said irradiating the sample with the first x-ray beam and said simultaneously detecting the reflected portion of the first x-ray beam and detecting the x-ray fluorescence x-rays and/or the photoelectrons are performed after the sample has undergone at least one processing procedure, the method further comprising:
    obtaining a first set of spatial and/or compositional information regarding the sample by analyzing at least the detected first reflected portion and/or the detected x-ray fluorescence x-rays and/or the detected photoelectrons; and
    comparing the obtained first set of spatial and/or compositional information regarding the sample to a second set of spatial and/or compositional information regarding the sample prior to the sample undergoing the at least one processing procedure.

10. The method of claim 1, further comprising:
    generating a second x-ray beam, the second x-ray beam having a second energy bandwidth less than 20 eV at full-width-at-half maximum and a second mean x-ray energy that is in a range of 1 eV to 1 keV lower than the first absorption edge energy of the first atomic element of interest, the second x-ray beam collimated to have a second collimation angular range less than 7 mrad in at least one direction perpendicular to a second propagation direction of the second x-ray beam;
    irradiating the sample with the second x-ray beam; and
    detecting a second reflected portion of the second x-ray beam from the sample.

11. The method of claim 10, wherein said obtaining the depth-resolved information comprises obtaining spatial and compositional information regarding the sample by analyzing the detected second reflected portion with the detected first reflected portion, the detected x-ray fluorescence x-rays, and/or the detected photoelectrons.

12. The method of claim 1, further comprising:
generating a second x-ray beam, the second x-ray beam having a second energy bandwidth less than 20 eV at full-width-at-half maximum and a second mean x-ray energy that is in a range of 1 eV to 1 keV higher than a second absorption edge energy of the first atomic element of interest, the first absorption edge energy and the second absorption edge energy separated from one another by at least 1 keV, the second x-ray beam collimated to have a second collimation angular range less than 7 mrad in at least one direction perpendicular to a second propagation direction of the second x-ray beam;
irradiating the sample with the second x-ray beam; and
detecting a second reflected portion of the second x-ray beam from the sample.

13. The method of claim 1, further comprising:
generating a second x-ray beam, the second x-ray beam having a second energy bandwidth less than 20 eV at full-width-at-half maximum and a second mean x-ray energy that is in a range of 1 eV to 1 keV higher than a second absorption edge energy of a second atomic element of interest different from the first atomic element of interest, the second x-ray beam collimated to have a second collimation angular range less than 7 mrad in at least one direction perpendicular to a second propagation direction of the second x-ray beam;
irradiating the sample with the second x-ray beam; and
detecting a second reflected portion of the second x-ray beam from the sample.

14. The method of claim 1, wherein tuning the incidence angle comprises varying the incidence angle among less than 100 incidence angles and at least 20% of the incidence angles are separated from one another by at least 3 mrad.

15. The method of claim 1, wherein the first x-ray beam interacts with the plurality of substantially parallel interfaces to form x-ray maxima or minima at an interface of the substantially parallel interfaces.

16. The method of claim 1, wherein the x-ray intensity modulation at a first interface of the plurality of substantially parallel interfaces varies as a first function of the incidence angle and the x-ray intensity modulation at a second interface of the substantially parallel interfaces varies as a second function of the incidence angle, the second function different from the first function.

17. The method of claim 1, wherein the depth-resolved information is indicative of at least one layer thickness of the sample in a direction substantially perpendicular to the surface.

18. A method for analyzing a three-dimensional structure of a sample, the method comprising:
generating a first x-ray beam, the first x-ray beam having a first energy bandwidth less than 20 eV at full-width-at-half maximum and a first mean x-ray energy that is in a range of 1 eV to 1 keV higher than a first absorption edge energy of a first atomic element of interest, the first x-ray beam collimated to have a first collimation angular range less than 7 mrad in at least one direction perpendicular to a first propagation direction of the first x-ray beam;
irradiating the sample with the first x-ray beam at a plurality of incidence angles relative to a substantially flat surface of the sample, the incidence angles of the plurality of incidence angles in a range of 3 mrad to 400 mrad, and the plurality of incidence angles comprise less than 100 incidence angles and at least 20% of the incidence angles are separated from one another by at least 3 mrad;
simultaneously detecting a reflected portion of the first x-ray beam from the sample and detecting x-ray fluorescence x-rays and/or photoelectrons from the sample; and
selecting at least some of the incidence angles of the plurality of incidence angles to correspond to expected extrema in the detected reflected portion of the first x-ray beam from the sample and/or expected extrema in the detected x-ray fluorescence x-rays from the sample.

19. The method of claim 18, further comprising:
analyzing deviations between expected values and the detected first reflected portion and/or between expected values and the detected x-ray fluorescence x-rays; and
initiating an alert in response to the deviations being outside a predetermined range.

20. A method for analyzing a layered structure comprising substantially parallel interfaces, the method comprising:
irradiating the layered structure with an incident x-ray beam at one or more incidence angles in a range of 3 mrad to 400 mrad relative to the substantially parallel interfaces, the incident x-ray beam having an energy bandwidth less than 20 eV at full-width-at-half maximum and a mean x-ray energy that is in a range of 1 eV to 1 keV higher than an absorption edge energy of an atomic element of interest, the incident x-ray beam having sufficient coherence to produce a standing x-ray wave having x-ray intensity modulation in a direction normal to the substantially parallel interfaces and inside the layered structure through constructive and destructive interference of the incident x-ray beam and x-rays of the incident x-ray beam reflected by the substantially parallel interfaces of the layered structure;
tuning an incidence angle of the x-ray beam relative to the substantially parallel interfaces to position nodes and antinodes of the standing x-ray wave along the direction at predetermined positions relative to the substantially parallel interfaces and within the layered structure; and
simultaneously detecting at least some of the x-rays reflected by the substantially parallel interfaces and detecting x-ray fluorescence x-rays and/or photoelectrons from the layered structure.

21. The method of claim 20, wherein the mean x-ray energy is in a range of 1 eV to 5 eV higher than the absorption edge energy of the atomic element of interest.

22. A system for analyzing a three-dimensional structure of a sample, the system comprising:
at least one x-ray source configured to generate at least one x-ray beam having an energy bandwidth less than 20 eV at full-width-at-half maximum and a mean x-ray energy that is in a range of 1 eV to 1 keV higher than an absorption edge energy of an atomic element of interest, the at least one x-ray beam collimated to have a collimation angular range less than 7 mrad in at least one direction perpendicular to a propagation direction of the at least one x-ray beam, the at least one x-ray source further configured to direct the at least one x-ray beam to irradiate the sample at an incidence angle relative to a substantially flat surface of the sample, the sample having a layered structure comprising a plurality of layers and a plurality of substantially parallel interfaces between the plurality of layers, the incidence angle in a range of 3 mrad to 400 mrad, the at least one x-ray beam having sufficient coherence to produce a standing x-ray wave having x-ray intensity modulation in a direction normal to the surface and inside the layered structure through constructive and destructive interference of the at least one x-ray beam and x-rays of the at least one x-ray beam reflected by the plurality of substantially parallel interfaces of the layered structure;

at least one stage configured to adjust and set the incidence angle of the at least one x-ray beam relative to the surface at specific predetermined values such that positions of nodes and antinodes of the standing x-ray wave are adjusted and set at predetermined positions relative to the plurality of layers and the plurality of substantially parallel interfaces along the direction normal to the surface and within the layered structure;

at least one first detector configured to detect a reflected portion of the at least one x-ray beam from the sample; and at least one second detector configured to detect x-ray fluorescence x-rays and/or photoelectrons from the sample simultaneously with the at least one first detector detecting the reflected portion of the at least one x-ray beam.

23. The system of claim 22, wherein the mean x-ray energy is in a range of 1 eV to 5 eV higher than the absorption edge energy of the atomic element of interest.

* * * * *